US012421477B2

(12) United States Patent
Herbst et al.

(10) Patent No.: US 12,421,477 B2
(45) Date of Patent: Sep. 23, 2025

(54) DETERGENT COMPOSITIONS COMPRISING BACTERIAL MANNANASES

(71) Applicant: AB Enzymes Oy, Rajamäki (FI)

(72) Inventors: Daniela Herbst, Duesseldorf (DE); Susanne Wieland, Zons/Dormagen (DE); Nina Mussmann, Willich (DE); Taija Leinonen, Riihimaeki (FI); Leena Valtakari, Rajamaeki (FI); Michael Seefried, Grossostheim (DE); Kari Juntunen, Espoo (FI); Daniela Dollak, Stockstadt a. Rhein (DE); Patrick Lorenz, Lorsch (DE); Jari Vehmaanperae, Helsinki (FI); Pentti Ojapalo, Tuusula (FI); Terhi Puranen, Nurmijaervi (FI); Kristiina Jaervinen, Espoo (FI)

(73) Assignee: AB Enzymes OY, Rajamäki (FI)

( * ) Notice: Subject to any disclaimer, the term of this patent is extended or adjusted under 35 U.S.C. 154(b) by 0 days.

(21) Appl. No.: 18/407,334

(22) Filed: Jan. 8, 2024

(65) Prior Publication Data

US 2024/0141258 A1 May 2, 2024

Related U.S. Application Data

(62) Division of application No. 16/500,603, filed as application No. PCT/EP2018/055007 on Mar. 1, 2018, now Pat. No. 11,952,559.

(30) Foreign Application Priority Data

Apr. 5, 2017 (EP) .................................... 17164901

(51) Int. Cl.

*C11D 3/386* (2006.01)
*C11D 17/00* (2006.01)

(Continued)

(52) U.S. Cl.

CPC ...... *C11D 3/38636* (2013.01); *C11D 3/38609* (2013.01); *C11D 3/38618* (2013.01);

(Continued)

(58) Field of Classification Search

CPC ............ C11D 3/38636; C11D 11/0017; C11D 17/0069; C11D 17/0078; C11D 17/043;

(Continued)

(56) References Cited

U.S. PATENT DOCUMENTS

2003/0203466 A1* 10/2003 Kauppinen .......... C12N 9/2491 435/320.1
2009/0325240 A1* 12/2009 Daniell .......... C12Y 302/01004 800/298

FOREIGN PATENT DOCUMENTS

| | | | |
|---|---|---|---|
| CN | 105754970 | A | 7/2016 |
| WO | WO 9964619 | A2 | 12/1999 |
| WO | WO 2018/185367 | | 11/2018 |

OTHER PUBLICATIONS

Stephen F. Altschul, Warren Gish, Webb Miller , Eugene W. Myers, David J. Lioman, Basic local alignment search tool, 1990, Journal of Molecular Biology, vol. 215, Issue 3, pp. 403-410 (Abstract only) (Year: 1990).*

(Continued)

*Primary Examiner* — David W Berke-Schlessel
*Assistant Examiner* — Trent R Clarke
(74) *Attorney, Agent, or Firm* — Knobbe, Martens, Olson & Bear, LLP

(57) ABSTRACT

This invention relates to novel detergent compositions comprising bacterial mannanase enzymes. The detergent compositions comprising bacterial mannanases are useful in laundry and cleaning applications wherein degradation or modification of mannan is desired. The invention also relates to the use of said detergent compositions in laundry and (Continued)

cleaning applications as well as a method for degrading mannan.

11 Claims, 7 Drawing Sheets

Specification includes a Sequence Listing.

(51) Int. Cl.
*C11D 17/04* (2006.01)
*C11D 17/06* (2006.01)

(52) U.S. Cl.
CPC ...... *C11D 3/38627* (2013.01); *C11D 3/38645* (2013.01); *C11D 3/38654* (2013.01); *C11D 3/38681* (2013.01); *C11D 17/0069* (2013.01); *C11D 17/0078* (2013.01); *C11D 17/043* (2013.01); *C11D 17/044* (2013.01); *C11D 17/045* (2013.01); *C11D 17/06* (2013.01); *C11D 2111/12* (2024.01)

(58) Field of Classification Search
CPC ..... C11D 17/044; C11D 17/045; C11D 17/06; C11D 3/38609; C11D 3/38618; C11D 3/38627; C11D 3/38645; C11D 3/38654; C11D 3/38681; C11D 2111/12
See application file for complete search history.

(56) References Cited

OTHER PUBLICATIONS

"BAD62862_1 mannan endo-1,4-beta-mannosidase [Shouchella clausii KSM-K16]" is GenBank document BAD62862.1. (Year: 2004).*

* cited by examiner

DETERGENT COMPOSITIONS COMPRISING BACTERIAL MANNANASES

INCORPORATION BY REFERENCE TO ANY PRIORITY APPLICATIONS

This application is a divisional of U.S. application Ser. No. 16/500,603 filed Oct. 3, 2019, which is a U.S. National-Stage entry under 35 U.S.C. § 371 based on International Application No. PCT/EP2018/055007, filed Mar. 1, 2018, which was published under PCT Article 21(2) and which claims priority to European Application No. 17164901.5, filed Apr. 5, 2017, which are all hereby incorporated in their entirety by reference.

REFERENCE TO SEQUENCE LISTING

The present application is being filed along with a Sequence Listing in electronic format. The Sequence Listing is provided as a file entitled KRWE004.006D1, which was created and last modified on Jan. 4, 2024 and is 78,342 bytes in size. The in-formation in the electronic Sequence Listing is hereby incorporated by reference in its entirety.

FIELD OF THE INVENTION

This invention relates to novel detergent compositions comprising bacterial mannanase enzymes. The detergent compositions comprising bacterial mannanases are useful in laundry and cleaning applications wherein degradation or modification of mannan is desired. The invention also relates to the use of said detergent compositions in laundry and cleaning applications as well as a method for degrading mannan.

BACKGROUND

Mannans are mannose containing polysaccharides found in various plants. Mannans are poorly soluble in an aqueous environment and their physicochemical properties give rise to viscous dispersions. Additionally, mannans have high water-binding capacity. All of these characteristics cause problems in several industries including brewing, baking, animal nutrition, and laundry and cleaning applications.

In plant based diets different β-mannans are present and depending on their amounts and properties they can compromise nutrient digestion, microbial colonisation and growth performance. Enzymatic degradation of mannans reduces digesta viscosity of high water soluble mannans and leads to production of manno-oligosaccharides that may form water-insoluble linear mannans present in leguminoseae. Mannanase increases average daily gain, feed efficiency, weight uniformity and livability in all monogastric animals.

For animal feed applications, such as feed for monogastric animals with cereal diets, mannan is a contributing factor to viscosity of gut contents and it thereby adversely affects the feed digestibility and animal growth rate. For ruminants, mannan represents a substantial component of fiber intake and a more complete digestion of mannan would facilitate higher feed conversion efficiencies.

For laundry and cleaning applications detergent compositions comprising mannanase can be used to degrade mannan. However, providing mannanases that are stable in varying storage and use conditions while still showing good mannan degrading activity is difficult.

It is an object of the present invention to provide detergent compositions comprising novel enzymes exhibiting mannanase activity when applied in these detergent compositions. It is a further object of the present invention to provide detergent compositions having increased stain removal performance on mannan containing stains.

SUMMARY

According to the first aspect of the invention there is provided a detergent composition comprising at least one enzyme having an amino acid sequence having at least 74% sequence identity to the amino acid sequence of SEQ ID NO: 16 (Man7), and/or 93% sequence identity to the amino acid sequence of SEQ ID NO: 12 (Man6), and/or 79% sequence identity to the amino acid sequence of SEQ ID NO: 20 (Man14).

In one embodiment of the invention the at least one enzyme has an amino acid sequence having at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to SEQ ID NO: 16.

In one embodiment of the invention the at least one enzyme has an amino acid sequence having at least 94%, at least 95%, at least 96%, at least 97%, at least 98%, or at least 99% sequence identity to SEQ ID NO: 12.

In a further embodiment of the invention the at least one enzyme has mannan degrading activity. The mannanases comprised in the detergent composition of the invention are suitable for degrading and modifying mannan containing material in various chemical environments, preferably in detergent compositions.

In one embodiment of the present invention the detergent composition further comprises one or more additional enzymes selected from the group consisting of protease, lipase, cutinase, amylase, carbohydrase, cellulase, pectinase, pectatlyase, mannanase, arabinase, galactanase, xylanase, oxidase, xanthanase, laccase, and/or peroxidase, preferably selected from the group consisting of proteases, amylases, cellulases and lipases.

In a further embodiment of the present invention the detergent composition is in form of a bar, a homogenous tablet, a tablet having two or more layers, a pouch having one or more compartments, a regular or compact powder, a granule, a paste, a gel, or a regular, compact or concentrated liquid. In one embodiment the detergent composition can be a laundry detergent composition, preferably a liquid or solid laundry detergent composition.

The present invention furthermore relates to the use of the detergent composition as herein disclosed for degrading mannan.

In a further embodiment the present invention relates to the use of the detergent composition as herein disclosed in a laundry process.

The present invention furthermore relates to a method for removing a stain from a surface, comprising contacting the surface with a detergent composition as herein disclosed.

The present invention also relates to a method for degrading mannan comprising applying a detergent composition as herein disclosed to mannan, preferably wherein the mannan is on the surface of a textile.

SEQUENCE LISTINGS

Figure 1:
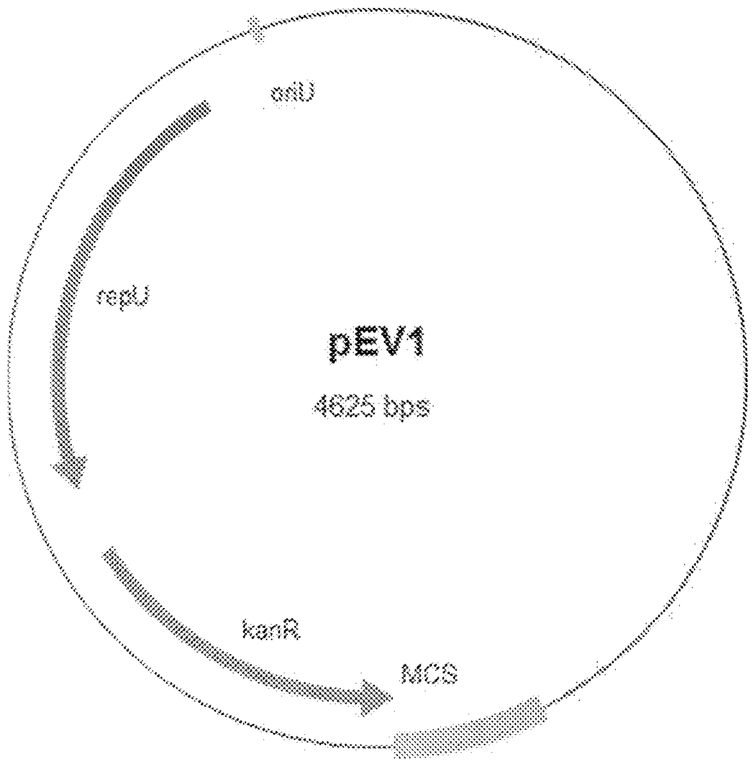
FIG. 1 shows a schematic representation of vector pEV1 for replication in *Bacillus*

SEQ ID NO: 1 Sequence of the oligonucleotide primer Man6_1

SEQ ID NO: 2 Sequence of the oligonucleotide primer Man6_2

SEQ ID NO: 3 Sequence of the oligonucleotide primer Man7_1

SEQ ID NO: 4 Sequence of the oligonucleotide primer Man7_2

SEQ ID NO: 5 Sequence of the oligonucleotide primer Man14_1

SEQ ID NO: 6 Sequence of the oligonucleotide primer Man14_2

SEQ ID NO: 7 Sequence of the oligonucleotide primer Vec_1

SEQ ID NO: 8 Sequence of the oligonucleotide primer Vec_2

SEQ ID NO: 9 The nucleotide sequence of the *Bacillus clausii* man6

SEQ ID NO: 10 The nucleotide sequence of the *Bacillus clausii* man6 without signal peptide encoding sequence and with codon optimization to *Trichoderma reesei*

SEQ ID NO: 11 The deduced amino acid sequence of the *Bacillus clausii Man*6

SEQ ID NO: 12 The deduced amino acid sequence of the *Bacillus clausii* Man6 without signal peptide SEQ ID NO: 13 The nucleotide sequence of the *Bacillus hemicellulosilyticus* man7

SEQ ID NO:14 The nucleotide sequence of the *Bacillus hemicellulosilyticus* man7 without signal peptide encoding sequence and with codon optimization to *Trichoderma reesei*

SEQ ID NO: 15 The deduced amino acid sequence of the *Bacillus hemicellulosilyticus* Man7

SEQ ID NO: 16 The deduced amino acid sequence of the *Bacillus hemicellulosilyticus* Man7 without signal peptide SEQ ID NO: 17 The nucleotide sequence of the *Virgibacillus soli* man14

SEQ ID NO: 18 The nucleotide sequence of the *Virgibacillus soli* man14 without signal peptide encoding sequence and with codon optimization to *Trichoderma* reesei SEQ ID NO: 19 The deduced amino acid sequence of the *Virgibacillus soli Man*14

SEQ ID NO: 20 The deduced amino acid sequence of the *Virgibacillus soli* Man14 without signal peptide SEQ ID NO: 21 Sequence of the oligonucleotide primer BMAN1

SEQ ID NO: 22 Sequence of the oligonucleotide primer BMAN2

SEQ ID NO: 23 Sequence of the oligonucleotide primer BMAN3

SEQ ID NO: 24 Sequence of the oligonucleotide primer BMAN4

SEQ ID NO: 25 The nucleotide sequence of *Bacillus pumilus* man31

SEQ ID NO: 26 The deduced amino acid sequence of the *Bacillus pumilus* Man31

SEQ ID NO: 27 The nucleotide sequence of the *Bacillus amyloliquefaciens* man32

SEQ ID NO: 28 The deduced amino acid sequence of the *Bacillus amyloliquefaciens* Man32

SEQ ID NO: 29 The nucleotide sequence of the *Amphibacillus xylanus* man33

SEQ ID NO: 30 The deduced amino acid sequence of the *Amphibacillus xylanus* Man33

SEQ ID NO: 31 The nucleotide sequence of the *Paenibacillus polymyxa* man34

SEQ ID NO: 32 The deduced amino acid sequence of the *Paenibacillus polymyxa* Man34

SEQ ID NO: 33 The nucleotide sequence of the *Bacillus hemicellulosilyticus* man35

SEQ ID NO: 34 The deduced amino acid sequence of the *Bacillus hemicellulosilyticus* Man35

SEQ ID NO: 35 The nucleotide sequence of the *Bacillus alcalophilus man*36

SEQ ID NO: 36 The deduced amino acid sequence of the *Bacillus alcalophilus* Man36

SEQ ID NO: 37 The nucleotide sequence of the *Bacillus* sp. man37

SEQ ID NO: 38 The deduced amino acid sequence of the *Bacillus* sp. Man37

SEQ ID NO: 39 The nucleotide sequence of the *Bacillus circulans* man38

SEQ ID NO: 40 The deduced amino acid sequence of the *Bacillus circulans* Man38

SEQ ID NO: 41 The nucleotide sequence of the *Paenibacillus* sp. man39

SEQ ID NO: 42 The deduced amino acid sequence of the *Paenibacillus* sp. Man39

SEQ ID NO: 43 The nucleotide sequence of the *Bacillus circulans* man40

SEQ ID NO: 44 The deduced amino acid sequence of the *Bacillus circulans* Man40

SEQ ID NO: 45 The nucleotide sequence of the *Bacillus nealsonii* man41

SEQ ID NO: 46 The deduced amino acid sequence of the *Bacillus nealsonii* Man41

SEQ ID NO: 47 The nucleotide sequence of the *Bacillus circulans* man42

SEQ ID NO: 48 The nucleotide sequence of the *Bacillus circulans* Man42

DETAILED DESCRIPTION

As used herein, "isolated" means a substance in a form or environment that does not occur in nature. Non-limiting examples of isolated substances include (1) any non-naturally occurring substance, (2) any substance including any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing or decreasing the amount of the substance relative to other components with which it is naturally associated (e.g., recombinant production in a host cell; one or multiple copies of a gene encoding the substance; and use of an alternative promoter to the promoter naturally associated with the gene encoding the substance). In an embodiment a polypeptide, enzyme, polynucleotide, host cell or composition of the invention is isolated.

As used herein, the term "comprising" includes the broader meanings of "including", "containing", and "comprehending", as well as the narrower expressions "consisting of" and "consisting only of".

As used herein, "fragment" means a protein or a polynucleotide having one or more amino acids or nucleotides deleted. In the context of DNA, a fragment includes both single stranded and double stranded DNA of any length. A fragment may be an active fragment which has the biological function, such as enzyme activity or regulatory activity, of the protein or the polynucleotide. A fragment may also be an inactive fragment, i.e. it does not have one or more biological effects of the native protein or polynucleotide.

As used herein, "variant" means a fragment of sequence (nucleotide or amino acid) inserted or deleted by one or more nucleotides/amino acids or which is chemically modified.

As used herein, a "peptide" and a "polypeptide" are amino acid sequences including a plurality of consecutive polymerized amino acid residues. For purpose of this invention, peptides are molecules including up to 20 amino acid residues, and polypeptides include more than 20 amino acid residues. The peptide or polypeptide may include modified amino acid residues, naturally occurring amino acid residues not encoded by a codon, and non-naturally occurring amino acid residues. As used herein, a "protein" may refer to a peptide or a polypeptide of any size. A protein may be an enzyme, a protein, an antibody, a membrane protein, a peptide hormone, regulator, or any other protein.

The term "polynucleotide" denotes a single- or double-stranded polymer of deoxyribonucleotide or ribonucleotide bases read from the 5' to the 3' end. Polynucleotides include RNA and DNA, and may be isolated from natural sources, synthesized in vitro, or prepared from a combination of natural and synthetic molecules.

As used herein, "modification", "modified", and similar terms in the context of polynucleotides refer to modification in a coding or a non-coding region of the polynucleotide, such as a regulatory sequence, 5' untranslated region, 3' untranslated region, up-regulating genetic element, down-regulating genetic element, enhancer, suppressor, promoter, exon, or intron region. The modification may in some embodiments be only structural, having no effect on the biological effect, action or function of the polynucleotide. In other embodiments the modification is a structural modification which provides a change in the biological effect, action or function of the polynucleotide. Such a modification may enhance, suppress or change the biological function of the polynucleotide.

As used herein, "identity" means the percentage of exact matches of amino acid residues between two aligned sequences over the number of positions where there are residues present in both sequences. When one sequence has a residue with no corresponding residue in the other sequence, the alignment program allows a gap in the alignment, and that position is not counted in the denominator of the identity calculation. Identity is a value determined with the Pairwise Sequence Alignment tool EMBOSS Needle at the EMBL-EBI web site (www.ebi.ac.uk/Tools/psa/emboss_needle/).

As used herein, "host cell" means any cell type that is susceptible to transformation, transfection, transduction, mating, crossing or the like with a nucleic acid construct or expression vector comprising a polynucleotide. The term "host cell" encompasses any progeny that is not identical due to mutations that occur during replication. Non-limiting examples of a host cell are fungal cells, filamentous fungal cells from Division Ascomycota, Subdivision Pezizomycotina; preferably from the group consisting of members of the Class Sordariomycetes, Subclass Hypocreomycetidae, Orders Hypocreales and Microascales and *Aspergillus, Chrysosporium, Myceliophthora* and *Humicola*; more preferably from the group consisting of Families Hypocreacea, Nectriaceae, Clavicipitaceae, Microascaceae, and Genera *Trichoderma* (anamorph of *Hypocrea*), *Fusarium, Gibberella, Nectria, Stachybotrys, Claviceps, Metarhizium, Villosiclava, Ophiocordyceps, Cephalosporium*, and *Scedosporium*; more preferably from the group consisting of *Trichoderma reesei* (*Hypocrea jecorina*), *T. citrinoviridae, T. longibrachiatum, T. virens, T. harzianum, T. asperellum, T. atroviridae, T. parareesei, Fusarium oxysporum, F. gramineanum, F. pseudograminearum, F. venenatum, Gibberella fujikuroi, G. moniliformis, G. zeaea, Nectria* (*Haematonectria*) *haematococca, Stachybotrys chartarum, S. chlorohalonata, Claviceps purpurea, Metarhizium acridum, M. anisopliae, Villosiclava virens, Ophiocordyceps sinensis, Acremonium* (*Cephalosporium*) *chrysogenum*, and *Scedosporium apiospermum*, and *Aspergillus niger, Aspergillus awamori, Aspergillus oryzae, Chrysosporium lucknowense, Myceliophthora thermophila, Humicola insolens*, and *Humicola grisea*, most preferably *Trichoderma reesei*. Non-limiting examples of a host cell are bacterial cells, preferably gram positive Bacilli (e.g. *B. subtilis, B. licheniformis, B. megaterium, B. amyloliquefaciens, B. pumilus*), actinomycetales (e.g. *Streptomyces* sp.) and yeasts (e.g. *Saccharomyces cerevisiae, Pichia pastoris, Yarrowia lipolytica*)

In an example embodiment of the host cell is a fungal cell, preferably a filamentous fungal cell, such as *Trichoderma* or *Trichoderma reesei*. In an example embodiment of the host cell is a bacterial cell, preferably a gram positive *Bacillus* cell, such as *B. subtilis, B. licheniformis, B. megaterium, B. amyloliquefaciens, B. pumilus.*

A "recombinant cell" or "recombinant host cell" refers to a cell or host cell that has been genetically modified or altered to comprise a nucleic acid sequence which is not native to said cell or host cell. In an embodiment the genetical modification comprises integrating the polynucleotide in the genome of the host cell. In another embodiment the polynucleotide is exogenous compared to the host cell.

As used herein, "expression" includes any step involved in the production of a polypeptide in a host cell including, but not limited to, transcription, translation, post-translational modification, and secretion. Expression may be followed by the harvesting, i.e. recovering, the host cells or the expressed product.

The term "expression vector" denotes a DNA molecule, linear or circular, that comprises a segment encoding a polypeptide of interest operably linked to additional segments that provide for its transcription. Such additional segments may include promoter and terminator sequences, and may optionally include one or more origins of replication, one or more selectable markers, an enhancer, a polyadenylation signal, carrier and the like. Expression vectors are generally derived from plasmid or viral DNA, or may contain elements of both. The expression vector may be any expression vector that is conveniently subjected to recombinant DNA procedures, and the choice of vector will often depend on the host cell into which the vector is to be introduced. Thus, the vector may be an autonomously replicating vector, i.e. a vector, which exists as an extrachromosomal entity, the replication of which is independent of chromosomal replication, e.g. a plasmid. Alternatively, the vector may be one which, when introduced into a host cell, is integrated into the host cell genome and replicated together with the chromosome(s) into which it has been integrated.

The term "recombinant expressed" or "recombinantly expressed" used herein in connection with expression of a polypeptide or protein is defined according to the standard definition in the art.

The term "obtained from" and "obtainable" as used herein in connection with a specific microbial source, means that the polynucleotide and/or polypeptide is produced by the specific source (homologous expression), or by a cell in which a gene from the source has been inserted (heterologous expression).

The term "enzyme composition" means either a conventional enzymatic fermentation product, possibly isolated and purified, from a single species of a microorganism, such preparation usually comprising a number of different enzymatic activities; or a mixture of monocomponent enzymes, preferably enzymes derived from bacterial or fungal species by using conventional recombinant techniques, which enzymes have been fermented and possibly isolated and purified separately and which may originate from different species, preferably fungal or bacterial species or the fermentation product of a microorganism which acts as a host cell for expression of a recombinant mannanase, but which microorganism simultaneously produces other enzymes.

The term "operably linked", when referring to DNA segments, denotes that the segments are arranged so that they function in concert for their intended purposes, e.g. transcription initiates in the promoter and proceeds through the coding segment to the terminator The term "promoter" denotes a portion of a gene containing DNA sequences that provide for the binding of RNA polymerase and initiation of transcription. Promoter sequences are commonly, but not always, found in the 5' non-coding regions of genes.

The term "secretory signal sequence" denotes a DNA sequence that encodes a polypeptide (a "secretory peptide") that, as a component of a larger polypeptide, directs the larger polypeptide through a secretory pathway of a host cell in which it is synthesized. The secretory signal sequence can be native or it can be replaced with secretory signal sequence or carrier sequence from another source. Depending on the host cell, the larger peptide may be cleaved to remove the secretory peptide during transit through the secretory pathway.

The term "core region" denotes a domain of an enzyme which may or may not have been modified or altered, but which has retained its original activity; the catalytic domain as known in the art has remained functional.

By the term "linker" or "spacer" is meant a polypeptide comprising at least two amino acids which may be present between the domains of a multidomain protein, for example an enzyme comprising an enzyme core and a binding domain such as a carbohydrate binding module (CBM) or any other enzyme hybrid, or between two proteins or polypeptides expressed as a fusion polypeptide, for example a fusion protein comprising two core enzymes. For example, the fusion protein of an enzyme core with a CBM is provided by fusing a DNA sequence encoding the enzyme core, a DNA sequence encoding the linker and a DNA sequence encoding the CBM sequentially into one open reading frame and expressing this construct.

The term "detergent composition", includes unless otherwise indicated, granular or powder-form all-purpose or heavy-duty washing agents, especially cleaning detergents; liquid, gel or paste-form all-purpose washing agents, especially the so-called heavy-duty liquid (HDL) types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, car or carpet shampoos, bathroom cleaners; metal cleaners; as well as cleaning auxiliaries such as bleach additives and "stain-stick" or pre-treat types. The terms "detergent composition" and "detergent formulation" are used in reference to mixtures which are intended for use in a wash medium for the cleaning of soiled objects. In some embodiments, the term is used in reference to laundering fabrics and/or garments (e.g., "laundry detergents"). In alternative embodiments, the term refers to other detergents, such as those used to clean dishes, cutlery, etc. (e.g., "dishwashing detergents"). It is not intended that the present invention be limited to any particular detergent formulation or composition. It is intended that in addition to the variants according to the invention, the term encompasses detergents that may contain, e.g., surfactants, builders, chelators or chelating agents, bleach system or bleach components, polymers, fabric conditioners, foam boosters, suds suppressors, dyes, perfume, tannish inhibitors, optical brighteners, bactericides, fungicides, soil suspending agents, anticorrosion agents, enzyme inhibitors or stabilizers, enzyme activators, transferase(s), hydrolytic enzymes, oxido reductases, bluing agents and fluorescent dyes, antioxidants, and solubilizers.

The term "textile" means any textile material including yarns, yarn intermediates, fibers, non-woven materials, natural materials, synthetic materials, and any other textile material, fabrics made of these materials and products made from fabrics (e.g., garments and other articles). The textile or fabric may be in the form of knits, wovens, denims, non-wovens, felts, yarns, and towelling. The textile may be cellulose based such as natural cellulosics, including cotton, flax/linen, jute, ramie, sisal or coir or manmade cellulosics (e.g. originating from wood pulp) including viscose/rayon, ramie, cellulose acetate fibers (tricell), lyocell or blends thereof. The textile or fabric may also be non-cellulose based such as natural polyamides including wool, camel, cashmere, mohair, rabbit and silk or synthetic polymer such as nylon, aramid, polyester, acrylic, polypropylene and spandex/elastane, or blends thereof as well as blend of cellulose based and non-cellulose based fibers. Examples of blends are blends of cotton and/or rayon/viscose with one or more companion material such as wool, synthetic fibers (e.g. polyamide fibers, acrylic fibers, polyester fibers, polyvinyl alcohol fibers, polyvinyl chloride fibers, polyurethane fibers, polyurea fibers, aramid fibers), and cellulose-containing fibers (e.g. rayon/viscose, ramie, flax/linen, jute, cellulose acetate fibers, lyocell). Fabric may be conventional washable laundry, for example stained household laundry. When the term fabric or garment is used it is intended to include the broader term textiles as well.

The term "stability" includes storage stability and stability during use, e.g. during a wash process (in wash stability) and reflects the stability of the protease variant according to the invention as a function of time e.g. how much activity is retained when the protease is kept in solution, in particular in a detergent solution. The stability is influenced by many factors e.g. pH, temperature, detergent composition e.g. amount of builder, surfactants etc. The protease stability may be measured using the 'stability assay' as described in the Materials and Methods section herein. The term "improved stability" or "increased stability" is defined herein as a variant protease displaying an increased stability in solutions, relative to the stability of the parent protease. The terms "improved stability" and "increased stability" includes "improved chemical stability", "detergent stability" or "improved detergent stability.

Detergent Composition

The present invention relates to novel detergent compositions comprising bacterial mannanase enzymes. The detergent compositions comprising bacterial mannanases are useful in laundry and cleaning applications wherein degradation or modification of mannan is desired. The invention also relates to the use of said detergent compositions in laundry and cleaning applications as well as a method for degrading mannan.

As used herein, the term "mannan" refers to polysaccharides consisting of a mannose backbone linked together by β-1,4-linkages with side-chains of galactose attached to the backbone by α-1,6-linkages. Mannans comprise plant based material such as guar gum and locust bean gum. Glucomannans are polysaccharides having a backbone of more or less regularly alternating β-1,4 linked mannose and glucose, galactomannans and galactoglucomannans are mannans and glucomannans with alpha-1,6 linked galactose sidebranches.

As used herein, the term "mannanase" or "galactomannanase" denotes a mannanase enzyme defined according to the art as mannan endo-1,4-beta-mannosidase and having the alternative names beta-mannanase and endo-1,4-mannanase and catalysing hydrolysis of 1,4-beta-D-mannosidic linkages in mannans, galactomannans, glucomannans, and galactoglucomannans. Mannanases are classified according to the Enzyme Nomenclature as EC 3.2.1.78.

"Mannanase activity" as used herein refers to the mannan degrading activity of a polypeptide. Degrading or modifying as used herein means that mannose units are hydrolyzed from the mannan polysaccharide by the mannanase. The mannan degrading activity of the polypeptides according to present invention can be tested according to standard test procedures known in the art. Example 7 provides an example of a standard method for determining mannanase activity.

According to the first aspect the detergent composition of the present invention comprises at least one enzyme having an amino acid sequence having at least 74% sequence identity to the amino acid sequence of SEQ ID NO: 16 (Man7), and/or 93% sequence identity to the amino acid sequence of SEQ ID NO: 12 (Man6), and/or 79% sequence identity to the amino acid sequence of SEQ ID NO: 20 (Man14).

In one embodiment of the invention the at least one enzyme has an amino acid sequence having at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the amino acid sequence of SEQ ID NO: 16.

In one embodiment of the invention the at least one enzyme has an amino acid sequence having at least 94%, at least 95%, at least 96%, at least 97%, at least 98%, or at least 99% sequence identity to the amino acid sequence of SEQ ID NO: 12.

In a further embodiment of the invention the at least one enzyme has mannan degrading activity. The mannanases comprised in the detergent composition of the invention are suitable for degrading and modifying mannan containing material in various chemical environments, preferably in detergent compositions.

In one embodiment of the present invention the detergent composition further comprises one or more additional enzymes selected from the group consisting of protease, lipase, cutinase, amylase, carbohydrase, cellulase, pectinase, pectatlyase, mannanase, arabinase, galactanase, xylanase, oxidase, xanthanase, laccase, and/or peroxidase, preferably selected from the group consisting of proteases, amylases, cellulases and lipases.

In general the properties of the selected enzyme(s) should be compatible with the selected detergent, (i.e., pH-optimum, compatibility with other enzymatic and non-enzymatic ingredients, etc.), and the enzyme(s) should be present in effective amounts.

Cellulases

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259. Especially suitable cellulases are the alkaline or neutral cellulases having color care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299. Example of cellulases exhibiting endo-beta-1,4-glucanase activity (EC 3.2.1.4) are those having described in WO02/099091. Other examples of cellulases include the family 45 cellulases described in WO96/29397, and especially variants thereof having substitution, insertion and/or deletion at one or more of the positions corresponding to the following positions in SEQ ID NO: 8 of WO 02/099091: 2, 4, 7, 8, 10, 13, 15, 19, 20, 21, 25, 26, 29, 32, 33, 34, 35, 37, 40, 42, 42a, 43, 44, 48, 53, 54, 55, 58, 59, 63, 64, 65, 66, 67, 70, 72, 76, 79, 80, 82, 84, 86, 88, 90, 91, 93, 95, 95d, 95h, 95j, 97, 100, 101, 102, 103, 113, 114, 117, 119, 121, 133, 136, 137, 138, 139, 140a, 141, 143a, 145, 146, 147, 150e, 150j, 151, 152, 153, 154, 155, 156, 157, 158, 159, 160c, 160e, 160k, 161, 162, 164, 165, 168, 170, 171, 172, 173, 175, 176, 178, 181, 183, 184, 185, 186, 188, 191, 192, 195, 196, 200, and/or 20, preferably selected among P19A, G20K, Q44K, N48E, Q119H or Q146 R. Commercially available cellulases include Celluclean™ Celluzyme™, and Carezyme™ (Novozymes A/S), Clazinase™, and Puradax HA™ (Genencor International Inc.), and KAC-500(B)™ (Kao Corporation).

Proteases

Suitable proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the 51 family, such as trypsin, or the S8 family such as subtilisin. A metalloproteases protease may for example be a thermolysin from e g family M4 or other metalloprotease such as those from M5, M7 or M8 families.

The term "subtilases" refers to a sub-group of serine protease according to Siezen et al., Protein Engng. 4 (1991) 719-737 and Siezen et al. Protein Science 6 (1997) 501-523. Serine proteases are a subgroup of proteases characterized by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin *lentus*, subtilisin *novo*, subtilisin Carlsberg, *Bacillus licheniformis*, subtilisin BPN', subtilisin 309, subtilisin 147 and subtilisin 168 described in WO89/06279 and protease PD138 described in (WO93/18140). Other useful proteases may be those described in WO92/175177, WO01/016285, WO02/026024 and WO02/016547. Examples of trypsin-like proteases are trypsin (e.g. of porcine or bovine origin) and the *Fusarium* protease described in WO89/06270, WO94/25583 and WO05/040372, and the chymotrypsin proteases derived from Cellumonas described in WO05/052161 and WO05/052146. A further preferred protease is the alkaline protease from *Bacillus lentus* DSM 5483, as described for example in WO95/23221, and variants thereof, which are described in WO92/21760, WO95/23221, EP1921147 and EP1921148. Examples of metalloproteases are the neutral metalloprotease as described in WO07/044993 (Genencor Int.) such as those derived from *Bacillus amyloliquefaciens.*

Examples of useful proteases are the variants described in: WO92/19729, WO96/034946, WO98/20115, WO98/20116, WO99/011768, WO01/44452, WO03/006602, WO04/03186, WO04/041979, WO07/006305, WO11/036263, WO11/036264, especially the variants with substitutions in one or more of the following positions: 3, 4, 9, 15, 27, 36, 57, 68, 76, 87, 95, 96, 97, 98, 99, 100, 101, 102, 103, 104, 106, 118, 120, 123, 128, 129, 130, 160, 167, 170, 194, 195, 199, 205, 206, 217, 218, 222, 224, 232, 235, 236, 245, 248, 252 and 274 using the BPN' numbering. More preferred the subtilase variants may comprise the mutations: S3T, V4I, S9R, A15T, K27R, *36D, V68A, N76D, N87S,R, *97E, A98S, S99G,D,A, S99AD, S101G,M,R S103A, V104I,Y,N, S106A, G118V,R, H120D,N, N123S, S128L, P129Q, S130A, G160D, Y167A, R170S, A194P, G195E, V199M, V205I, L217D, N218D, M222S, A232V, K235L, Q236H, Q245R, N252K, T274A (using BPN' numbering). Suitable commercially available protease enzymes include those sold under the trade names Alcalase®, Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® (Novozymes A/S), those sold under the tradename Maxatase®, Maxacal®, Maxapem®, Purafect®, Purafect Prime®, Preferenz™, Purafect MA®, Purafect Ox®, Purafect OxP®, Puramax®, Properase®, Effectenz™, FN2®, FN3®, FN4®, Excellase®, Opticlean® and Optimase® (Danisco/DuPont), Axapem™ (Gist-Brocases N.V.), BLAP (sequence shown in FIG. 29 of U.S. Pat. No. 5,352,604) and variants hereof (Henkel AG) and KAP (*Bacillus alkalophilus* subtilisin) from Kao.

Lipases and Cutinases

Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*) as described in EP258068 and EP305216, cutinase from *Humicola*, e.g. *H. insolens* (WO96/13580), lipase from strains of *Pseudomonas* (some of these now renamed to *Burkholderia*), e.g. *P. alcaligenes* or *P. pseudoalcaligenes* (EP218272), *P. cepacia* (EP331376), P. sp. strain SD705 (WO95/06720 & WO96/27002), *P. wisconsinensis* (WO96/12012), GDSL-type *Streptomyces* lipases (WO10/065455), cutinase from *Magnaporthe grisea* (WO10/107560), cutinase from *Pseudomonas mendocina* (U.S. Pat. No. 5,389,536), lipase from *Thermobifida fusca* (WO11/084412), *Geobacillus stearothermophilus* lipase (WO11/084417), lipase from *Bacillus subtilis* (WO11/084599), and lipase from *Streptomyces griseus* (WO11/150157) and *S. pristinaespiralis* (WO12/137147).

Other examples are lipase variants such as those described in EP407225, WO92/05249, WO94/01541, WO94/25578, WO95/14783, WO95/30744, WO95/35381, WO95/22615, WO96/00292, WO97/04079, WO97/07202, WO00/34450, WO00/60063, WO01/92502, WO07/87508 and WO09/109500.

Preferred commercial lipase products include Lipolase™, Lipex™; Lipolex™ and Lipoclean™ (Novozymes A/S), Lumafast (originally from Genencor) and Lipomax (originally from Gist-Brocades).

Still other examples are lipases sometimes referred to as acyltransferases or perhydrolases, e.g. acyltransferases with homology to *Candida antarctica* lipase A (WO10/111143), acyltransferase from *Mycobacterium smegmatis* (WO05/56782), perhydrolases from the CE 7 family (WO09/67279), and variants of the *M. smegmatis* perhydrolase in particular the S54V variant used in the commercial product Gentle Power Bleach from Huntsman Textile Effects Pte Ltd (WO10/100028).

Amylases

Suitable amylases which can be used together with subtilase variants of the invention may be an alpha-amylase or a glucoamylase and may be of bacterial or fungal origin. Chemically modified or protein engineered mutants are included. Amylases include, for example, alpha-amylases obtained from *Bacillus*, e.g., a special strain of *Bacillus licheniformis*, described in more detail in GB 1,296,839.

Suitable amylases include amylases having SEQ ID NO: 3 in WO 95/10603 or variants having 90% sequence identity to SEQ ID NO: 3 thereof. Preferred variants are described in WO 94/02597, WO 94/18314, WO 97/43424 and SEQ ID NO: 4 of WO 99/019467, such as variants with substitutions in one or more of the following positions: 15, 23, 105, 106, 124, 128, 133, 154, 156, 178, 179, 181, 188, 190, 197, 201, 202, 207, 208, 209, 211, 243, 264, 304, 305, 391, 408, and 444.

Different suitable amylases include amylases having SEQ ID NO: 6 in WO 02/010355 or variants thereof having 90% sequence identity thereto. Preferred variants are those having a deletion in positions 181 and 182 and a substitution in position 193.

Other amylases, which are suitable are hybrid alpha-amylase comprising residues 1-33 of the alpha-amylase derived from *B. amyloliquefaciens* shown in SEQ ID NO: 6 of WO 2006/066594 and residues 36-483 of the *B. licheniformis* alpha-amylase shown in SEQ ID NO: 4 of WO 2006/066594 or variants having 90% sequence identity thereof. Preferred variants of this hybrid alpha-amylase are those having a substitution, a deletion or an insertion in one of more of the following positions: G48, T49, G107, H156, A181, N190, M197, 1201, A209 and Q264. Most preferred variants of the hybrid alpha-amylase comprising residues 1-33 of the alpha-amylase derived from *B. amyloliquefaciens* shown in SEQ ID NO: 6 of WO 2006/066594 and residues 36-483 of SEQ ID NO: 4 of WO2006/066594 are those having the substitutions:

M197T;

H156Y+A181T+N190F+A209V+Q264S; or

G48A+T491+G107A+H156Y+A181T+N190F+I201F+A209V+Q264S.

Further amylases which are suitable are amylases having SEQ ID NO: 6 in WO 99/019467 or variants thereof having 90% sequence identity to SEQ ID NO: 6. Preferred variants of SEQ ID NO: 6 are those having a substitution, a deletion or an insertion in one or more of the following positions: R181, G182, H183, G184, N195, 1206, E212, E216 and K269. Particularly preferred amylases are those having deletion in positions R181 and G182, or positions H183 and G184.

Additional amylases which can be used are those having SEQ ID NO: 1, SEQ ID NO: 3, SEQ ID NO: 2 or SEQ ID NO: 7 of WO 96/023873 or variants thereof having 90% sequence identity to SEQ ID NO: 1, SEQ ID NO: 2, SEQ ID NO: 3 or SEQ ID NO: 7. Preferred variants of SEQ ID NO: 1, SEQ ID NO: 2, SEQ ID NO: 3 or SEQ ID NO: 7 are those having a substitution, a deletion or an insertion in one or more of the following positions: 140, 181, 182, 183, 184, 195, 206, 212, 243, 260, 269, 304 and 476. More preferred variants are those having a deletion in positions 181 and 182 or positions 183 and 184. Most preferred amylase variants of SEQ ID NO: 1, SEQ ID NO: 2 or SEQ ID NO: 7 are those having a deletion in positions 183 and 184 and a substitution in one or more of positions 140, 195, 206, 243, 260, 304 and 476.

Other amylases which can be used are amylases having SEQ ID NO: 2 of WO 08/153815, SEQ ID NO: 10 in WO 01/66712 or variants thereof having 90% sequence identity to SEQ ID NO: 2 of WO 08/153815 or 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 09/061380 or variants having 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, 5125, N128, T131, T165, K178, R180, 5181, T182, G183, M201, F202, N225, 5243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T131I, T165I, K178L, T182G, M201L, F202Y, N225E,R, N272E,R, S243Q,A,E,D, Y305R, R309A, Q320R, Q359E, K444E and G475K and/or deletion in position R180 and/or 5181 or of T182 and/or G183. Most preferred amylase variants of SEQ ID NO: 2 are those having the substitutions:

N128C+K178L+T182G+Y305R+G475K;

N128C+K178L+T182G+F202Y+Y305R+D319T+G475K;

5125A+N128C+K178L+T182G+Y305R+G475K; or

S125A+N128C+T131I+T165I+K178L+T182G+Y305R+G475K wherein the variants are C-terminally truncated and optionally further comprises a substitution at position 243 and/or a deletion at position 180 and/or position 181.

Other suitable amylases are the alpha-amylase having SEQ ID NO: 12 in WO01/66712 or a variant having at least 90% sequence identity to SEQ ID NO: 12. Preferred amylase variants are those having a substitution, a deletion or an insertion in one of more of the following positions of SEQ ID NO: 12 in WO01/66712: R28, R118, N174; R181, G182, D183, G184, G186, W189, N195, M202, Y298, N299, K302, 5303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions.

Other examples are amylase variants such as those described in WO2011/098531, WO2013/001078 and WO2013/001087.

Commercially available amylases are Duramyl™, Termamyl™, Fungamyl™, Stainzyme™, Stainzyme Plus™, Natalase™, Liquozyme X and BAN™ (from Novozymes A/S), and Rapidase™, Purastar™/Effectenz™, Powerase and Preferenz S100 (from Genencor International Inc./DuPont).

Peroxidases/Oxidases

Suitable peroxidases/oxidases include those of plant, bacterial or fungal origin. Chemically modified or protein engineered mutants are included. Examples of useful peroxidases include peroxidases from *Coprinus*, e.g., from *C. cinereus*, and variants thereof as those described in WO 93/24618, WO 95/10602, and WO 98/15257.

Commercially available peroxidases include Guardzyme™ (Novozymes A/S).

The detergent enzyme(s) may be included in a detergent composition by adding separate additives containing one or more enzymes, or by adding a combined additive comprising all of these enzymes. A detergent additive of the invention, i.e., a separate additive or a combined additive, can be formulated, for example, as a granulate, liquid, slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

A composition for use in solid laundry detergent, for example, may include 0.000001%-5%, such as 0.000005%-2%, such as 0.00001%-1%, such as 0.00001%-0.1% of enzyme protein by weight of the composition.

A composition for use in laundry liquid, for example, may include 0.000001%-3%, such as 0.000005-1%, such as 0.00001%-0.01% of enzyme protein by weight of the composition.

A composition for use in automatic dishwash, for example, may include 0.000001%-5%, such as 0.000005%-2%, such as 0.00001%-1%, such as 0.00001%-0.1% of enzyme protein by weight of the composition.

The enzyme(s) of the detergent composition of the invention may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in, for example, WO92/19709 and WO92/19708.

In one embodiment, the invention is directed to detergent compositions comprising an enzyme of the present invention in combination with one or more additional cleaning composition components. The choice of additional components is within the skill of the artisan and includes conventional ingredients, including the exemplary non-limiting components set forth below.

The choice of components may include, for textile care, the consideration of the type of textile to be cleaned, the type and/or degree of soiling, the temperature at which cleaning is to take place, and the formulation of the detergent product. Although components mentioned below are categorized by general header according to a particular functionality, this is not to be construed as a limitation, as a component may comprise additional functionalities as will be appreciated by the skilled artisan.

Surfactants

The detergent composition may comprise one or more surfactants, which may be anionic and/or cationic and/or non-ionic and/or semi-polar and/or zwitterionic, or a mixture thereof. In a particular embodiment, the detergent composition includes a mixture of one or more nonionic surfactants and one or more anionic surfactants. The surfactant(s) is typically present at a level of from about 0.1% to 60% by weight, such as about 1% to about 40%, or about 3% to about 20%, or about 3% to about 10%. The surfactant(s) is chosen based on the desired cleaning application, and includes any conventional surfactant(s) known in the art. Any surfactant known in the art for use in detergents may be utilized.

When included therein the detergent will usually contain from about 1% to about 40% by weight, such as from about 5% to about 30%, including from about 5% to about 15%, or from about 20% to about 25% of an anionic surfactant. Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or soap, and combinations thereof.

When included therein the detergent will usually contain from about 0% to about 10% by weight of a cationic surfactant. Non-limiting examples of cationic surfactants include alklydimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, and combinations thereof.

When included therein the detergent will usually contain from about 0.2% to about 40% by weight of a non-ionic surfactant, for example from about 0.5% to about 30%, in particular from about 1% to about 20%, from about 3% to about 10%, such as from about 3% to about 5%, or from about 8% to about 12%. Non-limiting examples of non-ionic surfactants include alcohol ethoxylates (AE or AEO), alcohol propoxylates, propoxylated fatty alcohols (PFA), alkoxylated fatty acid alkyl esters, such as ethoxylated and/or propoxylated fatty acid alkyl esters, alkylphenol ethoxylates (APE), nonylphenol ethoxylates (NPE), alkylpolyglycosides (APG), alkoxylated amines, fatty acid monoethanolamides (FAM), fatty acid diethanolamides (FADA), ethoxylated fatty acid monoethanolamides (EFAM), propoxylated fatty acid monoethanolamides (PFAM), polyhydroxy alkyl fatty acid amides, or N-acyl N-alkyl derivatives of glucosamine (glucamides, GA, or fatty acid glucamide, FAGA), as well as products available under the trade names SPAN and TWEEN, and combinations thereof.

When included therein the detergent will usually contain from about 0% to about 10% by weight of a semipolar surfactant. Non-limiting examples of semipolar surfactants include amine oxides (AO) such as alkyldimethylamineoxide, N-(coco alkyl)-N,N-dimethylamine oxide and N-(tallow-alkyl)-N,N-bis(2-hydroxyethyl)amine oxide, fatty acid alkanolamides and ethoxylated fatty acid alkanolamides, and combinations thereof.

When included therein the detergent will usually contain from about 0% to about 10% by weight of a zwitterionic surfactant. Non-limiting examples of zwitterionic surfactants include betaine, alkyldimethylbetaine, sulfobetaine, and combinations thereof.

Hydrotropes

A hydrotrope is a compound that solubilises hydrophobic compounds in aqueous solutions (or oppositely, polar substances in a non-polar environment). Typically, hydrotropes have both hydrophilic and a hydrophobic character (so-called amphiphilic properties as known from surfactants); however the molecular structure of hydrotropes generally do not favor spontaneous self-aggregation. Hydrotropes do not display a critical concentration above which self-aggregation occurs as found for surfactants and lipids forming miceller, lamellar or other well defined meso-phases. Instead, many hydrotropes show a continuous-type aggregation process where the sizes of aggregates grow as concentration increases. However, many hydrotropes alter the phase behavior, stability, and colloidal properties of systems containing substances of polar and non-polar character, including mixtures of water, oil, surfactants, and polymers. Hydrotropes are classically used across industries from pharma, personal care, food, to technical applications. Use of hydrotropes in detergent compositions allow for example more concentrated formulations of surfactants (as in the process of compacting liquid detergents by removing water) without inducing undesired phenomena such as phase separation or high viscosity.

The detergent may contain 0-5% by weight, such as about 0.5 to about 5%, or about 3% to about 5%, of a hydrotrope. Any hydrotrope known in the art for use in detergents may be utilized. Non-limiting examples of hydrotropes include sodium benzene sulfonate, sodium p-toluene sulfonate (STS), sodium xylene sulfonate (SXS), sodium cumene sulfonate (SCS), sodium cymene sulfonate, amine oxides, alcohols and polyglycolethers, sodium hydroxynaphthoate, sodium hydroxynaphthalene sulfonate, sodium ethylhexyl sulfate, and combinations thereof.

Builders and Co-Builders

The detergent composition may contain about 0-65% by weight, such as about 5% to about 45% of a detergent builder or co-builder, or a mixture thereof. In a dish wash detergent, the level of builder is typically 40-65%, particularly 50-65%. The builder and/or co-builder may particularly be a chelating agent that forms water-soluble complexes with Ca and Mg. Any builder and/or co-builder known in the art for use in laundry detergents may be utilized. Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Hoechst), ethanolamines such as 2-aminoethan-1-ol (MEA), diethanolamine (DEA, also known as iminodiethanol), triethanolamine (TEA, also known as 2,2',2"-nitrilotriethanol), and carboxymethyl inulin (CMI), and combinations thereof.

The detergent composition may also contain 0-20% by weight, such as about 5% to about 10%, of a detergent co-builder, or a mixture thereof. The detergent composition may include a co-builder alone, or in combination with a builder, for example a zeolite builder. Non-limiting examples of co-builders include homopolymers of polyacrylates or copolymers thereof, such as poly(acrylic acid) (PAA) or copoly(acrylic acid/maleic acid) (PAA/PMA). Further non-limiting examples include citrate, chelators such as aminocarboxylates, aminopolycarboxylates and phosphonates, and alkyl- or alkenylsuccinic acid. Additional specific examples include 2,2',2"-nitrilotriacetic acid (NTA), ethylenediaminetetraacetic acid (EDTA), diethylenetriaminepentaacetic acid (DTPA), iminodisuccinic acid (IDS), ethylenediamine-N,N'-disuccinic acid (EDDS), methylglycinediacetic acid (MGDA), glutamic acid-N,N-diacetic acid (GLDA), 1-hydroxyethane-1,1-diphosphonic acid (HEDP), ethylenediaminetetra-(methylenephosphonic acid) (EDTMPA), diethylenetriamine-pentakis(methylenephosphonic acid) (DTPMPA or DTMPA), N-(2-hydroxyethyl) iminodiacetic acid (EDG), aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl)-aspartic acid (SMAS), N-(2-sulfoethyl)-aspartic acid (SEAS), N-(2-sulfomethyl)-glutamic acid (SMGL), N-(2-sulfoethyl)-glutamic acid (SEGL), N-methyliminodiacetic acid (MIDA), α-alanine-N, N-diacetic acid (α-ALDA), serine-N, N-diacetic acid (SEDA), isoserine-N, N-diacetic acid (ISDA), phenylalanine-N, N-diacetic acid (PHDA), anthranilic acid-N, N-diacetic acid (ANDA), sulfanilic acid-N, N-diacetic acid (SLDA), taurine-N, N-diacetic acid (TUDA) and sulfomethyl-N, N-diacetic acid (SMDA), N-(2-hydroxyethyl)-ethylidenediamine-N, N', N'-triacetate (HEDTA), diethanolglycine (DEG), diethylenetriamine penta(methylenephosphonic acid) (DTPMP), aminotris(methylenephosphonic acid) (ATMP), and combinations and salts thereof. Further exemplary builders and/or co-builders are described in, e.g., WO 09/102854, U.S. Pat. No. 5,977,053

Bleaching Systems

The detergent may contain 0-50% by weight, such as about 0.1% to about 25%, of a bleaching system. Any bleaching system known in the art for use in laundry detergents may be utilized. Suitable bleaching system components include bleaching catalysts, photobleaches, bleach activators, sources of hydrogen peroxide such as sodium percarbonate and sodium perborates, preformed peracids and mixtures thereof. Suitable preformed peracids include, but are not limited to, peroxycarboxylic acids and salts, percarbonic acids and salts, perimidic acids and salts, peroxymonosulfuric acids and salts, for example, Oxone®, and mixtures thereof. Non-limiting examples of bleaching systems include peroxide-based bleaching systems, which may comprise, for example, an inorganic salt, including alkali metal salts such as sodium salts of perborate (usually mono- or tetra-hydrate), percarbonate, per-sulfate, perphosphate, persilicate salts, in combination with a peracid-forming bleach activator. The term bleach activator is meant herein as a compound which reacts with peroxygen bleach like hydrogen peroxide to form a peracid. The peracid thus formed constitutes the activated bleach. Suitable bleach activators to be used herein include those belonging to the class of esters amides, imides or anhydrides. Suitable examples are tetracetylethylene diamine (TAED), sodium 4-[(3,5,5-trimethylhexanoyl)oxy]benzene sulfonate (ISONOBS), diperoxy dodecanoic acid, 4-(dodecanoyloxy) benzenesulfonate (LOBS), 4-(decanoyloxy)benzenesulfonate, 4-(decanoyloxy)benzoate (DOBS), 4-(nonanoyloxy)-benzenesulfonate (NOBS), and/or those disclosed in WO98/17767. A particular family of bleach activators of interest was disclosed in EP624154 and particularly preferred in that family is acetyl triethyl citrate (ATC). ATC or a short chain triglyceride like triacetin has the advantage that it is environmental friendly as it eventually degrades into citric acid and alcohol. Furthermore acetyl triethyl citrate and triacetin has a good hydrolytical stability in the product upon storage and it is an efficient bleach activator. Finally ATC provides a good building capacity to the laundry additive. Alternatively, the bleaching system may comprise peroxyacids of, for example, the amide, imide, or sulfone type. The bleaching system may also comprise peracids such as 6-(phthalimido)peroxyhexanoic acid (PAP). The bleaching system may also include a bleach catalyst. In some embodiments the bleach component may be an organic catalyst selected from the group consisting of organic catalysts having the following formulae:

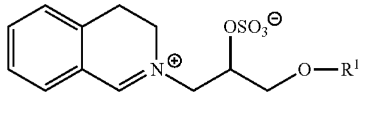

(i)

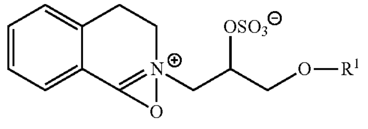

(ii)

(iii) and mixtures thereof; wherein each R 1 is independently a branched alkyl group containing from 9 to 24 carbons or linear alkyl group containing from 11 to 24 carbons, preferably each R 1 is independently a branched alkyl group containing from 9 to 18 carbons or linear alkyl group containing from 11 to 18 carbons, more preferably each R 1 is independently selected from the group consisting of 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl. Other exemplary bleaching systems are described, e.g. in WO2007/087258, WO2007/087244, WO2007/087259 and WO2007/087242. Suitable photobleaches may for example be sulfonated zinc phthalocyanine Polymers The detergent may contain 0-10% by weight, such as 0.5-5%, 2-5%, 0.5-2% or 0.2-1% of a polymer. Any polymer known in the art for use in detergents may be utilized. The polymer may function as a co-builder as mentioned above, or may provide antiredeposition, fiber protection, soil release, dye transfer inhibition, grease cleaning and/or anti-foaming properties. Some polymers may have more than one of the above-mentioned properties and/or more than one of the below-mentioned motifs. Exemplary polymers include (carboxymethyl)cellulose (CMC), poly(vinyl alcohol) (PVA), poly(vinylpyrrolidone) (PVP), poly(ethyleneglycol) or poly(ethylene oxide) (PEG), ethoxylated poly (ethyleneimine), carboxymethyl inulin (CMI), and polycarboxylates such as PAA, PAA/PMA, poly-aspartic acid, and lauryl methacrylate/acrylic acid copolymers, hydrophobically modified CMC (HM-CMC) and silicones, copolymers of terephthalic acid and oligomeric glycols, copolymers of poly(ethylene terephthalate) and poly (oxyethene terephthalate) (PET-POET), PVP, poly(vinylimidazole) (PVI), poly(vinylpyridine-N-oxide) (PVPO or PVPNO) and polyvinylpyrrolidone-vinylimidazole (PVPVI). Further exemplary polymers include sulfonated polycarboxylates, polyethylene oxide and polypropylene oxide (PEO-PPO) and diquaternium ethoxy sulfate. Other exemplary polymers are disclosed in, e.g., WO 2006/130575. Salts of the above-mentioned polymers are also contemplated.

Fabric Hueing Agents

The detergent compositions of the present invention may also include fabric hueing agents such as dyes or pigments, which when formulated in detergent compositions can deposit onto a fabric when said fabric is contacted with a wash liquor comprising said detergent compositions and thus altering the tint of said fabric through absorption/reflection of visible light. Fluorescent whitening agents emit at least some visible light. In contrast, fabric hueing agents alter the tint of a surface as they absorb at least a portion of the visible light spectrum. Suitable fabric hueing agents include dyes and dye-clay conjugates, and may also include pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof, for example as described in WO2005/03274, WO2005/03275, WO2005/03276 and EP1876226 (hereby incorporated by reference). The detergent composition preferably comprises from about 0.00003 wt % to about 0.2 wt %, from about 0.00008 wt % to about 0.05 wt %, or even from about 0.0001 wt % to about 0.04 wt % fabric hueing agent. The composition may comprise from 0.0001 wt % to 0.2 wt % fabric hueing agent, this may be especially preferred when the composition is in the form of a unit dose pouch. Suitable hueing agents are also disclosed in, e.g. WO 2007/087257 and WO2007/087243.

Adjunct Materials

Any detergent components known in the art for use in laundry detergents may also be utilized. Other optional detergent components include anti-corrosion agents, anti-shrink agents, anti-soil redeposition agents, anti-wrinkling agents, bactericides, binders, corrosion inhibitors, disintegrants/disintegration agents, dyes, enzyme stabilizers (including boric acid, borates, CMC, and/or polyols such as propylene glycol), fabric conditioners including clays, fillers/processing aids, fluorescent whitening agents/optical brighteners, foam boosters, foam (suds) regulators, perfumes, soil-suspending agents, softeners, suds suppressors, tarnish inhibitors, and wicking agents, either alone or in combination. Any ingredient known in the art for use in laundry detergents may be utilized. The choice of such ingredients is well within the skill of the artisan.

Dispersants: The detergent compositions of the present invention can also contain dispersants. In particular powdered detergents may comprise dispersants. Suitable water-soluble organic materials include the homo- or co-polymeric acids or their salts, in which the polycarboxylic acid comprises at least two carboxyl radicals separated from each other by not more than two carbon atoms. Suitable dispersants are for example described in Powdered Detergents, Surfactant science series volume 71, Marcel Dekker, Inc.

Dye Transfer Inhibiting Agents: The detergent compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Fluorescent whitening agent: The detergent compositions of the present invention will preferably also contain additional components that may tint articles being cleaned, such as fluorescent whitening agent or optical brighteners. Where present the brightener is preferably at a level of about 0.01% to about 0.5%. Any fluorescent whitening agent suitable for use in a laundry detergent composition may be used in the composition of the present invention. The most commonly used fluorescent whitening agents are those belonging to the classes of diaminostilbene-sulphonic acid derivatives, diarylpyrazoline derivatives and bisphenyl-distyryl derivatives. Examples of the diaminostilbene-sulphonic acid derivative type of fluorescent whitening agents include the sodium salts of: 4,4'-bis-(2-diethanolamino-4-anilino-s-triazin-6-ylamino) stilbene-2,2'-disulphonate; 4,4'-bis-(2,4-dianilino-s-triazin-6-ylamino) stilbene-2.2'-disulphonate; 4,4'-bis-(2-anilino-4(N-methyl-N-2-hydroxy-ethylamino)-s-triazin-6-ylamino) stilbene-2,2'-disulphonate, 4,4'-bis-(4-phenyl-2,1,3-triazol-2-yl)stilbene-2,2'-disulphonate; 4,4'-bis-(2-anilino-4(1-methyl-2-hydroxy-ethyl amino)-s-triazin-6-ylamino) stilbene-2,2'-disulphonate and 2-(stilbyl-4"-naptho-1,2':4,5)-1,2,3-trizole-2"-sulphonate. Preferred fluorescent whitening agents are Tinopal DMS and Tinopal CBS available from Ciba-Geigy AG, Basel, Switzerland. Tinopal DMS is the disodium salt of 4,4'-bis-(2-morpholino-4 anilino-s-triazin-6-ylamino) stilbene disulphonate. Tinopal CBS is the disodium salt of 2,2'-bis-(phenyl-styryl) disulphonate. Also preferred are fluorescent whitening agents is the commercially available Parawhite KX, supplied by Paramount Minerals and Chemicals, Mumbai, India. Other fluorescers suitable for use in the invention include the 1-3-diaryl pyrazolines and the 7-alkylaminocoumarins. Suitable fluorescent brightener levels include lower levels of from about 0.01, from 0.05, from about 0.1 or even from about 0.2 wt % to upper levels of 0.5 or even 0.75 wt %.

Soil release polymers: The detergent compositions of the present invention may also include one or more soil release polymers which aid the removal of soils from fabrics such as cotton and polyester based fabrics, in particular the removal of hydrophobic soils from polyester based fabrics. The soil release polymers may for example be nonionic or anionic terephthalate based polymers, polyvinyl caprolactam and related copolymers, vinyl graft copolymers, polyester polyamides see for example Chapter 7 in Powdered Detergents, Surfactant science series volume 71, Marcel Dekker, Inc. Another type of soil release polymers are amphiphilic alkoxylated grease cleaning polymers comprising a core structure and a plurality of alkoxylate groups attached to that core structure. The core structure may comprise a polyalkylenimine structure or a polyalkanolamine structure as described in detail in WO 2009/087523 (hereby incorporated by reference). Furthermore, random graft co-polymers are suitable soil release polymers Suitable graft co-polymers are described in more detail in WO 2007/138054, WO 2006/108856 and WO 2006/113314 (hereby incorporated by reference). Other soil release polymers are substituted polysaccharide structures especially substituted cellulosic structures such as modified cellulose deriviatives such as those described in EP 1867808 or WO 2003/040279 (both are hereby incorporated by reference). Suitable cellulosic polymers include cellulose, cellulose ethers, cellulose esters, cellulose amides and mixtures thereof. Suitable cellulosic polymers include anionically modified cellulose, nonionically modified cellulose, cationically modified cellulose, zwitterionically modified cellulose, and mixtures thereof. Suitable cellulosic polymers include methyl cellulose, carboxy methyl cellulose, ethyl cellulose, hydroxyl ethyl cellulose, hydroxyl propyl methyl cellulose, ester carboxy methyl cellulose, and mixtures thereof.

Anti-redeposition agents: The detergent compositions of the present invention may also include one or more anti-redeposition agents such as carboxymethylcellulose (CMC), polyvinyl alcohol (PVA), polyvinylpyrrolidone (PVP), polyoxyethylene and/or polyethyleneglycol (PEG), homopolymers of acrylic acid, copolymers of acrylic acid and maleic acid, and ethoxylated polyethyleneimines. The cellulose based polymers described under soil release polymers above may also function as anti-redeposition agents.

Other suitable adjunct materials include, but are not limited to, anti-shrink agents, anti-wrinkling agents, bactericides, binders, carriers, dyes, enzyme stabilizers, fabric softeners, fillers, foam regulators, hydrotropes, perfumes, pigments, sod suppressors, solvents, and structurants for liquid detergents and/or structure elasticizing agents.

In a further embodiment of the present invention the detergent composition is in form of a bar, a homogenous tablet, a tablet having two or more layers, a pouch having one or more compartments, a regular or compact powder, a granule, a paste, a gel, or a regular, compact or concentrated liquid. In one embodiment the detergent composition can be a laundry detergent composition, preferably a liquid or solid laundry detergent composition. There are a number of detergent formulation forms such as layers (same or different phases), pouches, as well as forms for machine dosing unit.

Pouches can be configured as single or multicompartments. It can be of any form, shape and material which is suitable for hold the composition, e.g. without allowing the release of the composition from the pouch prior to water contact. The pouch is made from water soluble film which encloses an inner volume. Said inner volume can be divided into compartments of the pouch. Preferred films are polymeric materials preferably polymers which are formed into a film or sheet. Preferred polymers, copolymers or derivates thereof are selected polyacrylates, and water soluble acrylate copolymers, methyl cellulose, carboxy methyl cellulose, sodium dextrin, ethyl cellulose, hydroxyethyl cellulose, hydroxypropyl methyl cellulose, malto dextrin, poly methacrylates, most preferably polyvinyl alcohol copolymers and, hydroxypropyl methyl cellulose (HPMC). Preferably the level of polymer in the film for example PVA is at least about 60%. Preferred average molecular weight will typically be about 20,000 to about 150,000. Films can also be of blend compositions comprising hydrolytically degradable and water soluble polymer blends such as polylactide and polyvinyl alcohol (known under the Trade reference M8630 as sold by Chris Craft In. Prod. Of Gary, Ind., US) plus plasticisers like glycerol, ethylene glycerol, Propylene glycol, sorbitol and mixtures thereof. The pouches can comprise a solid laundry detergent composition or part components and/or a liquid cleaning composition or part components separated by the water soluble film. The compartment for liquid components can be different in composition than compartments containing solids. Ref: (US2009/0011970 A1).

Detergent ingredients can be separated physically from each other by compartments in water dissolvable pouches or in different layers of tablets. Thereby negative storage interaction between components can be avoided. Different dissolution profiles of each of the compartments can also give rise to delayed dissolution of selected components in the wash solution.

A liquid or gel detergent, which is not unit dosed, may be aqueous, typically containing at least 20% by weight and up to 95% water, such as up to about 70% water, up to about 65% water, up to about 55% water, up to about 45% water, up to about 35% water. Other types of liquids, including without limitation, alkanols, amines, diols, ethers and polyols may be included in an aqueous liquid or gel. An aqueous liquid or gel detergent may contain from 0-30% organic solvent. A liquid or gel detergent may be non-aqueous.

The detergent compositions of present invention may be provided in the form of laundry soap bars and used for hand washing laundry, fabrics and/or textiles. The term laundry soap bar includes laundry bars, soap bars, combo bars, syndet bars and detergent bars. The types of bar usually differ in the type of surfactant they contain, and the term laundry soap bar includes those containing soaps from fatty acids and/or synthetic soaps. The laundry soap bar has a physical form which is solid and not a liquid, gel or a powder at room temperature. The term solid is defined as a physical form which does not significantly change over time, i.e. if a solid object (e.g. laundry soap bar) is placed inside a container, the solid object does not change to fill the container it is placed in. The bar is a solid typically in bar form but can be in other solid shapes such as round or oval.

The laundry soap bar may contain one or more additional enzymes, protease inhibitors such as peptide aldehydes (or hydrosulfite adduct or hemiacetal adduct), boric acid, borate, borax and/or phenylboronic acid derivatives such as 4-formylphenylboronic acid, one or more soaps or synthetic surfactants, polyols such as glycerine, pH controlling compounds such as fatty acids, citric acid, acetic acid and/or formic acid, and/or a salt of a monovalent cation and an organic anion wherein the monovalent cation may be for example Nat, $K^+$ or $NH_4^+$ and the organic anion may be for example formate, acetate, citrate or lactate such that the salt of a monovalent cation and an organic anion may be, for example, sodium formate.

The laundry soap bar may also contain complexing agents like EDTA and HEDP, perfumes and/or different type of fillers, surfactants e.g. anionic synthetic surfactants, builders, polymeric soil release agents, detergent chelators, stabilizing agents, fillers, dyes, colorants, dye transfer inhibitors, alkoxylated polycarbonates, suds suppressers, structurants, binders, leaching agents, bleaching activators, clay soil removal agents, anti-redeposition agents, polymeric dispersing agents, brighteners, fabric softeners, perfumes and/or other compounds known in the art.

The laundry soap bar may be processed in conventional laundry soap bar making equipment such as but not limited to: mixers, plodders, e.g a two stage vacuum plod-der, extruders, cutters, logo-stampers, cooling tunnels and wrappers. The invention is not limited to preparing the laundry soap bars by any single method. The premix of the invention may be added to the soap at different stages of the process. For example, the premix containing a soap, an enzyme, optionally one or more additional enzymes, a protease inhibitor, and a salt of a monovalent cation and an organic anion may be prepared and the mixture is then plodded. The enzyme and optional additional enzymes may be added at the same time as the protease inhibitor for example in liquid form. Besides the mixing step and the plodding step, the process may further comprise the steps of milling, extruding, cutting, stamping, cooling and/or wrapping.

The present invention furthermore relates to different uses of the detergent composition as herein disclosed, such as for degrading mannan and for use in a laundry process.

The present invention furthermore relates to a method for removing a stain from a surface, comprising contacting the surface with a detergent composition as herein disclosed.

The present invention also relates to a method for degrading mannan comprising applying a detergent composition as herein disclosed to mannan, preferably wherein the mannan is on the surface of a textile. By degrading mannan attached to the textile or fabric, dirt or soil bound to mannan is released and not capable of binding again to the mannan or mannan stains.

In an embodiment of the present invention the mannanase comprised in the detergent composition of present invention has a relative activity of at least 30% in the temperature range from 45° to 65° C. Providing mannanases that retain activity in temperatures above ambient temperature and in acidic pH is advantageous for applications wherein mannan degradation is required in such conditions.

In an embodiment the mannanase comprised in the detergent compositions of present invention hydrolyses endo-beta-1,4-mannosidic linkages randomly.

In an embodiment the mannanase comprised in the detergent compositions of present invention is obtainable or derivable from a bacterial source.

In an embodiment the mannanase comprised in the detergent compositions of present invention is fused with at least one further polypeptide, thus forming a fusion polypeptide. The fusion polypeptide or the further polypeptide may have other catalytic or binding activities in addition to those of mannanase. In an embodiment the further polypeptide comprises or consists of carbohydrate binding module, which is optionally a fragment of another protein or enzyme derived from the same or different organism as the mannanase. The mannanase can be connected to the further polypeptide with a linker.

EXAMPLES

The following examples are provided to illustrate various aspects of the present invention. They are not intended to limit the invention, which is defined by the accompanying claims.

Example 1: Screening

For identification of new beta-1,4-mannanases public databases (NCBI, EBI) and selected proprietary and public genomes were screened. All proprietary and public genomes used in this work are shown in Table 1. All hits were grouped and finally 15 genes of bacterial origin were selected for cloning in *Bacillus* based on the phylogenetic distance between each other (Table 2).

TABLE 1

List of proprietary and public genomes used for screening of beta-1,4-mannanases

| Species | Strain | Source |
|---|---|---|
| *Bacillus pumilus* | M58 | ABE |
| *Amphibacillus xylanus* | NBRC 15112 | NCBI |
| *Bacillus hemicellulosilyticus* | JCM 9152 | NCBI |
| *Bacillus clausii* | KSM-K16 | NCBI |
| *Bacillus amyloliquefaciens* | RH1330 | ABE |
| *Virigibacillus soli* | PL205 | NCBI |

TABLE 2

List of genes selected for cloning in *Bacillus*

| Sequence ID | Species | GH family | Length |
|---|---|---|---|
| orf2511 | *Bacillus amyloliquefaciens* | 26 | 360 aa |
| AXY_08250 | *Amphibacillus xylanus* | 5 | 497 aa |
| Man7 | *Bacillus hemicellulosilyticus* | 5 | 490 aa |
| T1Z249.2 | *Bacillus nealsonii* | 5 | 369 aa |
| Man6 | *Bacillus clausii* | 5 | 324 aa |
| Q9EYQ3 | *Clostridium cellulolyticum* | 5 | 424 aa |
| YdhT | *Bacillus cellulosilyticus* | 26 | 1183 aa |
| V5X1N9 | *Paenibacillus polymyxa* | 5 | 588 aa |
| Q9ZI87 | *Geobacillus stearothermophilus* | 5 | 694 aa |
| Q49HI4 | *Bacillus circulans* | 5 | 327 aa |
| orf0659 | *Bacillus pumilus* | 5 | 376 aa |
| JCM9152_1090 | *Bacillus hemicellulosilyticus* | 26 | 489 aa |
| D3HC62 | *Streptococcus gallolyticus* | 5 | 487 aa |
| A0LSH9 | *Acidothermus cellulolyticus* | 5 | 763 aa |
| Man14 | *Virgibacillus soli* | 5 | 482 aa |

Example 2: Cloning of Bacterial Mannanases in *Bacillus*

Unless otherwise stated, the molecular biological methods including DNA manipulations and transformations were performed as described in Sambrook and Russell (2001) and Harwood and Cutting (1990). The genes man6, man7 and man14 were amplified by PCR using Pfx Accu Prime Polymerase (Invitrogen). PCRs were performed according to manufacturer's instructions. Following PCR conditions were used for construction of the expression plasmids: 120 sec initial denaturation at 94° C., followed by 35 cycles of 15 sec at 94° C., 30 sec annealing at one of the following 50/55° C., 110/290 sec extension at 68° C. and the final extension at 68° C. for 10 min. For amplification of man7 genomic DNA of *Bacillus hemicellulosilyticus* JCM 9152 was used. man6 and man14 were ordered as synthetic genes without codon optimization (Eurofins MWG, Germany) Sequences of primers used for cloning are shown in Table 3. Overhangs for hybridization are underlined.

TABLE 3

List of primers used for amplification of man6, man7 and man14

| Template | Primer | bp | Sequence | Seq ID No |
|---|---|---|---|---|
| syn. gene man6 | Man6_1 | 39 | <u>CAACCGCCTCTGCAGCT</u>TATGCACAAAACGGATTTCACG | 1 |
| syn. gene man6 | Man6_2 | 39 | <u>CGGTATATCTCTGTC</u>TTAATCACTCTTAAGCCCATTTTC | 2 |
| gDNA *B. hemicellulosilyticus* | Man7_1 | 37 | <u>CAACCGCCTCTGCAGCT</u>TCTGATGGTCATAGCCAAAC | 3 |
| gDNA *B. hemicellulosilyticus* | Man7_2 | 36 | <u>CGGTATATCTCTGTC</u>TTATTGGATTGTTACATGATC | 4 |
| syn. Gene man14 | Man14_1 | 40 | <u>CAACCGCCTCTGCAGCT</u>GCAAGCGGGTTTTATGTAAACGG | 5 |
| syn. Gene man14 | Man14_2 | 39 | <u>CGGTATATCTCTGTC</u>TTATTTAATGGTAACGTTATCAAC | 6 |
| pUB110 derivative | Vec_1 | 17 | AGCTGCAGAGGCGGTTG | 7 |
| pBU110 derivative | Vec_2 | 21 | GACAGAGATATACCGACAGTG | 8 |

Genes were cloned in a standard vector pEV1 pEV1 (FIG. 1), a pUB110 derivate including promoter PaprE from *Bacillus licheniformis* and xylanase signal peptide from *Bacillus amyloliquefaciens*, by using NEBuilder® Hifi DNA Assembly Master Mix (NEB, Frankfurt). A vector:insert ration of 1:3 was applied for cloning. The total amount of fragments was at 0.2 pmol in a total volume of 20 μl. Samples were incubated for 40 min at 50° C. For construction purposes, expression plasmids were transformed by induced competence in *Bacillus subtilis* SCK6 as described in Zhang & Zhang 2011. The transformed cells were plated onto LB (Luria-Bertani) plates supplemented with 10 mg/l Kanamycin. Plates were incubated for 20h at 37° C. Arising colonies were picked and plasmid was isolated using QiaPrep MiniPrep Kit (Qiagen, Hilden). Isolation procedure was carried out according to the manufacturers recommendations for Gram positives plasmid preparations. Inserts were sequenced via Sanger sequencing (GATC, Germany) and revealed the DNA sequences corresponding to the mature parts of the mannanases Man6, Man7 and Man14. Sequence comparisons were done using ClustalW sequence alignment (Thompson et al 1994). Finally, expression plasmids were transformed in an appropriate *Bacillus* production strain via electroporation. *Bacillus* production strain was grown in electroporation medium containing 20 g/l Trypton, 10 g/l yeast extract, 10 g NaCl and 2M saccharose and 10 ml were harvested at an OD(600 nm) of 0.4. Cells were washed with electroporation buffer containing 0.272M saccharose, 1 mM $MgCl_2$ and 7 mM $KH_2PO4$ and finally resuspended in 250 μl electroporation buffer. Electroporation was performed using following conditions: 1.2 kV, 150Ω, 50 μF. 1 ml electroporation medium was added afterwards and cells were incubated for 3h at 37° C. Cells were plated on LB plates supplemented with 20 mg/l Kanamycin and incubated for 18h at 37° C. Clones were verified as described above and used for generation of material for analytic tests. Therefore, strains were inoculated in a standard expression under protein inducing conditions and incubated for 30h at 37° C. Supernatants were harvested and used for analytical and application tests. Genes and enzyme characteristics are shown in Table 4 and 5.

TABLE 4

The summary on the GH5 family mannanase encoding genes from *Bacillus clausii* KSM-K16, *Bacillus hemicellulosilyticus* JCM 9152 and *Virgibacillus soli* PL205.

| Gene | Length including SP (bp) | SEQ ID NO |
|---|---|---|
| man6 | 975 | 9 |
| man7 | 1473 | 13 |
| man14 | 1449 | 17 |

TABLE 5

The summary of the amino acid sequences deduced from the GH5 mannanase encoding gene sequences from *Bacillus clausii* KSM-K16, *Bacillus hemicellulosilyticus* JCM 9152 and *Virgibacillus soli* PL205.

| Man protein | No of AAs | Length of SS | CBM | Predicted MW (Da), ss not included | Predicted pI, ss not included | SEQ ID NO |
|---|---|---|---|---|---|---|
| Man6 | 324 | 35 | | 31.84 | 4.56 | 11 |
| Man7 | 490 | 21 | Yes | 51.36 | 4.81 | 15 |
| Man14 | 482 | 16 | Yes | 50.68 | 4.35 | 19 |

Example 3: PCR-Cloning of Bacterial Mannanases Man6 and Man7 in *Trichoderma reesei*

Standard molecular biology methods were used in the isolation and enzyme treatments of DNA (e.g. isolation of plasmid DNA, digestion of DNA to produce DNA fragments), in *E. coli* transformations, sequencing etc. The basic methods used were either as described by the enzyme, reagent or kit manufacturer or as described in the standard molecular biology handbook, e.g. Sambrook and Russell (2001). Isolation of genomic DNA was performed as described in detail by Raeder and Broda (1985).

Man6 and man7 from *Bacillus clausii* and *Bacillus hemicellulosilyticus*, respectively, were also cloned for expression in *Trichoderma reesei* The genes were PCR-cloned using synthetic genes with codon optimization for *Trichoderma reesei*. DNA sequences encoding the signal peptides of man6 and man7 were removed using PCR and new cloning sites created. The sequences of the primers are shown in Table 6 (SEQ ID NOs: 21-24).

TABLE 6

The oligonucleotides used as PCR primers to amplify *Bacillus hemicellulosilyticus* and *Bacillus clausii* mannanase genes.

| Template, (synthetic) DNA from | Oligo-nucleotides | Length (bp) | Sequence[a] | SEQ ID NO: |
|---|---|---|---|---|
| *Bacillus hemicellulosilyticus* | BMAN1 | 60 | 5'-AGTCAATCGCGACAAGCGCCAGACCCACTCGGGCTTCTACATCGAGGGCTCGACGCTCTA-3' (s) | 21 |
| *Bacillus hemicellulosilyticus* | BMAN2 | 46 | 5'-CGCGCCGGATCCTTACTGGATCGTGACGTGGTCCAGGTAGATGGCG-3' (as) | 22 |
| *Bacillus clausii* | BMAN3 | 60 | 5'-AGTCAATCGCGACAAGCGCCAGAACGGCTTCCACGTCTCCGGCACGGAGCTCCTGGACAA-3' (s) | 23 |
| *Bacillus clausii* | BMAN4 | 50 | 5'-CGCGCCGGATCCTTAGTCGCTCTTCAGGCCGTTCTCGCCGTAGACGATGCG-3' (as) | 24 |

[a]"s" in parenthesis = sense strand, "as" = antisense strand.

The genes were amplified by PCR with primers described in Table 6 and using synthetic DNAs as templates in the reactions. The PCR mixtures of *Bacillus clausii* man6 and *Bacillus hemicellulosilyticus* man 7 contained each 1×HF buffer for Phusion HF Polymerase (NEB/BioNordika, Finland), 0.2 mM dNTP mix (Thermo Fisher Scientific, Finland), 1 μM each primer, 3% DMSO (Thermo Fisher Scientific), 1 unit of Phusion High-Fidelity Polymerase (NEB/BioNordika, Finland) and 50 ng of the corresponding plasmid DNA. The conditions for the PCR reactions were the following: 30 sec initial denaturation at 98° C., followed by 28 cycles of 10 sec at 98° C., 30 sec annealing at one of the following 45/50/55/60° C., 45 sec extension at 72° C. and the final extension at 72° C. for 7 min.

Primer combination described in Table 6 produced specific DNA products having the expected sizes. The PCR products were isolated from agarose gel with GenJet Gel Extraction Kit (Thermo Fisher Scientific) according to manufacturer's instructions, digested with NruI and BamHI restriction enzymes (Thermo Fisher Scientific) and cloned into an expression vector cleaved with NruI and BamHI. Ligation mixtures were transformed into *Escherichia coli* XL1-Blue (AH Diagnostics) and plated on LB (Luria-Bertani) plates containing 50-100 μg/ml ampicillin. Several *E. coli* colonies were collected from the plates and DNA was isolated with GenJet Plasmid Miniprep Kit (Thermo Fisher Scientific). Positive clones were screened using restriction digestions. The genes encoding the *Bacillus clausii* man6 and *Bacillus hemicellulosilyticus* man7 GH5 mannanases without their own signal peptide encoding sequences were sequenced and the plasmids were named pALK4274 and pALK4273, respectively (For details see Example 6).

Example 4: Cloning of Synthetic Bacterial Mannanase Man14

Standard molecular biology methods were used in the isolation and enzyme treatments of DNA (e.g. isolation of plasmid DNA, digestion of DNA to produce DNA fragments), in *E. coli* transformations, sequencing etc. The basic methods used were either as described by the enzyme, reagent or kit manufacturer or as described in the standard molecular biology handbook, e.g. Sambrook and Russell (2001). Isolation of genomic DNA was performed as described in detail by Raeder and Broda (1985).

Mannanase gene man14 from *Virgibacillus soli* was also cloned for *Trichoderma* expression as well. The gene encoding GH5 family mannanase Man14 from *Virgibacillus soli* was ordered from GenScript as a synthetic construct with codon optimization for *Trichoderma* reesei.

Plasmid DNA obtained from GenScript including the man14 gene was resuspended in sterile water, digested with NruI and BamHI restriction enzymes (Thermo Fisher Scientific) according to manufacturer's instructions and cloned into an expression vector cleaved with NruI and BamHI. Ligation mixture was transformed into *Escherichia coli* XL1-Blue (AH Diagnostics) and plated on LB (Luria-Bertani) plates containing 50-100 μg/ml ampicillin. Several *E. coli* colonies were collected from the plates and DNA was isolated with GenJet Plasmid Miniprep Kit (Thermo Fisher Scientific). Positive clones were screened using restriction digestions and they were shown to contain inserts of expected sizes. Fusion sites of *Virgibacillus soli* man14 to the expression plasmid were sequenced and the plasmid was named pALK4414 (For details see Example 6).

Example 5: Production of Recombinant Bacterial GH5 Mannanase Proteins in *Bacillus*

Expression plasmids were constructed for production of recombinant GH5 mannanase (Man6, Man7 and Man14) proteins from *Bacillus clausii, Bacillus hemicellulosilyticus* and *Virgibacillus soli*. The expression plasmids constructed are listed in Table 7. The recombinant GH5 genes (man6, man7 and man14), without their own signal sequences, were fused to the *Bacillus licheniformis* PaprE promoter and *B. amyloliquefaciens* xylanase signal peptide. The transcription termination was ensured by a strong terminator and a kanamycin resistance marker was used for selection of the transformants. The transformations were performed as described in Example 2.

TABLE 7

The expression plasmids constructed to produce Man6, Man7 and Man14 recombinant proteins from *Bacillus clausii*, *Bacillus hemicellulosilyticus* and *Virgibacillus soli* in an appropriate *Bacillus* expression strain.

| Mannanase (GH5) protein | Expression plasmid |
|---|---|
| Man6 | pEV1 Man6 |
| Man7 | pEV1 Man7 |
| Man14 | pEV1 Man14 |

The GH5 production of the transformants was analyzed from the culture supernatants of the shake flask cultivations. The transformants were inoculated from the LB plates to shake flasks containing 2% glucose, 6% corn steep powder, 1.3% (NH4)2HPO4, 0.05% MgSO4×7H2O and 0.5% CaCl2. pH was adjusted to pH 7.5. The GH5 protein production of the transformants was analyzed from culture supernatants after growing them for 30 hours at 37° C., 180 rpm. Heterologous production of recombinant proteins was analyzed by SDS-PAGE with subsequent Coomassie staining. The best producing transformants were chosen to be cultivated in laboratory scale bioreactors. The transformants were cultivated in bioreactors at 37° C. under protein inducing conditions and additional feeding until a suitable yield was reached. The supernatants were recovered for application tests by centrifugation or filtration.

Example 6: Production of Recombinant Bacterial GH5 Mannanase Proteins in *Trichoderma reesei*

Figure 2:
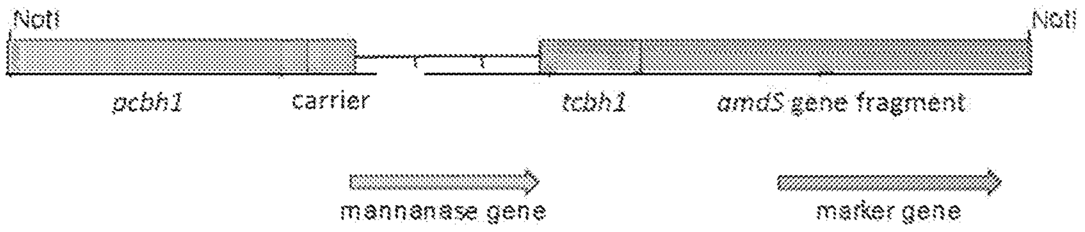
FIG. 2 schematically shows the expression cassettes used in the transformation of *Trichoderma reesei* protoplasts for overproducing the recombinant mannanase proteins (Man6, Man7 and Man14). The mannanase genes were under the control of *T. reesei* cel7A/cbh1 promoter (pcbh1) and the termination of the transcription was ensured by using *T. reesei* cel7A/cbh1 terminator sequence (tcbh1). The amdS gene was included as a transformation marker.

Expression plasmids were constructed for production of recombinant GH5 mannanase (Man6, Man7 and Man14) proteins from *Bacillus clausii, Bacillus hemicellulosilyticus* and *Virgibacillus soli* (See Examples 3 and 4) in *Trichoderma reesei*. The expression plasmids constructed are listed in Table 8. The recombinant GH5 genes (man6, man7 and man14), without their own signal sequences, were fused to the *T. reesei* cel7A/cbh1 promoter with *T. reesei* cel6A/cbh2 CBM carrier and linker followed by Kex2 protease recognition site. The transcription termination was ensured by the *T. reesei* cel7A/cbh1 terminator and the *A. nidulans* amdS marker gene was used for selection of the transformants as described in Paloheimo et al. (2003). The linear expression cassettes (FIG. 2) were isolated from the vector backbones after NotI digestions and were transformed into *T. reesei* protoplasts. The host strains used does not produce any of the four major *T. reesei* cellulases (CBHI, CBHII, EGI, EGII). The transformations were performed as in Penttilä et al. (1987) with the modifications described in Karhunen et al. (1993), selecting acetamidase as a sole nitrogen source (amdS marker gene). The transformants were purified on selection plates through single conidia prior to sporulating them on PD.

TABLE 8

The expression cassettes constructed to produce Man6, Man7 and Man14 recombinant proteins from *Bacillus clausii*, *Bacillus hemicellulosilyticus* and *Virgibacillus soli* in *Trichoderma reesei*. The overall structure of the expression cassettes was as described in FIG. 2.

| Mannanase (GH5) protein | Expression plasmid | Expression cassette [a] |
|---|---|---|
| Man6 | pALK4274 | 7.0 kb NotI |
| Man7 | pALK4273 | 7.5 kb NotI |
| Man14 | pALK4414 | 7.6 kb NotI |

[a] The using expression cassette for *T. reesei* transformation was isolated from vector backbone by using NotI digestion.

The mannanase production of the transformants was analyzed from the culture supernatants of the shake flask cultivations. The transformants were inoculated from the PD slants to shake flasks containing 50 ml of complex lactose-based cellulase inducing medium (Joutsjoki at al. 1993) buffered with 5% $KH_2PO_4$. The GH5 protein production of the transformants was analyzed from culture supernatants after growing them for 7 days at 30° C., 250 rpm. Heterologous production of recombinant proteins was analyzed by SDS-PAGE with subsequent Coomassie staining. The best producing transformants were chosen to be cultivated in laboratory scale bioreactors. The transformants were cultivated in bioreactors either on batch or by additional feeding type of process under protein inducing conditions at a typical mesophilic fungal cultivation temperature and slightly acidic conditions. The cultivation was continued until depletion of the medium sugars or until suitable yield was reached. The supernatants were recovered for application tests by centrifugation or by filtration.

Example 7: Assay of Galactomannanase Activity by DNS-Method

Mannanase activity (MNU) was measured as the release of reducing sugars from galactomannan (0.3 w/w-%) at 50° C. and pH 7.0 in 5 min. The amount of released reducing carbohydrates was determined spectrophotometrically using dinitrosalicylic acid. Substrate (0.3 w/w-%) used in the assay was prepared as follows: 0.6 g of locust bean gum (Sigma G-0753) was in 50 mM sodium citrate buffer pH 7 (or citrate phosphate buffer pH 7) at about 80° C. using a heating magnetic stirrer and heated up to boiling point. The solution was cooled and let to dissolve overnight in a cold room (2-8° C.) with continuous stirring and insoluble residues were removed by centrifugation. After that solution was filled up to 200 ml by buffer. Substrate was stored as frozen and melted by heating in a boiling water bath to about 80° C., cooled to room temperature and mixed carefully before use. DNS reagent used in the assay was prepared by dissolving 50 g of 3.5-dinitrosalicylic acid (Sigma D-550) in about 4 liter of water. With continuous magnetic stirring 80.0 g of NaOH was gradually added and let to dissolve. An amount of 1500 g of Rochelle Salt (K—Na-tartrate, Merck 8087) was added in small portions with continuous stirring. The solution that might have been cautiously warmed to a maximum temperature of 45° C., was cooled to room temperature and filled up to 5000 ml. After that it was filtered through Whatman 1 filter paper and stored in a dark bottle at room temperature. The reaction was first started by adding 1.8 ml of substrate solution to each of the two test tubes and let to equilibrate at 50° C. for 5 minutes, after which 200 μl of suitably diluted enzyme solution was added to one of the tubes, mixed well with vortex mixer and incubated exactly for 5 mM at 50° C. Enzyme blanks didn't need to be equilibrated or incubated. The reaction was stopped by adding 3.0 ml of DNS reagent into both tubes and mixed. 200 μl of sample solution was added to the enzyme blank tubes. Both tubes were placed in a boiling water bath. After boiling for exactly 5 minutes, the tubes were placed in a cooling water bath and allow them to cool to room temperature. The absorbance of sample was measured against the enzyme blank at 540 nm and activity was read from the calibration curve and multiplied by the dilution factor. A suitable diluted sample yielded an absorbance difference of 0.15-0.4. Standard curve was prepared 20 mM from mannose stock solution by dissolving 360 mg of mannose (SigmaM-6020, stored in a desiccator) in assay buffer and diluted to solutions containing 3, 6, 10 and 14 μmol/ml of mannose. Standards were handled like the samples except for incubating at 50° C. The absorbances were measured against the reagent blank (containing buffer instead of standard dilution of mannose) at 540 nm. Calibration curve was constructed for every series of assays. One mannanase unit (MNU) was defined as the amount of enzyme that produces reductive carbohydrates having a reductive power corresponding to one nmol of mannose from galactomannan in one second under the assay conditions (1 MNU=1 nkat).

Example 8: Purification of Man6 Mannanase

Cells and solids were removed from the fermentation culture medium by centrifugation for 10 mM, 4000 g at 4° C. The supernatant of 10 ml was used for protein purification. The sample was filtered through 0.44 μm PVDF membrane (Millex-HV, Merck Millipore Ltd, Carrigtwohill, IRL). The filtrate was loaded onto a HiPrep 26/10 Desalting column (GE Healthcare, Uppsala, Sweden) equilibrated in 20 mM HEPES pH 7. The desalted sample was then loaded onto a 5 ml HiTrap Q HP column (GE Healthcare, Uppsala, Sweden) pre-equilibrated with 20 mM HEPES pH 7. After sample loading, the column was washed with the same buffer for 20 ml. Proteins were eluted with linear salt gradient 20 mM HEPES, 500 mM NaCl pH 7 in 15 CVs. Fractions of 5 ml were collected and analyzed on SDS-PAGE. The fractions containing target protein were combined and concentrated to 2 ml using Vivaspin 20, 10 kDa MWCO ultrafiltration devices (GE Healthcare). The concentrated sample was further fractionated using Superdex 75 26/60 gel-filtration column equilibrated with 20 mM MES, 200 mM NaCl pH 6.5. Fractions of 2 ml were collected and analyzed by SDS-PAGE. Fractions containing pure mannanase were combined. Other mannanases were purified using the same protocol but changing the buffer composition in desalting and ion ex-change steps. Buffer compositions are shown in Table 9.

TABLE 9

| Buffers used in ion exchange chromatography | |
|---|---|
| Mannanase | Buffers used in ion exchange chromatography |
| Man6 | 20 mM HEPES pH 7 |
| Man7 | 20 mM HEPES pH 7 |
| Man14 | 20 mM MES pH 6 |

Purified samples were above 95% pure.

Enzyme content of the purified sample was determined using UV absorbance 280 nm measurements. Excitation coefficients for each mannanases were calculated on the bases of amino acid sequence of the enzyme by using ExPASy Server http://web.expasy.org/protparam/. (Gasteiger E et al 2005). The enzyme activity (MNU) of purified samples was measured as release of reducing sugars as described in Example 7. The specific activity (MNU/mg) of mannanases was calculated by dividing MNU activity of purified sample with the amount of purified enzyme. Obtained values were used for calculating enzyme dosages used in Examples 10 and 11.

pH Profiles of Mannanases

Figure 3:
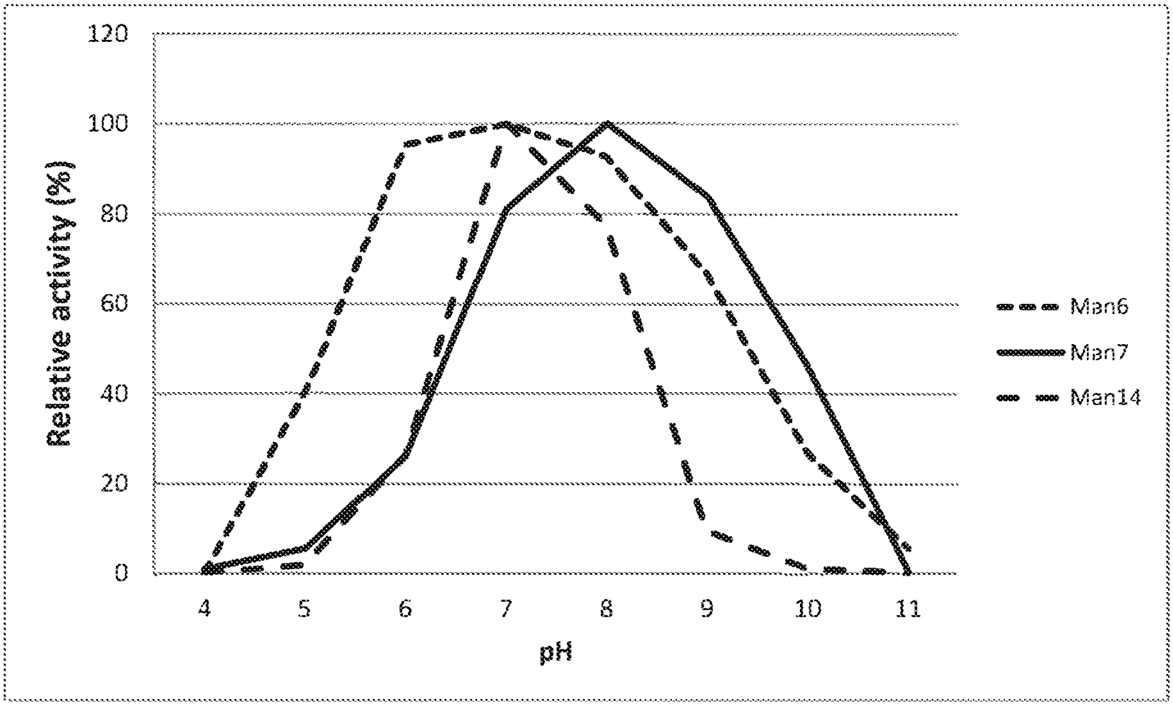
FIG. 3 shows the temperature profile of recombinant Man6, Man7 and Man14 (*Bacillus* produced) mannanase assayed in 40 mM Britton-Robinson buffer pH 7 using 10 mM reaction time, Azurine-crosslinked carob galactomannan was used as a substrate. All measurements were made at least duplicates. The data points are averages of separate measurements.

The pH profiles of purified mannanases were determined using the beta-mannazyme tablet assay Azurine-crosslinked carob galactomannan (T-MNZ 11/14) from Megazyme with minor modifications to the suggested protocol. The linearity of the assay has been checked with each purified enzymes. The assay was performed in 40 mM Britton-Robinson buffer adjusted to pH values between 4 and 11. The enzyme solution was diluted into the assay buffer and 500 μl of enzyme solution was equilibrated at 50 C water bath for 5 min before adding one substrate tablet. After 10 minutes, the reaction was stopped by adding 10 ml 2% Tris pH 12. The reaction tubes were left at room temperature for 5 mM, stirred and the liquid filtered through a Whatman No. 1 paper filter. Release of blue dye from the substrate was quantified by measuring the absorbance at 595 nm. Enzyme activity at each pH was reported as relative activity where the activity at the pH optimum was set to 100%. The pH profiles were shown in FIG. 3.

Relative activity (%) of mannanase is calculated by dividing mannanase activity of a sample by the mannanase activity of a reference sample. In the case of pH profile, the reference sample is a sample at the optimal pH. In the case of temperature profile the reference sample is a sample at the optimal temperature.

Temperature Profiles of Mannanases

Figure 4:
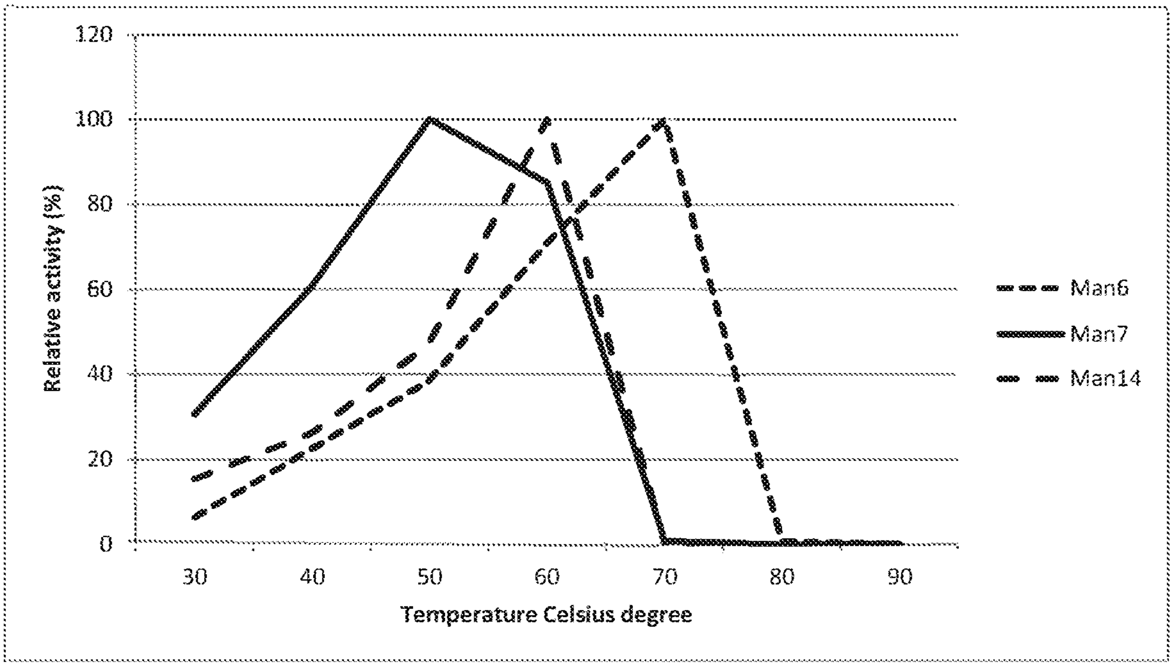
FIG. 4 describes the effect of pH on the activity of recombinant Man6, Man7 and Man14 (*Bacillus* produced) mannanase protein in 40 mM Britton-Robinson buffer at pH 4 to pH 11. Reaction temperature was 50° C. and the reaction time was 10 min. Azurine-crosslinked carob galactomannan was used as a substrate. All measurements were made at least duplicates. The data points are averages of separate measurements.
Figure 5:
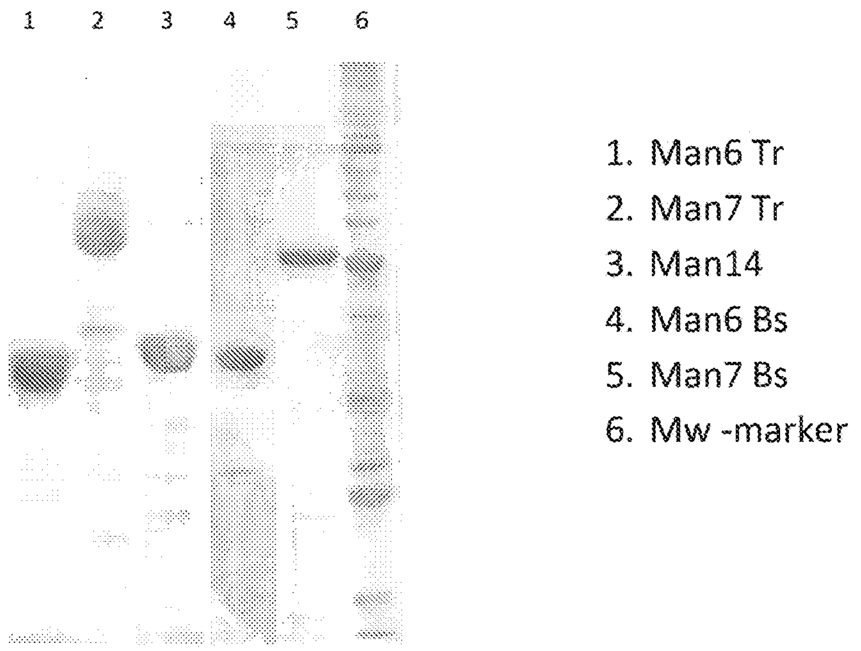
FIG. 5 shows SDS PAGE analysis of bacterial mannanases.

The temperature optimum of purified mannanases was determined using the beta-mannazyme tablet assay Azurine-crosslinked carob galactomannan (T-MNZ 11/14) from Megazyme with minor modifications to suggested protocol. The assay was performed at temperatures varying between 30-90° C. for 10 minutes in 40 mM Britton-Robinson buffer pH7. Enzyme activity was reported as relative activity where the activity at temperature optimum was set to 100%. The temperature profiles were shown in FIG. 4.

Temperature and pH Characteristics of Mannanases

Man6 has a molecular mass between 30-35 kDa. The optimal temperature of the enzyme at pH 7 is from 50° C. to 70° C. Said enzyme has pH optimum at the pH range of at least pH 6 to pH 9 at 50° C. The optimal temperature and pH optimum were determined using 10 mM reaction time and Azurine-crosslinked carob galactomannan as a substrate. Man7 has a molecular mass between 50-55 kDa. The optimal temperature of the enzyme at pH 7 is from 50° C. to 70° C. Said enzyme has pH optimum at the pH range of at least pH 7 to pH 10 at 50° C. The optimal temperature and pH optimum were determined using 10 min reaction time and Azurine-crosslinked carob galactomannan as a substrate.

Man14 has a molecular mass between 30-40 kDa. The optimal temperature of the enzyme at pH 7 is from 50° C. to 70° C. Said enzyme has pH optimum at the pH range of at least pH 7 to pH 8 at 50° C. The optimal temperature and pH optimum were determined using 10 min reaction time and Azurine-crosslinked carob galactomannan as a substrate.

Example 9: Stain Removal Performance of Man6 and Man7 Mannanases with Commercial Detergents without Bleaching Agents Man6 and Man7 mannanases produced in *Bacillus* (as described in Example 5) and in *Trichoderma* (as described in Example 6), were tested for their ability to remove mannanase sensitive standard stains at 40° C. and water hardness of 16° dH with commercial detergents without bleaching agents and compared to commercial mannanase preparation Mannaway® 4.0 L (Novozymes). The following artificially soiled test cloths from Center for test material B.V. (the Netherlands) were used: Chocolate pudding mannanase sensitive on cotton (E-165), Locust bean gum, with pigment on cotton (C-S-73) and on polyester/cotton (PC-S-73) and Guar gum with carbon black on cotton (C-S-43). The fabric was cut in 6 cm×6 cm swatches and 2 pieces of each were used in test.

Commercial heavy duty liquid detergent A containing all other enzymes except mannanase was used at concentration of 4.4 g per liter of wash liquor and Commercial Color detergent powder without enzymes was used at 3.8 g/l. Detergent containing wash liquors we prepared in synthetic tap water with hardness of 16° dH. Protease Savinase® 16 L (0.5 w/w %) and amylase Stainzyme® 12 L (0.4 w/w %) was added into hard water used with commercial Color detergent powder, the liquid detergent already contained amylase and protease. pH of the wash liquor of Color detergent powder was approximately 10 and with the liquid detergent approximately 8.3.

Mannanase dosages were in range 0-0.2/0.25% of detergent weight but for the evaluation the dosages were calculated as enzyme activity units (MNU) per ml wash liquor or as mg of active enzyme protein (AEP) per 1 of wash liquor. Activity was measured as described in Example 7. AEP content of each preparation was calculated by dividing the enzyme activity with specific activity, defined in Example 8. Control sample contained the detergent solution but no mannanase.

For synthetic tap water with hardness of 16° dH the following stock solutions were prepared in deionized water (Milli-Q or equivalent):

Stock solution with 1000° d Calcium-hardness: CaCl2×2 H2O (1.02382.1000, Merck KGaA, Germany) 26.22 g/l Stock solution with 200° d Magnesium-hardness: MgSO4×7 H2O (1.05886.1000, Merck KGaA, Germany) 8.79 g/l H2O NaHCO3 stock solution: NaHCO3 (1.06329.1000 Merck KGaA, Germany) 29.6 g/l 13.3 ml CaCl2 solution, 13.3 ml MgSO4 solution and 10.0 ml of freshly made NaHCO3 solution were added in volumetric flask in the given order, made up to 1 liter with deionized water and mixed. The hardness of water was determined by complexometric titration and found correct.

Figure 6:
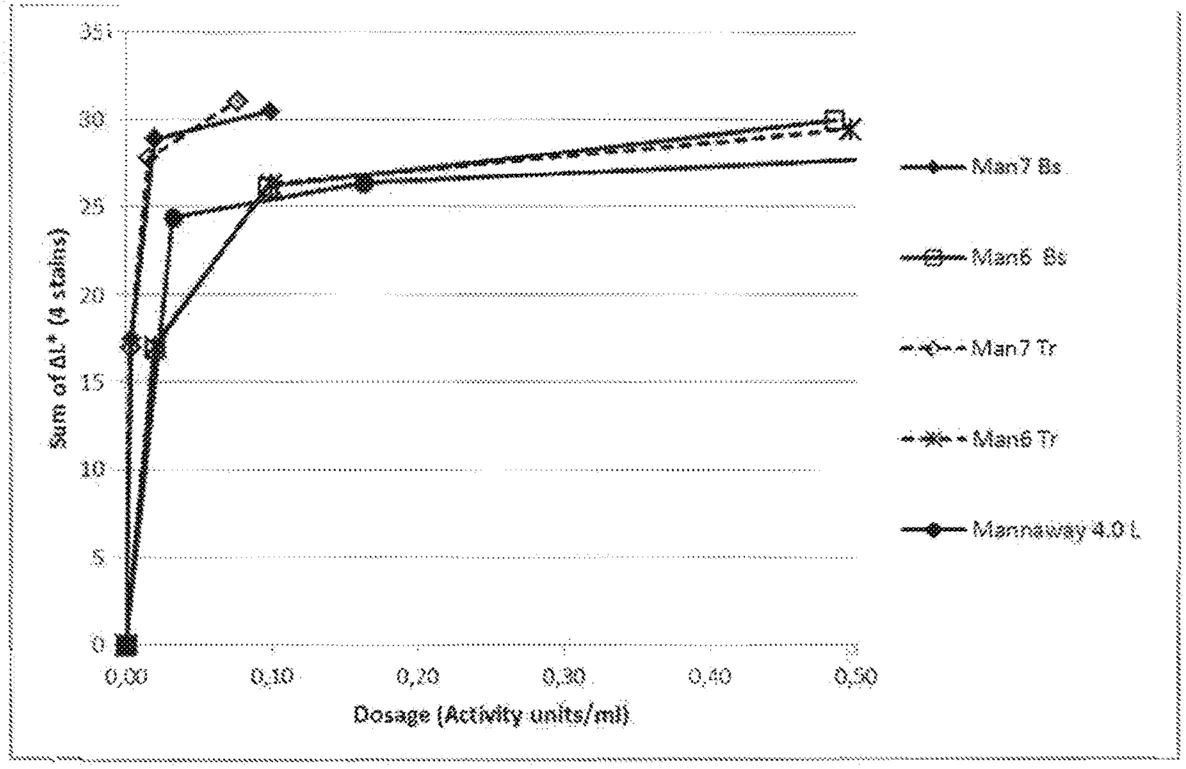
FIG. 6 describes the stain removal performance of Man 6 and Man7 (produced in *Bacillus* and *Trichoderma*) as an increase of lightness (sum of ΔL*of 4 stains) in the presence of 4.4 g/l of commercial heavy duty liquid detergent A at 40° C., 16° dH, 60 mM, pH approx. 8.3 and enzymes dosed as activity units. Commercial preparation Mannaway® 4.0 L was used for comparison.
Figure 7:
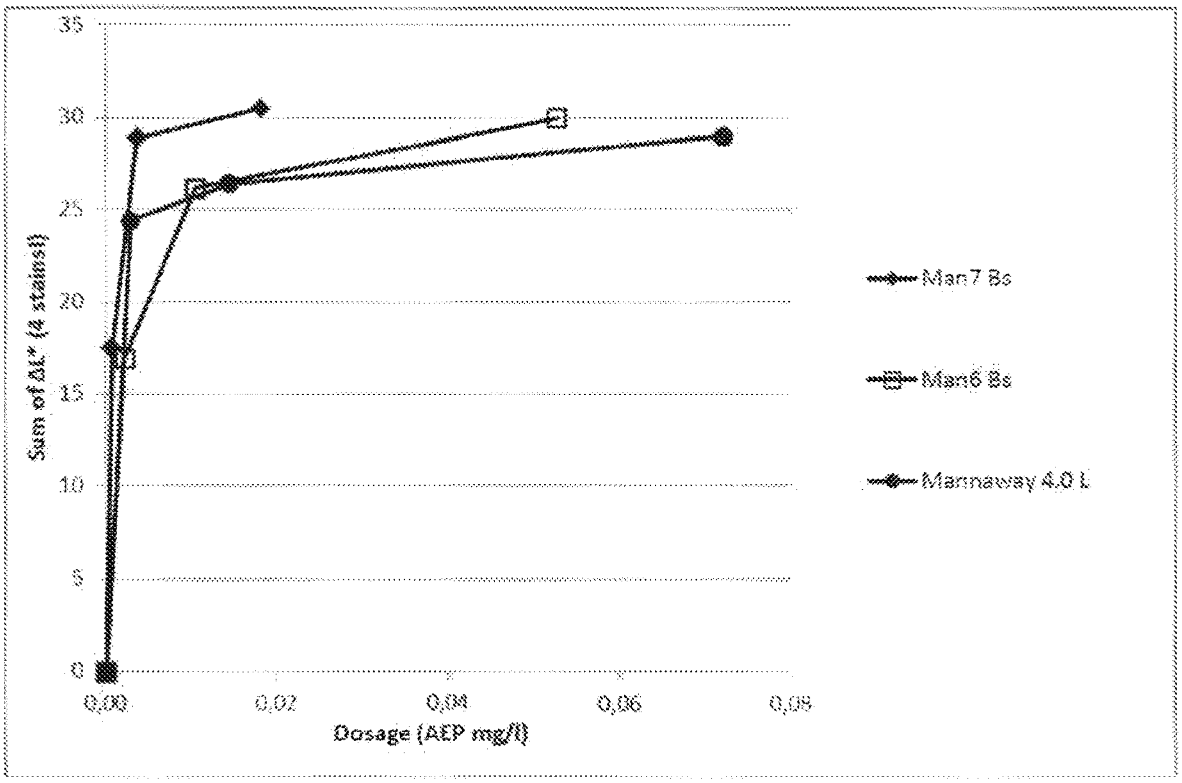
FIG. 7 describes the stain removal performance of Man 6 and Man7 (produced in *Bacillus*) as an increase of lightness (sum of ΔL*of 4 stains) in the presence of 4.4 g/l of Commercial heavy duty liquid detergent A at 40° C., 16° dH, 60 mM, pH approx. 8.3 and enzymes dosed as active enzyme protein (AEP). Commercial preparation Mannaway® 4.0 L was used for comparison.
Figure 8:
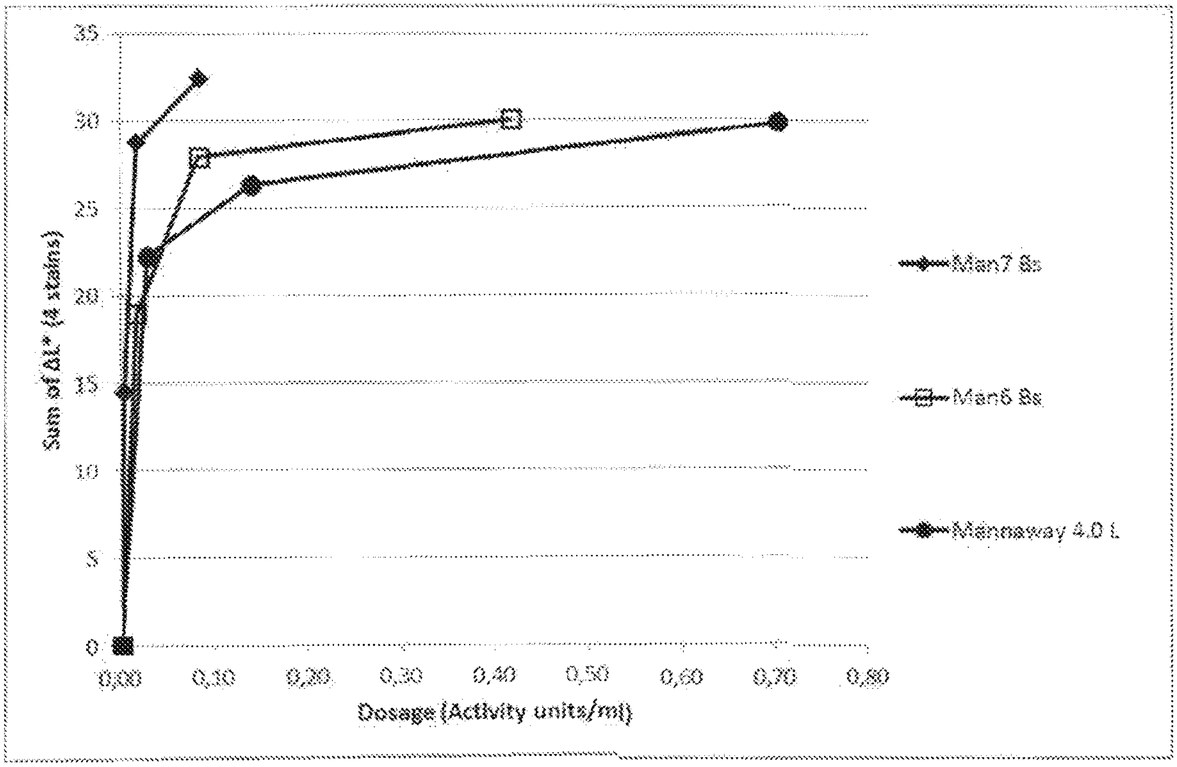
FIG. 8 describes the stain removal performance of Man 6 and Man7 (produced in *Bacillus*) as an increase of lightness (sum of ΔL*of 4 stains) in the presence of 3.8 g/l of Commercial color detergent powder at 40° C., 16° dH, 60 min, pH approx. 10. and enzymes dosed as activity units. Commercial preparation Mannaway® 4.0 L was used for comparison.
Figure 9:
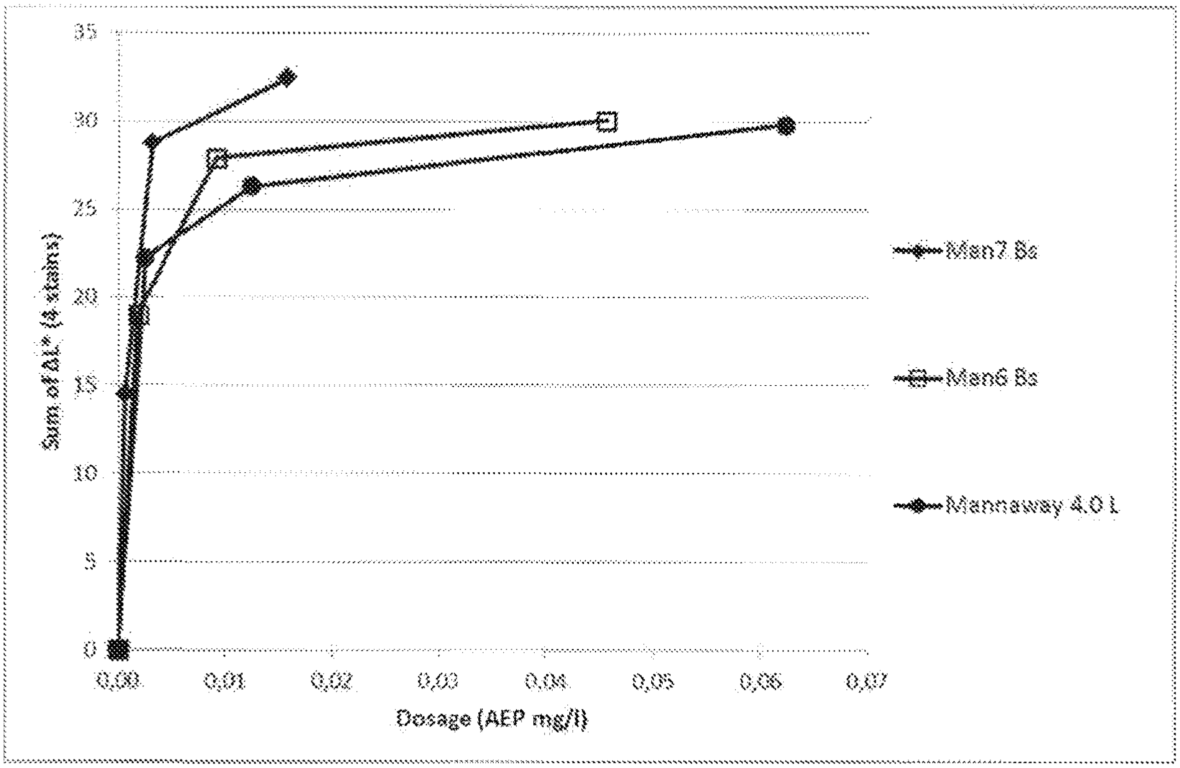
FIG. 9 describes the stain removal performance of Man 6 and Man7 (produced in *Bacillus*) as an increase of lightness (sum of ΔL*of 4 stains) in the presence of 3.8 g/l of Commercial color detergent powder at 40° C., 16° dH, 60 min, pH approx. 10 and enzymes dosed as active enzyme protein. Commercial preparation Mannaway® 4.0 L was used for comparison.

Stain removal treatments were performed in Atlas LP-2 Launder-Ometer as follows. Launder-Ometer was first preheated to 40° C. Then detergent, 250 ml synthetic tap water with hardness of 16° dH and diluted enzyme (<1.0 ml) were added into 1.2 liter containers. Stains were added and the Launder-Ometer was run at 40° C. for 60 min with a rotation speed of 42 rpm. After that the swatches were carefully rinsed under running water and dried overnight at indoor air, on a grid protected against daylight. The stain removal effect was evaluated by measuring the colour as reflectance values with Konica Minolta CM-3610A spectrophotometer using L*a*b* color space coordinates (illuminant D65/10°, 420 nm cut). Fading of the stains, indicating mannanase performance (stain removal efficiency) was calculated as ΔL* (delta L*), which means lightness value L* of enzyme treated fabric minus lightness value L* of fabric treated with washing liquor without mannanase (control). Final results (total stain removal effect) were shown as sum of ΔL* of each stains. Color values of each stains were average of 2 swatches. The results obtained with commercial liquid detergent are shown in FIGS. 6-7. The mannanases according to the invention have similar (Man6) or considerably better (Man7) stain removal performance with liquid detergent when dosed as activity units or as active enzyme protein compared to commercial mannanase preparation Mannaway® 4.0 L. Similar performance was obtained with Man6 and Man7 regardless of the expression host, *Bacillus* or *Trichoderma* (FIG. 6). The results obtained with commercial color detergent powder (FIGS. 8-9) show that the mannanases according to the invention have better stain removal performance with color detergent powder when dosed as activity units or as active enzyme protein compared to commercial mannanase preparation Mannaway® 4.0 L.

Figure 10:
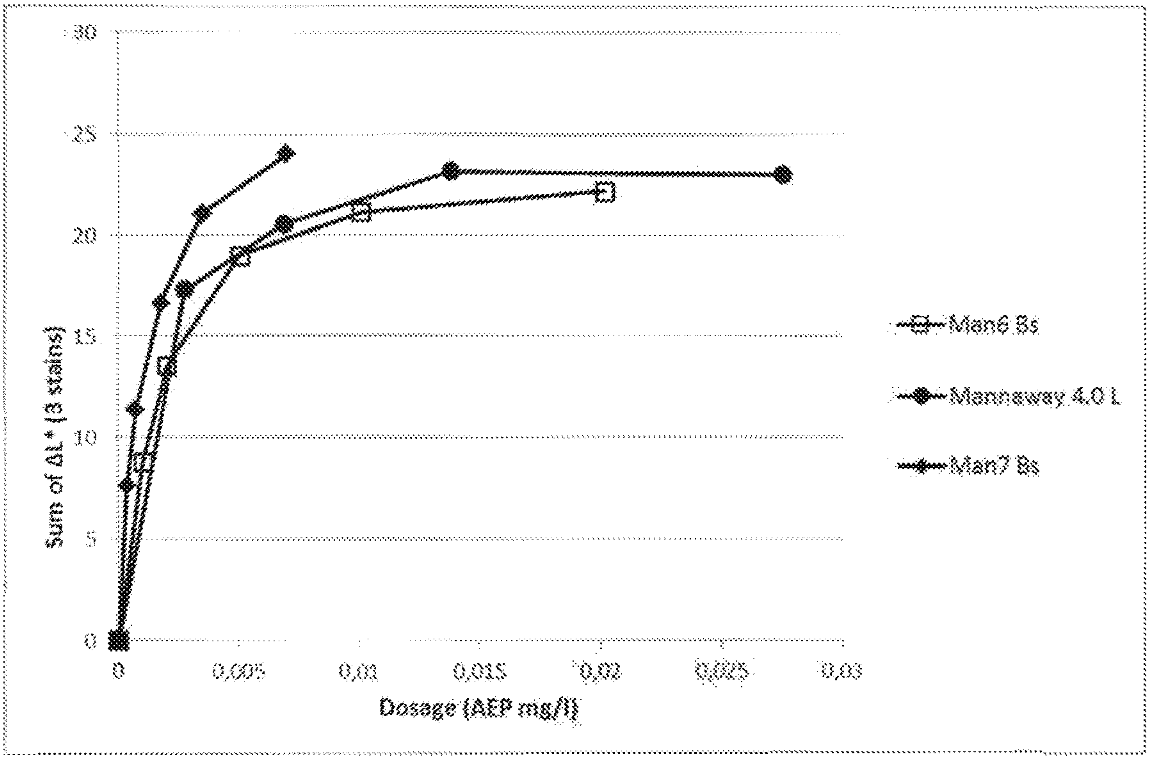
FIG. 10 describes the stain removal performance of Man 6 and Man7 (produced in *Bacillus*) as an increase of lightness (sum of ΔL* of 3 stains) in the presence of 4.2 g/l of Commercial bleach detergent powder at 40° C., 16° dH, 60 min, pH approx. 9.5 and enzymes dosed as active enzyme protein. Commercial preparation Mannaway® 4.0 L was used for comparison.

Example 10: Stain Removal Performance Man6 and Man7 Mannanases with Bleach Containing Detergent Man6 and Man7 mannanases produced in *Bacillus* (as described in Example 5) were tested for their ability to remove mannanase sensitive standard stains at 40° C. and water hardness of 16° dH with commercial bleach detergent powder and compared to commercial mannanase preparation Mannaway® 4.0 L (Novozymes). Test system was similar to described in Example 9, except 3 different artificially soiled test cloths from Center for test material B.V. (the Netherlands) were used: Chocolate pudding mannanase sensitive on cotton (E-165), Locust bean gum, with pigment on cotton (C-S-73) and Guar gum with carbon black on cotton (C-S-43). Commercial Color detergent powder was used at concentration of 4.2 g per liter of wash liquor and pH of the wash liquor was approx. 9.5. Protease Savinase® 16 L (0.5 w/w %) and amylase Stainzyme® 12 L (0.4 w/w %) were added into hard water used in test, since the detergent didn't contain any enzymes. The color of the swatches after treatment was measured and results calculated as sum of ΔL* of each 3 stains as described in Example 9. The results (FIG. 10) obtained with commercial bleach containing detergent indicate that the mannanase according to the invention (Man7) has considerably better stain removal performance compared to commercial mannanase Mannaway® 4.0 L when dosed as active enzyme protein. With Man6 at least similar performance compared to a commercial bacterial mannanase is obtained.

Figure 11:
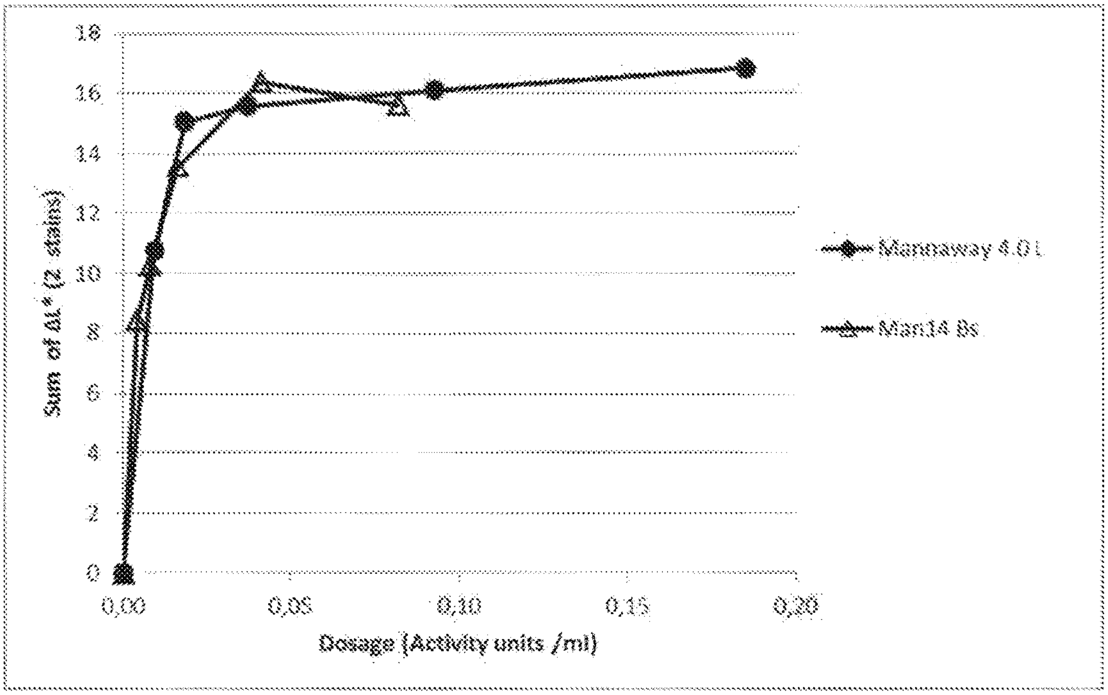
FIG. 11 the stain removal performance of Man14 (produced in *Bacillus*) as an increase of lightness (sum of ΔL*of 2 stains) in the presence of 5 g/l of Commercial heavy duty liquid detergent B at 40° C., 16° dH, 60 min, pH approx. 8.3 and enzymes dosed as activity units. Commercial preparation Mannaway® 4.0 L was used for comparison.
Figure 12:
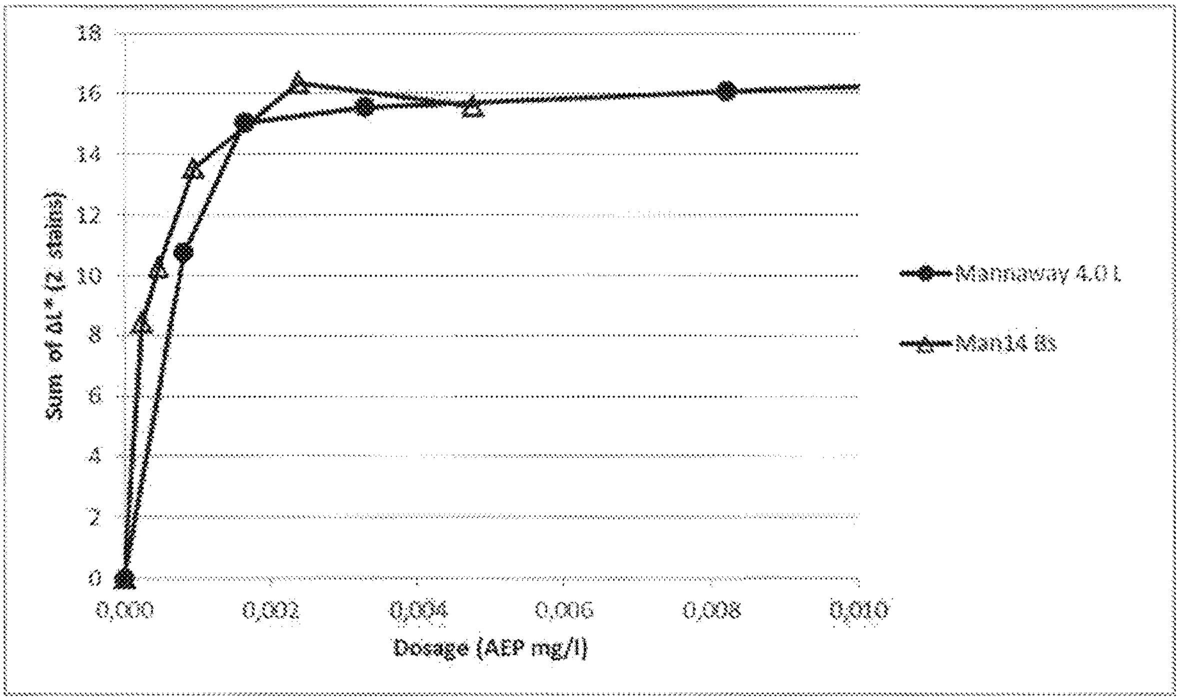
FIG. 12 the stain removal performance of Man14 (produced in *Bacillus*) as an increase of lightness (sum of ΔL*of 2 stains) in the presence of 5 g/l of Commercial heavy duty liquid detergent B at 40° C., 16° dH, 60 min, pH approx. 8.3 and enzymes dosed as active enzyme protein. Commercial preparation Mannaway® 4.0 L was used for comparison.

Example 11: Stain Removal Performance Man14 Mannanase with Commercial Liquid Detergent Man14 mannanase produced in *Bacillus* (as described in Example 5) was tested for their ability to remove mannanase sensitive standard stains at 40° C. and water hardness of 16° dH with commercial heavy duty liquid detergent B and compared to commercial mannanase preparation Mannaway® 4.0 L (Novozymes). Test system was similar to that described in Example 9, except two different artificially soiled test cloths from Center for test material B.V. (the Netherlands) were used: Chocolate pudding mannanase sensitive on cotton (E-165) and Locust bean gum, with pigment on cotton (C-S-73). Commercial heavy duty liquid detergent B was used at a concentration of 5 g per liter of wash liquor and pH of the wash liquor was approx. 8.3. Protease Savinase® 16 L (0.5 w/w %) and amylase Stainzyme® 12 L (0.4 w/w %) were added into hard water used in test, since the detergent didn't contain any enzymes. The color of the swatches after treatment was measured and results calculated as the sum of ΔL* of each 2 stains as described in Example 9. The results (FIGS. 11-12) obtained with commercial liquid containing detergent indicate Man14 had good performance in a liquid detergent, comparable to commercial product, when dosed either as activity units or as active enzyme protein.

Figure 13:
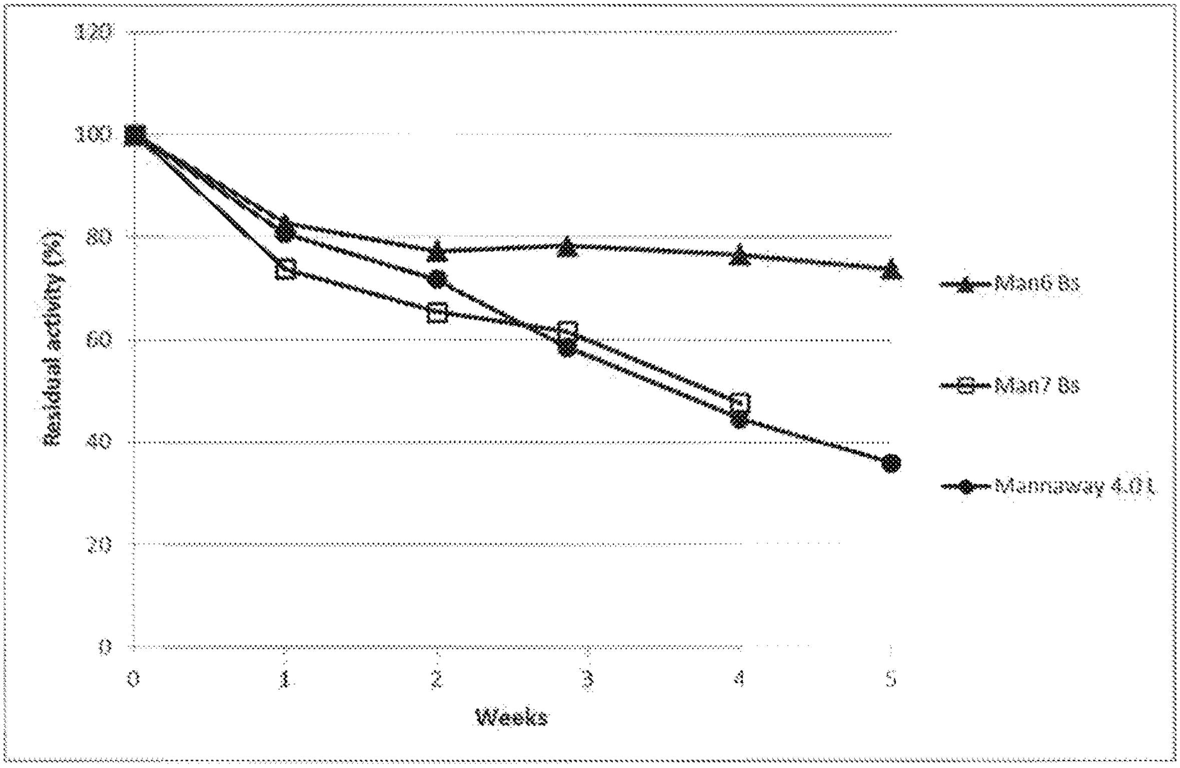
FIG. 13 describes the stability of Man 6 and Man7 (produced in *Bacillus*) in liquid detergent (OMO Color) at 37° C. Commercial preparation Mannaway® 4.0 L was used for comparison FIG. 14 describes the stability of Man 6 (produced in *Bacillus*) in Commercial heavy duty liquid detergent A. Commercial preparation Mannaway® 4.0 L was used for comparison.
Figure 14:
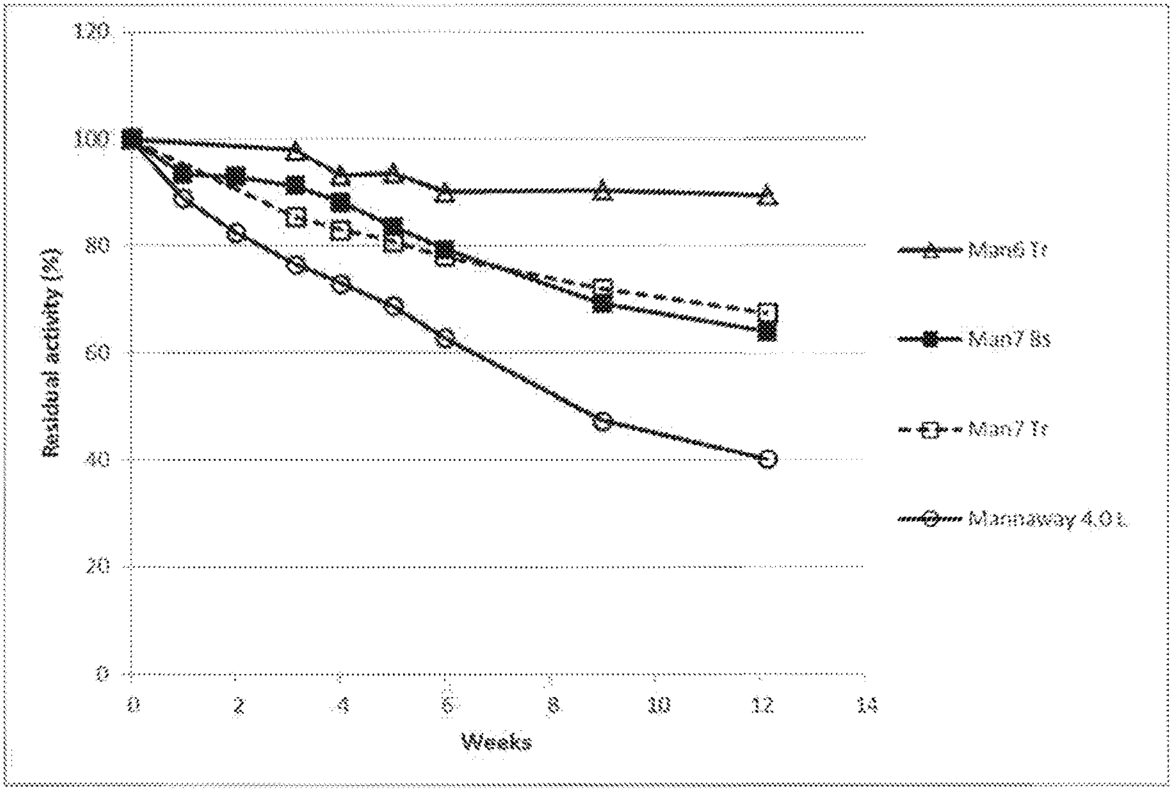

Example 12: Stability of Man6 and Man7 Mannanases in Commercial Liquid Detergents The stability of Man6 and Man7 mannanase preparations produced in *Bacillus* were tested in OMO Color liquid obtained from local super market and compared to commercial mannanase preparation Mannaway® 4.0 L. Mannanase preparations were added 0.5 w/w-% in detergents and samples were incubated in plastic tubes with caps at 37° C. for 5 weeks. The activity was measured at certain intervals by activity assay described in Example 7 except using 30 min incubation time. Results were calculated as residual activity (%), which was obtained by dividing the activity of a sample taken at certain time point by initial activity of the sample. The stability of Man7 produced both in *Bacillus* and *Trichoderma* and Man6 produced in *Trichoderma* were tested against Mannaway® 4.0 L also in commercial liquid heavy duty detergent A containing protease but no mannanase. In this test 1%-(w/w) of mannanases were used and samples incubated for 37° C. for 12 weeks. The results in Omo Color (FIG. 13) show that Man6 had considerably better and Man7 similar stability compared to Mannaway® 4.0 L Both Man7 and especially Man6 were more stable than Mannaway® 4.0 L with another commercial liquid detergent A, as shown in FIG. 14. Results obtained in another test at same conditions showed that Man6 had similar stability regardless of the expression host, *Bacillus* or *Trichoderma* (data not shown). The results of the stability experiments show that the mannanase according to the invention is stabile in detergents for several weeks even when stored at high temperature like 37° C. The stability of the mannanases according to the invention (Man6 and Man7) is improved compared to a commercial bacterial mannanase in liquid detergent.

Example 13: Wash Performance of Liquid Detergent Compositions According to the Invention The wash performance of liquid detergent compositions according to present invention was determined by using standardized stains obtainable from CFT (Center for Testmaterials) B.V., Vlaardingen, Netherlands ("CFT"), Eidgenössische Material- and Prüfanstalt Testmaterialien AG [Federal materials and testing agency, Testmaterials], St.

Gallen, Switzerland ("EMPA") and Warwick Equest Ltd Unit 55, Consett Business Park, Consett, County Durham ("Equest").

A liquid washing agent with the following composition was used as base formulation (all values in weight percent):

| Chemical name | Active substance raw material [%] | Active substance detergent formulation [%] |
|---|---|---|
| Water demin. | 100 | Rest |
| Alkyl benzene sulfonic acid | 96 | 2-7 |
| Anionic surfactants | 70 | 6-10 |
| C12-C18 Fatty acid sodium salt | 30 | 1-4 |
| Nonionic surfactants | 100 | 4-7 |
| Phosphonates | 40 | 0.1-2 |
| Citric acid | 100 | 1-3 |
| NaOH | 50 | 1-4 |
| Boronic acid | 100 | 0.1-2 |
| Antifoaming agent | 100 | 0.01-1 |
| Glycerol | 100 | 1-3 |
| Enzymes | 100 | 0.1-2 |
| Preserving agent | 100 | 0.05-1 |
| Ethanol | 93 | 0.5-2 |
| Optical brightener | 90 | 0.01-1 |
| Perfume | 100 | 0.1-1 |
| Dye | 100 | 0.001-0.1 |

The pH of the detergent composition was between 8.2-8.6.

Based on this base formulation, liquid detergent compositions 1 and 2 were prepared by adding respective enzymes as indicated below:

Composition 1: Enzyme according to SEQ ID NO:12 (Man6)

Composition 2: Enzyme according to SEQ ID NO:16 (Man7)

The wash was performed as follows according to the AISE Method: 3.5 kg Clean ballast cloth, 4 SBL Cloths, Miele washing machine, 20° C. and 40° C. Short program.

All mannanases were added in the same amounts based on total protein content.

The dosing ratio of the liquid washing agent was 4.0 grams per liter of washing liquor. The washing procedure was performed for 60 minutes at a temperature of 20° C. and 40° C., the water having a water hardness between 15.5 and 16.5° (German degrees of hardness).

The results obtained are the difference values between the remission units obtained with the detergents and the remission units obtained with the detergent containing the commercially available reference mannanase (Mannaway 4.0L, obtained from Novozymes). A positive value therefore indicates an improved wash performance of the detergent compositions comprising the mannanases of present invention compared to the same detergent composition comprising the reference mannanase. Within the washing test a large range of stains were tested.

The whiteness, i.e. the brightening of the stains, was determined photometrically as an indication of wash performance A Minolta CM508d spectrometer device was used, which was calibrated beforehand using a white standard provided with the unit.

The results obtained are the difference values between the remission units obtained with the detergents and the remission units obtained with the detergent containing the enzyme combinations. A positive value therefore indicates an improved wash performance due to the enzyme combinations present in the detergent. Mannanases of the invention in detergent compositions show improved performance on a variety of mannan comprising stains.

| | 20° C. | | 40° C. | |
|---|---|---|---|---|
| Stain | Comp. 1 | Comp. 2 | Comp. 1 | Comp. 2 |
| Chocolate Ice Cream (Equest) | 1.3 | 4.2 | n.d. | n.d. |
| Carte Dór Chocolate Ice Cream (Equest) | n.d. | 3.3 | n.d. | 0.7 |
| Cocoa [CO] (Equest) | n.d. | 2.3 | n.d. | n.d. |
| Mayonnaise/Carbon black color (CFT CS05S [CO]) | 1.3 | 4.3 | 1.1 | 2.2 |
| Salad dressing, with natural black (CFT CS06 [CO]) | 1.2 | 3.5 | 1.2 | 2.6 |
| Lipstick, diluted, Red (CFT CS216 [CO]) | n.d. | 1.5 | n.d. | 0.7 |

Example 14: Wash Performance of Powder Detergent Compositions According to the Invention The wash performance of powder detergent compositions according to present invention was determined by using standardized stains obtainable from CFT (Center for Testmaterials) B.V., Vlaardingen, Netherlands ("CFT"), Eidgenössische Material- and Prüfanstalt Testmaterialien AG [Federal materials and testing agency, Testmaterials], St. Gallen, Switzerland ("EMPA") Warwick Equest Ltd Unit 55, Consett Business Park, Consett, County Durham ("Equest").

A solid washing agent with the following composition was used as base formulation (all values in weight percent):

| Chemical Name | Active substance raw material [%] | Active substance detergent formulation [%] |
|---|---|---|
| Water demin. | 100 | 1-4 |
| Alkyl benzene sulfonic acid | 97 | 9-13 |
| Nonionic surfactants | 100 | 4-7 |
| Percarbonates | 88 | 9-13 |
| TAED | 92 | 1-5 |
| Phosphonates | 60 | 0.1-3 |
| Polyacrylates | 45 | 1-4 |
| Soduim silicate | 40 | 5-10 |
| Sodium carbonate | 100 | 18-22 |
| Carboxymethylcellulose | 69 | 1-4 |
| Soil release polymer | 100 | 0.1-1 |
| Optical brightener | 70 | 0.1-1 |
| Antifoaming agent | t.q. | 0.01-1 |
| Sodium sulfate | 100 | 22-30 |
| Enzymes | 100 | 0.1-1 |
| Perfume | 100 | 0.1-1 |
| NaOH | 100 | 0.1-1 |
| Rest | — | 1-4 |

Based on this base formulation, solid detergent compositions 3 and 4 were prepared by adding respective enzymes as indicated below:

Composition 3: Enzyme according to SEQ ID NO:12 (Man6)

Composition 4: Enzyme according to SEQ ID NO:16 (Man7)

The wash was performed as follows according to the AISE Method: 3.5 kg Clean ballast cloth, 4 SBL Cloths, Miele washing machine, 20° C. and 40° C. Short program. All mannanases were added in the same amounts based on total protein content.

The dosing ratio of the powder washing agent was 3.8 grams per liter of washing liquor. The washing procedure was performed for 60 minutes at a temperature of 20° C. and 40° C., the water having a water hardness between 15.5 and 16.5° (German degrees of hardness).

The whiteness, i.e. the brightening of the stains, was determined photometrically as an indication of wash performance A Minolta CM508d spectrometer device was used, which was calibrated beforehand using a white standard provided with the unit.

The results obtained are the difference values between the remission units obtained with the detergents and the remission units obtained with the detergent containing the reference mannanase (Mannaway 4.0L, obtained from Novozymes). A positive value therefore indicates an improved wash performance of the variants in the detergent. Mannanases of the invention show improved performance on several stains. Therefore, it is evident that mannanases according to the invention show improved wash performance compared to Mannaway.

| | 20° C. | | 40° C. | |
|---|---|---|---|---|
| Stain | Comp. 3 | Comp. 4 | Comp. 3 | Comp. 4 |
| Carte Dór Chocolate Ice Cream (Equest) | 1.4 | 2.8 | 2.1 | 0.5 |
| Vienetta (Equest) | 0.5 | 0.8 | 0.5 | n.d. |
| Chocolate Icecream L [CO] (Equest) | 0.9 | 0.9 | 1.1 | n.d. |
| Porridge (EMPA 163 [CO]) | n.d. | n.d. | 1.3 | 5.1 |
| Cocoa (CFT CS02 [CO]) | 1.8 | 3.1 | n.d. | n.d. |
| Mayonnaise/Carbon black color (CFT CS05S [CO]) | n.d. | 1.0 | n.d. | 2.7 |
| Salad dressing, with natural black (CFT CS06 [CO]) | 2.0 | 4.8 | 1.3 | 5.1 |

-continued

| | 20° C. | | 40° C. | |
|---|---|---|---|---|
| Stain | Comp. 3 | Comp. 4 | Comp. 3 | Comp. 4 |
| Sebum BEY with carbon black (CFT CS32 [CO]) | 0.7 | 1.4 | 0.5 | 0.7 |
| Chocolate drink, pure (CFT CS44 [CO]) | n.d. | 1.4 | n.d. | 0.8 |

Without limiting the scope and interpretation of the patent claims, certain technical effects of one or more of the aspects or embodiments disclosed herein are listed in the following: A technical effect is degradation or modification of mannan. Another technical effect is provision of mannanase which has good storage stability. The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed aspects and embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims. In an embodiment at least one component of the compositions of the invention has a different chemical, structural or physical characteristic compared to the corresponding natural component from which the at least one component is derived from. In an embodiment said characteristic is at least one of uniform size, homogeneous dispersion, different isoform, different codon degeneracy, different post-translational modification, different methylation, different tertiary or quaternary structure, different enzyme activity, different affinity, different binding activity, and different immunogenicity.

The invention claimed is:

1. A detergent composition comprising at least one enzyme having an amino acid sequence having at least 96% sequence identity to the amino acid sequence of SEQ ID NO: 12, wherein the at least one enzyme has mannan degrading activity.

2. The detergent composition of claim 1, wherein the at least one enzyme has an amino acid sequence having at least 98% sequence identity to the amino acid sequence of SEQ ID NO: 12.

3. The detergent composition of claim 1, wherein the at least one enzyme has an amino acid sequence having at least 99% sequence identity to the amino acid sequence of SEQ ID NO: 12.

4. The detergent composition of claim 1, 2, or 3, wherein the composition further comprises one or more additional enzymes selected from the group consisting of: protease, lipase, cutinase, amylase, carbohydrase, cellulase, pectinase, pectatlyase, mannanase, arabinase, galactanase, xylanase, oxidase, xanthanase, laccase, and/or peroxidase enzymes.

5. The detergent composition of claim 1, wherein the composition is in form of a bar, a homogenous tablet, a tablet having two or more layers, a pouch having one or more compartments, a regular or compact powder, a granule, a paste, a gel, or a regular, compact or concentrated liquid.

6. The detergent composition of claim 1, wherein the detergent composition is a laundry detergent composition, preferably a liquid or solid laundry detergent composition.

7. A method for degrading mannan, the method comprising administering the detergent composition of any one of claim 1, 2, or 3.

8. The method of claim 7, wherein the method is part of a laundry process.

9. A method for removing a stain from a surface, comprising contacting the surface with a detergent composition according to claim 1, 2, or 3.

10. A method for degrading mannan comprising applying a detergent composition according to claim 1 to mannan.

11. The method for degrading mannan of claim 10, wherein the mannan is on the surface of a textile.

* * * * *

SEQUENCE LISTING

```
Sequence total quantity: 48
SEQ ID NO: 1            moltype = DNA  length = 39
FEATURE                 Location/Qualifiers
misc_feature            1..39
                        note = primer
source                  1..39
                        mol_type = other DNA
                        organism = synthetic construct
SEQUENCE: 1
caaccgcctc tgcagcttat gcacaaaacg gatttcacg                          39

SEQ ID NO: 2            moltype = DNA  length = 39
FEATURE                 Location/Qualifiers
misc_feature            1..39
                        note = primer
source                  1..39
                        mol_type = other DNA
                        organism = synthetic construct
SEQUENCE: 2
cggtatatct ctgtcttaat cactcttaag cccattttc                          39

SEQ ID NO: 3            moltype = DNA  length = 37
FEATURE                 Location/Qualifiers
misc_feature            1..37
                        note = primer
```

```
source                  1..37
                        mol_type = other DNA
                        organism = synthetic construct
SEQUENCE: 3
caaccgcctc tgcagcttct gatggtcata gccaaac                        37

SEQ ID NO: 4            moltype = DNA  length = 36
FEATURE                 Location/Qualifiers
misc_feature            1..36
                        note = primer
source                  1..36
                        mol_type = other DNA
                        organism = synthetic construct
SEQUENCE: 4
cggtatatct ctgtcttatt ggattgttac atgatc                         36

SEQ ID NO: 5            moltype = DNA  length = 40
FEATURE                 Location/Qualifiers
misc_feature            1..40
                        note = primer
source                  1..40
                        mol_type = other DNA
                        organism = synthetic construct
SEQUENCE: 5
caaccgcctc tgcagctgca agcgggtttt atgtaaacgg                     40

SEQ ID NO: 6            moltype = DNA  length = 39
FEATURE                 Location/Qualifiers
misc_feature            1..39
                        note = primer
source                  1..39
                        mol_type = other DNA
                        organism = synthetic construct
SEQUENCE: 6
cggtatatct ctgtcttatt taatggtaac gttatcaac                      39

SEQ ID NO: 7            moltype = DNA  length = 17
FEATURE                 Location/Qualifiers
misc_feature            1..17
                        note = primer
source                  1..17
                        mol_type = other DNA
                        organism = synthetic construct
SEQUENCE: 7
agctgcagag gcggttg                                              17

SEQ ID NO: 8            moltype = DNA  length = 21
FEATURE                 Location/Qualifiers
misc_feature            1..21
                        note = primer
source                  1..21
                        mol_type = other DNA
                        organism = synthetic construct
SEQUENCE: 8
gacagagata taccgacagt g                                         21

SEQ ID NO: 9            moltype = DNA  length = 975
FEATURE                 Location/Qualifiers
source                  1..975
                        mol_type = genomic DNA
                        organism = Bacillus clausii
SEQUENCE: 9
atgaagaggg aggacatgga tcaaatgaaa agaaagcggt tacaattgtt tggaacacta  60
gtggtattgg ttttgttcgt gtacggtagc ggttcggcat atgcacaaaa cggatttcac  120
gtatccggta cagagttgtt ggacaaaaat ggcgatcctt atgttatgcg tggcgtcaac  180
catggacact cttggtttaa gcaagatctg gaggaagcaa tccctgccat agcagaaaca  240
ggggcgaaca cggtgagaat ggtcttatcc aatggacagc aatgggaaaa agatgatgcc  300
tctgagcttg cccgtgtgct ggctgccaca gaaacatatg gattgacaac tgtgctggaa  360
gtccatgacg ctacaggaag tgacgatcct gctgatttag agaaagcagt cgattattgg  420
atcgaaatgg ctgatgttct caaggggaca gaagaccgag taatcattaa cgttgccaat  480
gaatggtatg ggtcgtggag gagcgacgtt tgggcagaag catacgcaca agcgatcccg  540
cgcttgcgca gcgctggcct ctcccataca ttaatggttg atgcggcagg ttggggccag  600
taccctgcct ccatccacga gcggggagcc gatgtgtttg cgtccgatcc attaaaaaac  660
acgatgtttt cgatccatat gtacgaatat gcaggagctg atagggcgac aattgcctat  720
aacattgatc gtgtgcttgc tgaaaatctt gctgtggtga tcggtgaatt tggccatagg  780
catcatgatg gcgatgtcga tgaagatgcg attttggcct atacagcaga gcggcaagtg  840
ggctggctgg cctggtcatg gtatggcaac agcgggggtg ttgaatactt ggatttagct  900
gaaggcccat caggcccatt gacgagttgg ggcaaacgaa ttgtttatgg tgaaaatggg  960
cttaagagtg attaa                                                975
```

-continued

```
SEQ ID NO: 10          moltype = DNA  length = 870
FEATURE                Location/Qualifiers
source                 1..870
                       mol_type = genomic DNA
                       organism = Bacillus clausii
SEQUENCE: 10
cagaacggct tccacgtctc cggcacggag ctcctggaca agaacggcga cccttacgtc  60
atgcgcggcg tcaaccacgg ccacagctgg ttcaagcagg acctcgagga agccatccct  120
gctatcgctg agacgggcgc taacacggtc cgcatggtcc tgagcaacgg ccagcagtgg  180
gagaaggacg acgctagcga gctggctcgc gtcctcgctg ctacggagac gtacggcctc  240
accacggtcc tggaggtcca cgacgctacg ggctcggacg accccgccga cctcgagaag  300
gccgtcgact actggatcga gatggctgac gtcctgaagg gcaccgagga ccgcgtcatc  360
atcaacgtcg ccaacgagtg gtacggctcc tggcgcagcg acgtctgggc cgaggcctac  420
gctcaggcta tccctcgcct ccgctcggcc ggcctctccc acacgctcat ggtcgacgct  480
gccggctggg gccagtaccc tgcttccatc cacgagcgcg gcgctgacgt ctttgcttcg  540
gacccccctga agaacaccat gttctccatc cacatgtacg agtacgctgg cgctgaccgc  600
gctaccatcg cctacaacat cgaccgcgtc ctggctgaga acctggctgt cgtcatcggc  660
gagtttggcc accgccacca cgacggcgac gtcgacgagg acgctatcct ggcttacacc  720
gccgagcgcc aggtcggctg gctggcttgg tcgtggtacg gcaactcggg cggcgtcgag  780
tacctggacc tggctgaggg cccttcgggc cctctcacga gctggggcaa gcgcatcgtc  840
tacggcgaga acggcctgaa gagcgactaa                                  870

SEQ ID NO: 11          moltype = AA  length = 324
FEATURE                Location/Qualifiers
source                 1..324
                       mol_type = protein
                       organism = Bacillus clausii
SEQUENCE: 11
MKREDMDQMK RKRLQLFGTL VVLVLFVYGS GSAYAQNGFH VSGTELLDKN GDPYVMRGVN  60
HGHSWFKQDL EEAIPAIAET GANTVRMVLS NGQQWEKDDA SELARVLAAT ETYGLTTVLE  120
VHDATGSDDP ADLEKAVDYW IEMADVLKGT EDRVIINVAN EWYGSWRSDV WAEAYAQAIP  180
RLRSAGLSHT LMVDAAGWGQ YPASIHERGA DVFASDPLKN TMFSIHMYEY AGADRATIAY  240
NIDRVLAENL AVVIGEFGHR HHDGDVDEDA ILAYTAERQV GWLAWSWYGN SGGVEYLDLA  300
EGPSGPLTSW GKRIVYGENG LKSD                                        324

SEQ ID NO: 12          moltype = AA  length = 289
FEATURE                Location/Qualifiers
source                 1..289
                       mol_type = protein
                       organism = Bacillus clausii
SEQUENCE: 12
QNGFHVSGTE LLDKNGDPYV MRGVNHGHSW FKQDLEEAIP AIAETGANTV RMVLSNGQQW  60
EKDDASELAR VLAATETYGL TTVLEVHDAT GSDDPADLEK AVDYWIEMAD VLKGTEDRVI  120
INVANEWYGS WRSDVWAEAY AQAIPRLRSA GLSHTLMVDA AGWGQYPASI HERGADVFAS  180
DPLKNTMFSI HMYEYAGADR ATIAYNIDRV LAENLAVVIG EFGHRHHDGD VDEDAILAYT  240
AERQVGWLAW SWYGNSGGVE YLDLAEGPSG PLTSWGKRIV YGENGLKSD              289

SEQ ID NO: 13          moltype = DNA  length = 1473
FEATURE                Location/Qualifiers
source                 1..1473
                       mol_type = genomic DNA
                       organism = Bacillus hemicellulosilyticus
SEQUENCE: 13
atgagaaatt tcggtaagtt aattgtcagt tcttgtcttc tattcagttt ttttcttttt  60
gcctctgatg gtcatagcca aacacattct ggtttttata tcgaaggttc aaccctttat  120
gacgccaacg gagagccctt tgtaatgaga ggtatcaatc atggacatgc ctggtataaa  180
catgattcta acgtcgctat accagctatt gctaatcaag gagcaaatac aattcgtatt  240
gttctgtcag atggtggtca atgggcaaaa gatgatataa acacattaaa tcaagtgctc  300
gatttagcag aggaacatga gatgattgct gttgttgagg ttcacgatgc aacaggatct  360
aattctatgg ctgacttaaa tcgtgctgtc gattattgga ttgaaatgaa agacgcttta  420
attggaaaag aagatcgcgt cataattaac attgccaatg aatggtatgg agcatgggac  480
ggacaaggct gggcaaatgg ctataaggag gttattccac gtttacgaaa tgctggcttc  540
actcatacat taatggtaga tgcagctggt tggggacaat accctcaatc gattcatgat  600
tatggtcaag aggtatttaa tgctgatcct ttagcaaata cgatgttttc catccatatg  660
tatgaatatg ctggcggaaa tgcttcaatg gtacaatcta atatcgatgg tgtcgtcgat  720
caagggttag ctcttgtaat aggagaattt gggcatatgc atacggacgg agatgttgat  780
gaagcaacga tattgagcta ctcgcaacaa agaggagtcg gttggctagc ttggtcttgg  840
aaaggcaatg ggactcaatg ggaatatcta gatttatctt atgattggca aggaacaaac  900
ttaacttctt ggggaaatac cattgtccac gggcctaatg gattactcga aacatccatt  960
ccaagctcga ttttccatac cgctccaaac aatggagatc cccctcctca taacggtaat  1020
gaaacgatct tatatgattt cgaacatggc actcaaggct ggtcaggttc ttcacttctt  1080
ggaggacctt ggacgacgaa tgaatggagt acaaatggta accattcatt aaaggccgat  1140
attttcttat cagctaactc caaacatgaa ttagcaaaag ttgaaaatcg aaatttatca  1200
ggctactcta ctttacaagc cactgtccgc catgcacatt ggggaaatgt tggtaattta  1260
acggcgagaa tgtatgtaaa aacgggctca aactatagct ggtttaatgg tgatcctatc  1320
ccagtaaact cagcaaatgg tacgactgtc actttgcctc tttcatctat tccaaaccta  1380
aatgacgtaa aagaaattgg cgttgaattt attggagctt caaatagcaa tggacaaacc  1440
gccatttatt tagatcatgt aacaatccaa taa                              1473
```

-continued

```
SEQ ID NO: 14          moltype = DNA  length = 1395
FEATURE                Location/Qualifiers
source                 1..1395
                       mol_type = genomic DNA
                       organism = Bacillus hemicellulosilyticus
SEQUENCE: 14
cagacccact cgggcttcta catcgagggc tcgacgctct acgacgctaa cggcgagcct  60
tttgtcatgc gcggcatcaa ccacggccac gcctggtaca agcacgactc caacgtcgct  120
atccctgcta tcgctaacca gggcgctaac accatccgca tcgtcctcag cgacggtggc  180
cagtgggcca aggacgacat caacacgctg aaccaggtcc tcgacctggc cgaggagcac  240
gagatgatcg ctgtcgtcga ggtccacgac gctaccggct ccaacagcat ggccgacctc  300
aaccgcgccg tcgactactg gatcgagatg aaggacgccc tgatcggcaa ggaagaccgc  360
gtcatcatca acatcgctaa cgagtggtac ggcgcttggg acggccaggg ctgggccaac  420
ggctacaagg aagtcatccc tcgcctgcgc aacgctggct tcacccacac cctcatggtc  480
gacgctgccg gctggggcca gtaccctcag agcatccacg actacggcca agaggtcttc  540
aacgccgacc ctctggccaa caccatgttc tccatccaca tgtacgagta cgctggcggc  600
aacgcctcca tggtccagag caacatcgac ggcgtcgtcg accagggcct cgctctggtc  660
atcggcgagt tcggccacat gcacacggac ggcgacgtcg acgaggctac catcctgagc  720
tactcgcagc agcgcggcgt cggctggctg gcctggtcgt ggaagggcaa cggcacccag  780
tgggagtacc tcgacctgag ctacgactgg cagggcacca acctcacgtc gtggggcaac  840
acgatcgtcc acggccctaa cggcctcctg gagacgtcca tcccttccag catctttcac  900
accgctccta acaacggcga ccctcctccc cacaacggca acgagacgat cctgtacgac  960
ttcgagcacg gcacgcaggg ctggtcgggc tcgtccctgc tgggcggccc ttggaccacc  1020
aacgagtggt cgaccaacgg caaccactcc ctcaaggccg acatcttcct gtccgccaac  1080
agcaagcacg agctcgccaa ggtcgagaac cgcaacctca gcggctactc gacgctgcag  1140
gctaccgtcc gccacgctca ctggggcaac gtcggcaacc tgacggctcg catgtacgtc  1200
aagacgggca gcaactactc gtggttcaac ggcgacccca tccctgtcaa ctcggctaac  1260
ggcaccaccg tcaccctccc tctgagctcg atccccaacc tcaacgacgt caaggagatc  1320
ggcgtcgagt tcatcggcgc tagcaacagc aacggccaga ccgccatcta cctggaccac  1380
gtcacgatcc agtaa                                                   1395

SEQ ID NO: 15          moltype = AA  length = 490
FEATURE                Location/Qualifiers
source                 1..490
                       mol_type = protein
                       organism = Bacillus hemicellulosilyticus
SEQUENCE: 15
MRNFGKLIVS SCLLFSFFLF ASDGHSQTHS GFYIEGSTLY DANGEPFVMR GINHGHAWYK  60
HDSNVAIPAI ANQGANTIRI VLSDGGQWAK DDINTLNQVL DLAEEHEMIA VVEVHDATGS  120
NSMADLNRAV DYWIEMKDAL IGKEDRVIIN IANEWYGAWD GQGWANGYKE VIPRLRNAGF  180
THTLMVDAAG WGQYPQSIHD YGQEVFNADP LANTMFSIHM YEYAGGNASM VQSNIDGVVD  240
QGLALVIGEF GHMHTDGDVD EATILSYSQQ RGVGWLAWSW KGNGTQWEYL DLSYDWQGTN  300
LTSWGNTIVH GPNGLLETSI PSSIFHTAPN NGDPPPHNGN ETILYDFEHG TQGWSGSSLL  360
GGPWTTNEWS TNGNHSLKAD IFLSANSKHE LAKVENRNLS GYSTLQATVR HAHWGNVGNL  420
TARMYVKTGS NYSWFNGDPI PVNSANGTTV TLPLSSIPNL NDVKEIGVEF IGASNSNGQT  480
AIYLDHVTIQ                                                        490

SEQ ID NO: 16          moltype = AA  length = 464
FEATURE                Location/Qualifiers
source                 1..464
                       mol_type = protein
                       organism = Bacillus hemicellulosilyticus
SEQUENCE: 16
QTHSGFYIEG STLYDANGEP FVMRGINHGH AWYKHDSNVA IPAIANQGAN TIRIVLSDGG  60
QWAKDDINTL NQVLDLAEEH EMIAVVEVHD ATGSNSMADL NRAVDYWIEM KDALIGKEDR  120
VIINIANEWY GAWDGQGWAN GYKEVIPRLR NAGFTHTLMV DAAGWGQYPQ SIHDYGQEVF  180
NADPLANTMF SIHMYEYAGG NASMVQSNID GVVDQGLALV IGEFGHMHTD GDVDEATILS  240
YSQQRGVGWL AWSWKGNGTQ WEYLDLSYDW QGTNLTSWGN TIVHGPNGLL ETSIPSSIFH  300
TAPNNGDPPP HNGNETILYD FEHGTQGWSG SSLLGGPWTT NEWSTNGNHS LKADIFLSAN  360
SKHELAKVEN RNLSGYSTLQ ATVRHAHWGN VGNLTARMYV KTGSNYSWFN GDPIPVNSAN  420
GTTVTLPLSS IPNLNDVKEI GVEFIGASNS NGQTAIYLDH VTIQ                  464

SEQ ID NO: 17          moltype = DNA  length = 1449
FEATURE                Location/Qualifiers
source                 1..1449
                       mol_type = genomic DNA
                       organism = Virgibacillus soli
SEQUENCE: 17
atgttattct ctacttcact gtttacttct acttcaaaag cgaatgcagc aagcgggttt  60
tatgtaaacg gaaacacact ctatgacgca acaggtaccc cttttgtgat aagaggaatc  120
aatcatgctc actcttggtt taaagacgac acagcaaccg caatacctgc cattgcagca  180
actggggcga atactattag aatcgtatta tcggatggca gccaatatag tcgggatgat  240
attgatggcg tgaggaatct aatatcattg gctgaggaaa ataatctaat tgctatgtta  300
gaggtccacg atgctactgg aaaagatgat atcagctcat tagatagtgc ggcagattat  360
tggattagta taaaagaagc acttatcggc aaggaagaca aagtcctaat aaacatcgca  420
aatgaatggt acggtacttg ggatggggct agttgggcgg atggctacaa acaagtgatt  480
cccaaattaa gaaatgcagg acttaaccac acactaatag tagactctgc tggctggggg  540
caatttccgg agtccattca caattacgga aaagaagtat tcaatgctga ccccctacaa  600
```

```
aatacaatgt tctctattca tatgtatgaa tatgctggtg gggacgcttc tactgtcaaa  660
gcaaatattg acggtgtatt aaatcaaggt ctagccgtaa tcattggaga atttggacat  720
aggcatacag acggagatgt agatgaagca acaattatga attattccca agagaaaaat  780
gttggctggc tcgcatggtc gtggaaaggt aatggcatgg aatgggatta tttagactta  840
tcctatgatt gggccggaaa taacctaacc gactggggaa ataccattgt aaatagtaca  900
aacggcttaa aagctacatc tgaaataagt ccagtatttg gagatggaga tgacggtgta  960
ggcgacggtg gtcctgggga ttctaacgga actgaaacta cgctttataa cttcgaaacc  1020
gggacagaag gatggagcgg cgaaaatata gaaactggac cttggtcagt gaatgagtgg  1080
gcagcaaaag gtaaccactc tttaaaagct gatgttaatt tgggtgataa ctctgaacat  1140
tatctatacc taactcaaaa cctaaatttt agcggaaagt cacaactcac agcgactgta  1200
aagcatgctg attggggaaa cttcggggat gaaataaatg caaagttata tgtaaaaaca  1260
gaatcagatt ggcaatggtt tgatggagga attgaaaaga tcaattcttc aattggaact  1320
attataacct tagatttatc atcgctctca aacccaagtg atattaaaga agttggtgtt  1380
cagtttacgg gttcttcaaa tagttatggc ctaacagctt tatatgttga taacgttacc  1440
attaaataa                                                          1449

SEQ ID NO: 18          moltype = DNA  length = 1401
FEATURE                Location/Qualifiers
source                 1..1401
                       mol_type = genomic DNA
                       organism = Virgibacillus soli
SEQUENCE: 18
gcctcgggct tctacgtcaa cggcaacact ctctacgacg ccacgggcac cccatttgtc  60
atccgcggca tcaaccacgc tcactcgtgg ttcaaggacg acactgccac cgctatccct  120
gctatcgctg ctacgggcgc caacacgatc cgcatcgtcc tcagcgacgg ctcgcagtac  180
tcccgcgacg acatcgacgg cgtccgcaac ctcatctccc tggccgagga gaacaacctc  240
atcgccatgc tggaggtcca cgacgctacc ggcaaggacg acatcagctc gctggacagc  300
gccgccgact actggatctc gatcaaggaa gccctcatcg gcaaggaaga caaggtcctg  360
atcaacatcg ccaacgagtg gtacggcacc tgggacggcg ctagctgggc tgacggctac  420
aagcaggtca tccctaagct ccgcaacgcc ggcctcaacc acacgctcat cgtcgactcg  480
gctggctggg gccagttccc ggagagcatc cacaactacg gcaaggaagt cttcaacgcc  540
gaccccctgc agaacacgat gttctcgatc cacatgtacg agtacgccgg cggcgacgct  600
tccacggtca aggccaacat cgacggcgtc ctcaaccagg gcctggctgt catcatcggc  660
gagtttggcc accgccacac cgacggcgac gtcgacgagg ccaccatcat gaactacagc  720
caggagaaga acgtcggctg gctggcttgg agctggaagg gcaacggcat ggagtgggac  780
tacctcgacc tgagctacga ctgggccggc aacaacctca ccgactgggg caacacgatc  840
gtcaactcga ccaacggcct gaaggccacc tcggagatca gccctgtctt tggcgacggc  900
gacgacggcg tcggcgacgg tggccccggc gacagcaacg gcaccgagac gacgctgtac  960
aactttgaga cgggcaccga gggctggagc ggcgagaaca tcgagacggg cccttggtcg  1020
gtcaacgagt gggctgccaa gggcaaccac tccctcaagg ccgacgtcaa cctgggcgac  1080
aacagcgagc actacctcta cctgacgcag aacctcaact tctccggcaa gtcgcagctg  1140
acggctaccg tcaagcacgc tgactggggc aacttcggcg acgagatcaa cgccaagctc  1200
tacgtcaaga ccgagagcga ctggcagtgg ttcgacggtg gcatcgagaa gatcaactcc  1260
agcatcggca ccatcatcac gctcgacctg tcgtccctgt cgaacccgtc cgacatcaag  1320
gaagtcggcg tccagttcac tggctcgtct aactcttacg gcctcactgc tctttacgtc  1380
gacaacgtca ctatcaagta g                                            1401

SEQ ID NO: 19          moltype = AA  length = 482
FEATURE                Location/Qualifiers
source                 1..482
                       mol_type = protein
                       organism = Virgibacillus soli
SEQUENCE: 19
MLFSTSLFTS TSKANAASGF YVNGNTLYDA TGTPFVIRGI NHAHSWFKDD TATAIPAIAA  60
TGANTIRIVL SDGSQYSRDD IDGVRNLISL AEENNLIAML EVHDATGKDD ISSLDSAADY  120
WISIKEALIG KEDKVLINIA NEWYGTWDGA SWADGYKQVI PKLRNAGLNH TLIVDSAGWG  180
QFPESIHNYG KEVFNADPLQ NTMFSIHMYE YAGGDASTVK ANIDGVLNQG LAVIIGEFGH  240
RHTDGDVDEA TIMNYSQEKN VGWLAWSWKG NGMEWDYLDL SYDWAGNNLT DWGNTIVNST  300
NGLKATSEIS PVFGDGDDGV GDGGPGDSNG TETTLYNFET GTEGWSGENI ETGPWSVNEW  360
AAKGNHSLKA DVNLGDNSEH YLYLTQNLNF SGKSQLTATV KHADWGNFGD EINAKLYVKT  420
ESDWQWFDGG IEKINSSIGT IITLDLSSLS NPSDIKEVGV QFTGSSNSYG LTALYVDNVT  480
IK                                                                 482

SEQ ID NO: 20          moltype = AA  length = 466
FEATURE                Location/Qualifiers
source                 1..466
                       mol_type = protein
                       organism = Virgibacillus soli
SEQUENCE: 20
ASGFYVNGNT LYDATGTPFV IRGINHAHSW FKDDTATAIP AIAATGANTI RIVLSDGSQY  60
SRDDIDGVRN LISLAEENNL IAMLEVHDAT GKDDISSLDS AADYWISIKE ALIGKEDKVL  120
INIANEWYGT WDGASWADGY KQVIPKLRNA GLNHTLIVDS AGWGQFPESI HNYGKEVFNA  180
DPLQNTMFSI HMYEYAGGDA STVKANIDGV LNQGLAVIIG EFGHRHTDGD VDEATIMNYS  240
QEKNVGWLAW SWKGNGMEWD YLDLSYDWAG NNLTDWGNTI VNSTNGLKAT SEISPVFGDG  300
DDGVGDGGPG DSNGTETTLY NFETGTEGWS GENIETGPWS VNEWAAKGNH SLKADVNLGD  360
NSEHYLYLTQ NLNFSGKSQL TATVKHADWG NFGDEINAKL YVKTESDWQW FDGGIEKINS  420
SIGTIITLDL SSLSNPSDIK EVGVQFTGSS NSYGLTALYV DNVTIK                 466

SEQ ID NO: 21          moltype = DNA  length = 60
```

-continued

```
FEATURE                Location/Qualifiers
misc_feature           1..60
                       note = primer
source                 1..60
                       mol_type = other DNA
                       organism = synthetic construct
SEQUENCE: 21
agtcaatcgc gacaagcgcc agacccactc gggcttctac atcgagggct cgacgctcta  60

SEQ ID NO: 22          moltype = DNA  length = 46
FEATURE                Location/Qualifiers
misc_feature           1..46
                       note = primer
source                 1..46
                       mol_type = other DNA
                       organism = synthetic construct
SEQUENCE: 22
cgcgccggat ccttactgga tcgtgacgtg gtccaggtag atggcg                 46

SEQ ID NO: 23          moltype = DNA  length = 60
FEATURE                Location/Qualifiers
misc_feature           1..60
                       note = primer
source                 1..60
                       mol_type = other DNA
                       organism = synthetic construct
SEQUENCE: 23
agtcaatcgc gacaagcgcc agaacggctt ccacgtctcc ggcacggagc tcctggacaa  60

SEQ ID NO: 24          moltype = DNA  length = 51
FEATURE                Location/Qualifiers
misc_feature           1..51
                       note = primer
source                 1..51
                       mol_type = other DNA
                       organism = synthetic construct
SEQUENCE: 24
cgcgccggat ccttagtcgc tcttcaggcc gttctcgccg tagacgatgc g           51

SEQ ID NO: 25          moltype = DNA  length = 1846
FEATURE                Location/Qualifiers
source                 1..1846
                       mol_type = genomic DNA
                       organism = Bacillus pumilus
SEQUENCE: 25
atgaaaaaat gggttcaacg ggtggcttgt tttatgctgc tgatcacttt atgggcgggt  60
tggttcactc tgaccgtaaa ggcctcctcc tatgtgcaaa catctggtac acattttgta  120
ttgaacaacc acccatttta ctttgctggc acaaataatt attatttcca ttacaaatca  180
aaaaagatgg tagatgctgt ttttgacgat atgaaggcaa tggatttaaa ggttattcgt  240
atttggggat ttcacgatgg taccccctcaa gaaaactcag tcttacaatc tcgtccaggt  300
gtttatgaag aatccggttt tcaaaaacta gactatgcga tttataaagc agggcaggaa  360
ggaatcaagc tggtcatacc gctcgtgaac aattgggatg actttggcgg gatgaatcaa  420
tatgtgaagt ggtttcaggc aggatcacat gatcactttt atacagattc tcggattaaa  480
acagcttaca aaaactatgt gcgctatgta ttagagagaa ccaatacgta ctcaggtgtt  540
caatataaag atgaccctgc tattatgaca tgggagctcg ccaatgagcc gcgcgctcag  600
tcagaccctt cgggagatat actagtaaac tgggcagatg aaatgagtgc atggatcaaa  660
tcaattgact cgaatcatct tgttgctgta ggagacgaag ggttctttcg catgacaggt  720
catgatgatt ggttttacag tggaggagaa ggtgttgatt gggatcgttt gactgctctc  780
cctcatattg attatggaac ctatcattta tacccggatc actggaatca gtctgctgca  840
tggggagtga aatggatcaa agatcatatc acccgaggaa acgcaatcgg aaaacctgtt  900
gtattagaag agtttggcta tcaaaatcaa gcagcccgtc ctgatgtata tgatagctgg  960
ctgaagacaa ttgaacagct cggaggcgca ggtagccaat tttggatttt aacaagcatt  1020
caagacgatg attccctcta cccggattat gatggttttc gagttttaaa ggagagccgg  1080
gaggcaggaa ttattcgtga acacgccaaa agaatgaatg aaaagaactg atgaagaatg  1140
cctgtttata aggaacttca tttgcataaa aaaattggat atggtatagt ttttatggaa  1200
atgctaacga ttaccgagac aagagtgggg aaacccgctc ttttgtattg aacaggcaat  1260
ttttgtctcg acattattca tccgttttct gctccccctg ctcacaataa agcagggttt  1320
ttatgcagaa tgattgataa gagcgtttat cgaaagcaca aggaggaaga gaatgagcaa  1380
aaaagtagtg gatatcgtaa gcgacatggt gcagccaatt ttagatggct tacagcttga  1440
actcgttgat gttgaatttg tcaaagaggg tcaaaactgg ttccttcgcg tatttattga  1500
ctctgataaa ggcgtcgata tcgaggagtg tgccaaagtg agcgaagcct tgagcgaaaa  1560
gcttgatgag gcagatccaa ttagccaaaa ctactttctt gaagtgtcct ctcctggagc  1620
ggagcgccca ttaaagaaaa aagctgattt tgaaaaagca cttggaaaaa atgttttcat  1680
gaaaacatac gaaccaattg atggtgaaaa ggcatttgaa ggtgagctta caagctttga  1740
tggtgagatt gcaacagtga cagtgaagat caagacaaga aagaaagaga tcaatattcc  1800
atacgaaaaa attgctaacg caagattagc agtttcgttc aattaa                 1846

SEQ ID NO: 26          moltype = AA  length = 376
FEATURE                Location/Qualifiers
```

```
source                  1..376
                        mol_type = protein
                        organism = Bacillus pumilus
SEQUENCE: 26
MKKWVQRVAC FMLLITLWAG WFTLTVKASS YVQTSGTHFV LNNHPFYFAG TNNYYFHYKS  60
KKMVDAVFDD MKAMDLKVIR IWGFHDGTPQ ENSVLQSRPG VYEESGFQKL DYAIYKAGQE  120
GIKLVIPLVN NWDDFGGMNQ YVKWFQAGSH DHFYTDSRIK TAYKNYVRYV LERTNTYSGV  180
QYKDDPAIMT WELANEPRAQ SDPSGDILVN WADEMSAWIK SIDSNHLVAV GDEGFFRMTG  240
HDDWFYSGGE GVDWDRLTAL PHIDYGTYHL YPDHWNQSAA WGVKWIKDHI TRGNAIGKPV  300
VLEEFGYQNQ AARPDVYDSW LKTIEQLGGA GSQFWILTSI QDDDSLYPDY DGFRVLKESR  360
EAGIIREHAK RMNEKN                                                  376

SEQ ID NO: 27           moltype = DNA  length = 1083
FEATURE                 Location/Qualifiers
source                  1..1083
                        mol_type = genomic DNA
                        organism = Bacillus amyloliquefaciens
SEQUENCE: 27
atgctcaaaa agttcgcagt ctgtctgtct atcattttat tactcatctc agccgcccgt  60
ccgatatcgg ctcacaccgt ttaccctgtc aatcccaatg cccagcagac gacaaaagac  120
gtcatgaact ggctggcgca tttgcccaac cgttcagaaa acagggtcat gtccggtgca  180
ttcggcgggt acagcgatgt caccttttca atgacggagg aaaaccgctt gaaaaacgcg  240
acgggacagt ctcccgccat ctacggctgt gattatggga gagggtggct ggaaacatcg  300
gatatcaccg attctatcga ctacagctgc aacagcagcc tcatttcgta ctggaaaagc  360
ggcggcctcc ctcaggtcag cctgcatctc gcaaatccgg cctttccatc aggacactat  420
aaaacggcca tttcaaacag ccagtataaa aatatcctga acccttcaac tgttgaagga  480
cggcggcttg aggccttgct cagcaaaatc gccgacggcc ttactcagct gaaaaatcaa  540
ggcgtcaccg ttctgttcag gccgctgcat gagatgaacg gtgaatggtt ctggtggggg  600
ctgacaggct acaaccaaaa agacactgag agaatctcgc tgtacaaaga gctttacaag  660
aagatatacc gctatatgac agagacaaga ggattggata atcttttgtg ggtgtattcg  720
cctgatgcca acagagactt caaaacagac ttctacccag gctcatctta tgtggatatt  780
accggactgg atgcttactt caccgacccg tatgcgatat caggctatga tgaaatgctg  840
tctctgaaaa aaccgtttgc ctttgccgag accggtccgt ccggtaatat cggaagcttt  900
gattacgctg tttttatcaa tgcgatcagg caaaagtatc ccgagacaac ctactttttg  960
acatgggatg aacaattaag cccggcagcc aatcaaggcg cgcaaagcct ttatcaaaac  1020
agctggacgc tgaacaaggg cgaaatgtgg aatggcggaa ccttgacgcc gatcgcggaa  1080
taa                                                                1083

SEQ ID NO: 28           moltype = AA  length = 360
FEATURE                 Location/Qualifiers
source                  1..360
                        mol_type = protein
                        organism = Bacillus amyloliquefaciens
SEQUENCE: 28
MLKKFAVCLS IILLLISAAR PISAHTVYPV NPNAQQTTKD VMNWLAHLPN RSENRVMSGA  60
FGGYSDVTFS MTEENRLKNA TGQSPAIYGC DYGRGWLETS DITDSIDYSC NSSLISYWKS  120
GGLPQVSLHL ANPAFPSGHY KTAISNSQYK NILNPSTVEG RRLEALLSKI ADGLTQLKNQ  180
GVTVLFRPLH EMNGEWFWWG LTGYNQKDTE RISLYKELYK KIYRYMTETR GLDNLLWVYS  240
PDANRDFKTD FYPGSSYVDI TGLDAYFTDP YAISGYDEML SLKKPFAFAE TGPSGNIGSF  300
DYAVFINAIR QKYPETTYFL TWDEQLSPAA NQGAQSLYQN SWTLNKGEMW NGGTLTPIAE  360

SEQ ID NO: 29           moltype = DNA  length = 1494
FEATURE                 Location/Qualifiers
source                  1..1494
                        mol_type = genomic DNA
                        organism = Amphibacillus xylanus
SEQUENCE: 29
gtgaagttaa ctaaactaaa actattgagt agtgtatttt ttgttgtatt aactgtgtta  60
atgttgtttg tccctgggaa tattgtgaat gtaaaagctg ctaacggctt ttatgtaagc  120
gattccaatc tgtatgatgc aaatggaaat caatttgtta tgcgtggggt taatcatgcc  180
cattcatggt ataaggacac gtataccgag gcaattcctg caattgcggc tacaggagcg  240
aatactatcc gaattgtatt atctgatgga gggcaatacc aaaaagatga tataaacata  300
gtcagaaatt tgattgaaac cgcagaagcc aataatttag tcgctgtact tgaggttcat  360
gatgctactg ggtcggattc attatcggat ttgaaccggg ctgtagatta ttggattgaa  420
attaaagatg cgttaattgg taaagaagat acggtgatca taaacattgt caatgaatgg  480
tatggcactt gggatggtcg tctctgggca gatggttata aacaggcgat accgagatta  540
agagatgctg gattaacaca tacgttgatg attgatgcag caggttgggg gcaatttcct  600
agctcgatcc atcaatatgg tagagaagta tttaatgcag atcgtttagg gaatacaatg  660
ttttcgattc atatgtatga atatgctggc ggtgatgatc aaatggttag agataatatt  720
aacggtgtga tcaatcaaga cttagctcta gtgattggtg aatttggtca ttatcacaca  780
gatggcgatg ttgatgaaga tacgattttg agttacgcgg agcagacagg tgttggttgg  840
ttagcatggt catggaaagg caatggaact gagtgggagt atcttgatct atcaaatgat  900
tggggaggaa attatttaac atcttggggt gacaggattg taaatggagc aaatggatta  960
agagaaacga gtcaaattgc ttctgttttt tcaggaaaca atggcgggac tcctggaaat  1020
ggtgaggaag agactcctgg tgatgtaagt catttcgcaa acttcgagaa tggtactgaa  1080
ggttgggaag caagcaatgt atctggtgga ccttgggcaa caaatgaatg gagtgctagt  1140
ggttcatatg ctttaaaagc cgatgcgcaa ttagcatctg gaagagaaca ctatttatat  1200
cgaatcggtc cctttaattt atctgggtca acattaaacg caacggtaag ggtgctaaat  1260
tgggggaatt atggatctgg tatcgacgtg aagctatacg ttaagtacgg agatggctgg  1320
```

-continued

```
acgtggagag atagtggtgt acagacaatt agagcgggag aatctattga tctatcacta  1380
gatttatcaa atgttgatcg ctcaaacatt agagaagttg gtatccagtt tattggtgga  1440
aatcattcat ctggaaaaac cgctttttat gttgatcatg tttattcaca ttag        1494

SEQ ID NO: 30          moltype = AA  length = 497
FEATURE                Location/Qualifiers
source                 1..497
                       mol_type = protein
                       organism = Amphibacillus xylanus
SEQUENCE: 30
VKLTKLKLLS SVFFVVLTVL MLFVPGNIVN VKAANGFYVS DSNLYDANGN QFVMRGVNHA  60
HSWYKDTYTE AIPAIAATGA NTIRIVLSDG GQYQKDDINI VRNLIETAEA NNLVAVLEVH  120
DATGSDSLSD LNRAVDYWIE IKDALIGKED TVIINIVNEW YGTWDGRLWA DGYKQAIPRL  180
RDAGLTHTLM IDAAGWGQFP SSIHQYGREV FNADRLGNTM FSIHMYEYAG GDDQMVRDNI  240
NGVINQDLAL VIGEFGHYHT DGDVDEDTIL SYAEQTGVGW LAWSWKGNGT EWEYLDLSND  300
WGGNYLTSWG DRIVNGANGL RETSQIASVF SGNNGGTPGN GEEETPGDVS HFANFENGTE  360
GWEASNVSGG PWATNEWSAS GSYALKADAQ LASGREHYLY RIGPFNLSGS TLNATVRGAN  420
WGNYGSGIDV KLYVKYGDGW TWRDSGVQTI RAGESIDLSL DLSNVDRSNI REVGIQFIGG  480
NHSSGKTAFY VDHVYSH                                                 497

SEQ ID NO: 31          moltype = DNA  length = 1767
FEATURE                Location/Qualifiers
source                 1..1767
                       mol_type = genomic DNA
                       organism = Paenibacillus polymyxa
SEQUENCE: 31
atgaaaaaac tactgtcttg tctcatttcg ctgtcaatgc ttgtgtatat cttaccgaca  60
atgatagtgt ccgctaacaa tgatggcgta acgaaccttg ctcttgattc aacacctagt  120
gcgcaaagtg atattatttc tgatgctgtc tacaaaatca cagctcagca ttcaggaaaa  180
agccttgagg ttgaaggcgg ttctaaagat gacggcgcga atgttcaaca atggacagat  240
aacgggaaag aacagcagaa atggagagtt gtggacgtcg gtggcggata ttacaagctc  300
atcagtcaat ctagcggaaa agcactggat gtggcaggtg gtaatacaca tgatggtgcc  360
aatgtgcaac agtggacgga caacggaaat gctcagcaaa agtggaagat catcgatgta  420
ggaggaggct attataagtt gatctcacaa agctctggaa aggcactcga cgtcgttggt  480
ggttatacgc acgacggggc caatgtgcag caatgggcag acaatggatc tgctcaacag  540
cgctggcgtt tcacacaaat tgatacaacc acggatacga cgccgccaac agcaccaacg  600
aatttacaat catcatcgaa aacaagtacc tctgtaacat tgacttggac cacaagcatt  660
gataatgtag gtgtgacagg ctatgtcatt tataatggaa cagatttggt cgggacttct  720
acaactacat cttatattgt tacaggatta acagcgaaca cttcctataa cttcactgtc  780
aaagcgaagg atgccgctgg gaatatttca gaaccatcaa atgtcttgaa agtcacaacg  840
agttcagatt cttctcaaaa cacaggtttt tatgtgaagg gcacaacatt atatgatgga  900
aacggtaatc catttgtgat gagaggaatc aatcatgcat acacatggta taaagggcaa  960
gaatcagtag caattcctgc gattgcgaaa acgggtgcaa acaccatccg gattgtctta  1020
tctgacggac agcagtggac aaaagatgat ttaagcgcgc ttcaaaattt gattacactc  1080
agtgagcaaa acaaacttgt agtgatttta gaggtgcacg acggtactgg caatgacaat  1140
gccgcagttt taaataaaat tgctgattat tggattgaaa tgaagtcagc tttaattggg  1200
aaggaaaata cagttatttt aaacatcgca aatgaatggt ttggtacatg ggatggaaac  1260
ggctgggcgc agggctacaa atcagtcata ccaaagctgc gaaatgcggg catcaaaaac  1320
acgattatgg tggatgcggc tggatgggga caatatccaa aatcgatttt tgattacgga  1380
acgcaagtgt tcgatgcaga tccgctcaag aatacgatgt tttccattca tatgtatgaa  1440
tacgcaggcg gcaacgcaga aacagtgaaa agtaatatcg acaacgtcct gaataaaaat  1500
cttgcactca tcattggaga atttggaatt aaacatacaa acggagatgt tgatgaagca  1560
acgatcatgt catacgcaca gcaaaaaggt gttgggtatc ttggctggtc atggaaagga  1620
aatggttcag gtcttgaata tttagatatg agtaacgatt gggctggcag cagttataca  1680
gagcaaggac atgccattat cgaaggacca aatggcattc gtgcaacatc aaaattatca  1740
accatttaca gcaatgggaa acaataa                                      1767

SEQ ID NO: 32          moltype = AA  length = 588
FEATURE                Location/Qualifiers
source                 1..588
                       mol_type = protein
                       organism = Paenibacillus polymyxa
SEQUENCE: 32
MKKLLSCLIS LSMLVYILPT MIVSANNDGV TNLALDSTPS AQSDIISDAV YKITAQHSGK  60
SLEVEGGSKD DGANVQQWTD NGKEQQKWRV VDVGGGYYKL ISQSSGKALD VAGGNTHDGA  120
NVQQWTDNGN AQQKWKIIDV GGGYYKLISQ SSGKALDVVG GYTHDGANVQ QWADNGSAQQ  180
RWRFTQIDTT TDTTPPTAPT NLQSSSKTST SVTLTWTTSI DNVGVTGYVI YNGTDLVGTS  240
TTTSYIVTGL TANTSYNFTV KAKDAAGNIS EPSNVLKVTT SSDSSQNTGF YVKGTTLYDG  300
NGNPFVMRGI NHAYTWYKGQ ESVAIPAIAK TGANTIRIVL SDGQQWTKDD LSALQNLITL  360
SEQNKLVVIL EVHDGTGNDN AAVLNKIADY WIEMKSALIG KENTVILNIA NEWFGTWDGN  420
GWAQGYKSVI PKLRNAGIKN TIMVDAAGWG QYPKSIFDYG TQVFDADPLK NTMFSIHMYE  480
YAGGNAETVK SNIDNVLNKN LALIIGEFGI KHTNGDVDEA TIMSYAQQKG VGYLGWSWKG  540
NGSGLEYLDM SNDWAGSSYT EQGHAIIEGP NGIRATSKLS TIYSNGKQ               588

SEQ ID NO: 33          moltype = DNA  length = 1470
FEATURE                Location/Qualifiers
source                 1..1470
                       mol_type = genomic DNA
                       organism = Bacillus hemicellulosilyticus
```

SEQUENCE: 33
atggatatat taagaaagtg tgtacttgta ctattggcct tactattgtt gttacctacg 60
acatcaacgg catttctctga aagcgcttct actaatgaga gagtgctaaa tttatctgat 120
ccgaatgcga cacgctatac gaaggaattg tttgcgtttc ttcaagacgt gagtggtgag 180
caagtgttgt tcgggcaaca gcatgcaaca gatgaagggt tgactctgac aggtgaagga 240
aatcgaattg gttcaactga gtcggaggtg aagaatgcag taggtgatta tccagctgtt 300
tttgggtggg atacgaacag cttggatggt cgtgaaaagc caggtacaga tgtggaaagt 360
caagagcaac gaattttaaa tacagcagaa tcgatgaaag tggcacatga attaggaggg 420
atcatcacat taagtatgca tccggataac tttgttaccg gtcattacta tggcgatacg 480
gatggtaacg tcgttcaaga aatattgcca ggtggctcca agcacaatga atttaacgct 540
tggctagata atattgctgc cctagcacat gaattagttg atgataatgg agagcctatt 600
ccggttatct tccgtccatt ccatgagcaa acaggttcgt ggttttggtg gggtgcgagc 660
acaacaactc ctgagcaata caaagcgatt tttcgatata cagtcgaata cttaagagat 720
gcaaagggtg ttcataactt tttatatgga ttctcccctg gtgcgggtcc tgctggcgat 780
ctagatcgat atttagaaac gtacccaggt gataattatg tcgatatctt aggtattgat 840
aattatgata gtaagtcaaa tgcggggtca gacgcttggt tatctggaat ggtaaaagat 900
ttagcgatga tctcgaaatt agcagaggaa agagggaagg tatcagcctt tactgaattt 960
ggatacagcg ctgaagggat gagtcaaacg ggtgatgcgt tagattggta tacacgtgtg 1020
ttaaatgcga taaaagcaga tgaagatgcg cgaaacatat cctacatgct aacgtgggct 1080
aactttgggt ggcctaataa tatatttgtt ccgtatcgtg atgtgaatgg ggatttaggt 1140
ggagatcatg agttattacc tgactttgta cagttttatg aagatgaata ctcagcattt 1200
cgtgaagata taaatgaaag tgtttacaat cgtaatgaga gttatattgt tgcggatcat 1260
gagccattta tgtatgttgt ttcccctacg acaggtacat atataacagg ctcgtctgtt 1320
gtcttacgag cgaaagtagt taacgatgag gatccgtccg ttacgtatca agtggcgggt 1380
tctgaagaag tctatgagat gactttagat gaaaatgggt attactctgc tgattatatt 1440
cctactgctc ctaagaatgg agctctgtag 1470

SEQ ID NO: 34 moltype = AA length = 489
FEATURE Location/Qualifiers
source 1..489
mol_type = protein
organism = Bacillus hemicellulosilyticus
SEQUENCE: 34
MDILRKCVLV LLALLLLLPT TSTAFSESAS TNERVLNLSD PNATRYTKEL FAFLQDVSGE 60
QVLFGQQHAT DEGLTLTGEG NRIGSTESEV KNAVGDYPAV FGWDTNSLDG REKPGTDVES 120
QEQRILNTAE SMKVAHELGG IITLSMHPDN FVTGHYYGDT DGNVVQEILP GGSKHNEFNA 180
WLDNIAALAH ELVDDNGEPI PVIFRPFHEQ TGSWFWWGAS TTTPEQYKAI FRYTVEYLRD 240
AKGVHNFLYG FSPGAGPAGD LDRYLETYPG DNYVDILGID NYDSKSNAGS DAWLSGMVKD 300
LAMISKLAEE RGKVSAFTEF GYSAEGMSQT GDALDWYTRV LNAIKADEDA RNISYMLTWA 360
NFGWPNNIFV PYRDVNGDLG GDHELLPDFV QFYEDEYSAF REDINESVYN RNESYIVADH 420
EPFMYVVSPT TGTYITGSSV VLRAKVVNDE DPSVTYQVAG SEEVYEMTLD ENGYYSADYI 480
PTAPKNGAL 489

SEQ ID NO: 35 moltype = DNA length = 1110
FEATURE Location/Qualifiers
source 1..1110
mol_type = genomic DNA
organism = Bacillus alcalophilus
SEQUENCE: 35
atgagaagta tgaagctttt atttgctatg tttattttag ttttttcctc ttttactttt 60
aacttagtag ttgcgcaagc tagtggacat ggacaaatgc ataaagtacc ttgggcaccc 120
caagctgaag cacctggaaa aacggctgag aatggagtct gggataaagt tagaaataat 180
cctggaaaag ccaatcctcc agcaggaaaa gtcaatggtt tttatataga tggaacaacc 240
ttatatgatg caaatggtaa gccatttgtg atgcgcggaa ttaaccacgc tcattcctgg 300
tacaagcctc acatagaaac cgcgatggag gcaattgctg atactggagc aaactccatt 360
cgtgtagttc tctcagatgg acaacagtgg accaaagatg atgttgacga agtagcaaaa 420
attatatctt tagcagaaaa acattcttta gttgctgttc ttgaggtaca tgatgcactc 480
ggaacagatg atattgaacc attacttaaa acagtcgatt actggattga gatcaaagat 540
gctttaatcg gaaaagagga caaagtaatt attaacattt ctaatgaatg gtttggttct 600
tggagcagtg aaggttgggc agaaggatat aaaaaagcaa ttcctttact aagagaggcg 660
ggtctaaaac atacacttat ggttgacgca gctgggtggg gacaatttcc tagatctatt 720
catgaaaaag gattagacgt ttttaactca gacccattaa agaatacaat gttttccatt 780
catatgtatg aatgggcagc gggtaatcct caacaagtaa aagacaatat tgacggtgtt 840
cttgaaaaga atttagctgt agtaattggt gagttcggtc atcatcacta cggaagagat 900
gttgctgttg atacgatctt aagtcattca gagaagtatg atgtaggttg gcttgcctgg 960
tcttggcacg gaaatagtgg tggtgtagag tatcttgact tagcaacaga tttttcaggg 1020
acgcaactaa ctgaatgggg agaaagaatt gtgtacggtc cgaatggttt aaaagaaact 1080
tctgaaatcg ttagtgtata caaaaaataa 1110

SEQ ID NO: 36 moltype = AA length = 369
FEATURE Location/Qualifiers
source 1..369
mol_type = protein
organism = Bacillus alcalophilus
SEQUENCE: 36
MRSMKLLFAM FILVFSSFTF NLVVAQASGH GQMHKVPWAP QAEAPGKTAE NGVWDKVRNN 60
PGKANPPAGK VNGFYIDGTT LYDANGKPFV MRGINHAHSW YKPHIETAME AIADTGANSI 120
RVVLSDGQQW TKDDVDEVAK IISLAEKHSL VAVLEVHDAL GTDDIEPLLK TVDYWIEIKD 180
ALIGKEDKVI INISNEWFGS WSSEGWAEGY KKAIPLLREA GLKHTLMVDA AGWGQFPRSI 240

-continued

```
HEKGLDVFNS DPLKNTMFSI HMYEWAAGNP QQVKDNIDGV LEKNLAVVIG EFGHHHYGRD  300
VAVDTILSHS EKYDVGWLAW SWHGNSGGVE YLDLATDFSG TQLTEWGERI VYGPNGLKET  360
SEIVSVYKK                                                         369

SEQ ID NO: 37          moltype = DNA  length = 1482
FEATURE                Location/Qualifiers
source                 1..1482
                       mol_type = genomic DNA
                       organism = Bacillus sp.
SEQUENCE: 37
atgaaaaaaa agttatcaca gatttatcat ttaattattt gcacacttat aataagtgtg  60
ggaataatgg ggattacaac gtccccatca gaagcaagtt caggctttta tgttgatggc  120
aatacgttat atgacgcaaa cgggcaacca tttgtcatga aaggcattaa ccatggacat  180
gcttggtata aagacaccgc ttcaacagct attcctgcca ttgcagagca aggcgcgaac  240
acgatacgta ttgttttatc agatggcggt caatgggaaa aagacgacat tgacaccgtt  300
cgtgaagtta ttgagcttgc ggagcaaaat aaaatggtgg ctgtcgttga agttcatgat  360
gccacgggcc gtgattcacg cagtgattta gatcgggcag tcgattattg gatagagatg  420
aaagatgcac ttatcggcaa agaggatact gtcattatta acattgcaaa cgaatggtat  480
ggcagttggg atggcgccgc ttgggctgat ggctacattg atgtcattcc gaagcttcgc  540
gatgccggct taacacacac cttaatggtt gatgcagcag gatgggggca atatccgcaa  600
tctattcatg attacggaca agatgtgttt aatgcagatc cgttaaaaaa tacgatattc  660
tccatccata tgtatgagta tgctggtggt gatgctaaca ctgttagatc aaatattgat  720
agagtcatag atcaagacct tgctctcgta ataggtgagt tcggtcatag acacactgat  780
ggcgatgttg atgaagatac aatccttagt tattctgaag aaactggcac aggatggctc  840
gcttggtctt ggaaaggcaa cagtgccgaa tgggattatt tagacctttc agaagattgg  900
gctggtaacc atttaactga ttggggaaat aggattgtcc acggggcaaa tggcttgcag  960
gaaacctcca aaccatccac cgtatttaca gatgataacg gtggtgcccc tgaaccgcca  1020
actactacta ccttgtatga ctttgaagga agcacacaag ggtggcatgg aagcaacgtg  1080
atgggtggcc cttggtccgt aacagaatgg ggtgcgtcag gcaactactc tttaaagggc  1140
gatgtcaatt taagctcaaa ttcttcacat gaactgtata gtgaacaaag tcgtaatcta  1200
cacggatact ctcagctaaa tgcaaccgtt cgccatgcca attggggaaa tcccggtaat  1260
ggcatgaatg caagacttta cgtgaaaacg ggctctgatt atacatggta tagcggtcct  1320
tttacacgta tcaatagctc caactcaggt acaacgttat cttttgattt aaacaacatc  1380
gaaaatagtc atcatgttag ggaaataggt gtgcaatttt cagctgcaga taatagcagc  1440
ggtcaaactg ctctatacgt tgataatgtt actttaagat aa                    1482

SEQ ID NO: 38          moltype = AA  length = 493
FEATURE                Location/Qualifiers
source                 1..493
                       mol_type = protein
                       organism = Bacillus sp.
SEQUENCE: 38
MKKKLSQIYH LIICTLIISV GIMGITTSPS EASSGFYVDG NTLYDANGQP FVMKGINHGH  60
AWYKDTASTA IPAIAEQGAN TIRIVLSDGG QWEKDDIDTV REVIELAEQN KMVAVVEVHD  120
ATGRDSRSDL DRAVDYWIEM KDALIGKEDT VIINIANEWY GSWDGAAWAD GYIDVIPKLR  180
DAGLTHTLMV DAAGWGQYPQ SIHDYGQDVF NADPLKNTIF SIHMYEYAGG DANTVRSNID  240
RVIDQDLALV IGEFGHRHTD GDVDEDTILS YSEETGTGWL AWSWKGNSAE WDYLDLSEDW  300
AGNHLTDWGN RIVHGANGLQ ETSKPSTVFT DDNGGAPEPP TTTTLYDFEG STQGWHGSNV  360
MGGPWSVTEW GASGNYSLKG DVNLSSNSSH ELYSEQSRNL HGYSQLNATV RHANWGNPGN  420
GMNARLYVKT GSDYTWYSGP FTRINSSNSG TTLSFDLNNI ENSHHVREIG VQFSAADNSS  480
GQTALYVDNV TLR                                                    493

SEQ ID NO: 39          moltype = DNA  length = 1551
FEATURE                Location/Qualifiers
source                 1..1551
                       mol_type = genomic DNA
                       organism = Bacillus circulans
SEQUENCE: 39
atggggtggt ttttagtgat tttacgcaag tggttgattg cttttgtcgc atttttactg  60
atgttctcgt ggactggaca acttacgaac aaagcacatg ctgcaagcgg attttatgta  120
agcggtacca aattattgga tgctacagga caaccatttg tgatgcgagg agtcaatcat  180
gcgcacacat ggtataaaga tcaactatcc accgcaatac cagccattgc taaaacaggt  240
gccaacacga tacgtattgt actggcgaat ggacacaaat ggacgcttga tgatgtaaac  300
accgtcaaca atattctcac cctctgtgaa caaaacaaac taattgccgt tttggaagta  360
catgacgcta caggaagcga tagtctttcc gatttagaca acgccgttaa ttactggatt  420
ggtattaaaa gcgcgttgat cggcaaggaa gaccgtgtaa tcattaatat agctaacgag  480
tggtacggaa catgggatgg agtcgcctgg gctaatggtt ataagcaagc catacccaaa  540
ctgcgtaatg ctggtctaac tcatacgctg attgttgact ccgctggatg ggggacaatat  600
ccagattcgg tcaaaaatta tgggacagaa gtactgaatg cagacccgtt aaaaaacaca  660
gtattctcta tccatatgta tgaatatgct gggggcaatg caagtaccgt caaatccaat  720
attgacggtg tgctgaacaa gaatcttgca ctgattatcg gcgaatttgg tggacaacat  780
acaaacggtg atgtggatga agccaccatt atgagttatt cccaagagaa gggagtcggc  840
tggttggctt ggtcctggaa gggaaatagc agtgatttgg cttatctcga tatgacaaat  900
gattgggctg gtaactccct cacctcgttc ggtaataccg tagtgaatgg cagtaacggc  960
attaaagcaa cttctgtgtt atccggcatt tttggaggtg ttacgccaac ctcaagccct  1020
acttctacac ctacatctac gccaacctca actcctactc ctacgccaag tccgaccccg  1080
agtccaggta ataacgggac gatcttatat gatttcgaaa caggaactca aggctggtcg  1140
ggaaacaata tttcgggagg cccatgggtc accaatgaat ggaaagcaac gggagcgcaa  1200
actctcaaag ccgatgtctc cttacaatcc aattccacgc atagtctata tataacctct  1260
```

-continued

```
aatcaaaatc tgtctggaaa aagcagtctg aaagcaacgg ttaagcatgc gaactggggc  1320
aatatcggca acgggattta tgcaaaacta tacgtaaaga ccgggtccgg gtggacatgg  1380
tacgattccg gagagaatct gattcagtca aacgacggta ccattttgac actatccctc  1440
agcggcattt cgaatttgtc ctcagtcaaa gaaattgggg tagaattccg cgcctcctca  1500
aacagtagtg gccaatcagc tatttatgta gatagtgtta gtctgcaata a           1551

SEQ ID NO: 40          moltype = AA  length = 516
FEATURE                Location/Qualifiers
source                 1..516
                       mol_type = protein
                       organism = Bacillus circulans
SEQUENCE: 40
MGWFLVILRK WLIAFVAFLL MFSWTGQLTN KAHAASGFYV SGTKLLDATG QPFVMRGVNH  60
AHTWYKDQLS TAIPAIAKTG ANTIRIVLAN GHKWTLDDVN TVNNILTLCE QNKLIAVLEV  120
HDATGSDSLS DLDNAVNYWI GIKSALIGKE DRVIINIANE WYGTWDGVAW ANGYKQAIPK  180
LRNAGLTHTL IVDSAGWGQY PDSVKNYGTE VLNADPLKNT VFSIHMYEYA GGNASTVKSN  240
IDGVLNKNLA LIIGEFGGQH TNGDVDEATI MSYSQEKGVG WLAWSWKGNS SDLAYLDMTN  300
DWAGNSLTSF GNTVVNGSNG IKATSVLSGI FGGVTPTSSP TSTPTSTPTS TPTPTPSPTP  360
SPGNNGTILY DFETGTQGWS GNNISGGPWV TNEWKATGAQ TLKADVSLQS NSTHSLYITS  420
NQNLSGKSSL KATVKHANWG NIGNGIYAKL YVKTGSGWTW YDSGENLIQS NDGTILTLSL  480
SGISNLSSVK EIGVEFRASS NSSGQSAIYV DSVSLQ                            516

SEQ ID NO: 41          moltype = DNA  length = 984
FEATURE                Location/Qualifiers
source                 1..984
                       mol_type = genomic DNA
                       organism = Paenibacillus sp.
SEQUENCE: 41
atgagacaac ttttagcaaa aggtatttta gctgcactgg tcatgatgtt agcgatgtat  60
ggattgggga atctctcttc taaagcttcg gctgcaacag gtttttatgt aagcggtacc  120
actctatatg attctactgg taaacctttt gtaatgcgcg gtgtcaatca ttcgcatacc  180
tggttcaaaa atgatctaaa tgcagccatc cctgctattg ccaaaacagg tgcaaataca  240
gtacgtatcg ttttatctaa tggtgttcag tatactagag atgatgtaaa ctcagtcaaa  300
aatattattt ccctggttaa ccaaaacaaa atgattgctg ttcttgaggt gcatgatgct  360
accggtaaag acgattacgc ttctcttgat gccgctgtaa actactggat cagcatcaaa  420
gatgccttga ttggcaagga agatcgagtc attgttaata ttgccaatga atggtacggt  480
acatggaatg gcagtgcttg ggcagatggt tataagcagg ctattcccaa actaagaaat  540
gcaggcatca aaaacacttt aatcgttgat gccgccggct ggggacaatg tcctcaatcg  600
atcgttgatt acgggcaaag tgtatttgca gcagattcgc ttaaaaatac aatttttctct  660
attcacatgt atgaatatgc aggcggtaca gatgcgatcg tcaaaagcaa tatggaaaat  720
gtactgaaca aaggacttcc tttgatcatc ggtgaatttg gcgggcagca tacaaacggc  780
gatgtagatg aacatgcaat tatgcgttat ggtcagcaaa aaggtgtagg ttggctggca  840
tggtcgtggt atggcaacaa tagtgaactc agttatctgg atttggctac aggtcccgcc  900
ggtagtctga caagtatcgg caatacgatt gtaaatgatc catatggtat caaagctacc  960
tcgaaaaaag cgggtatctt ctaa                                         984

SEQ ID NO: 42          moltype = AA  length = 327
FEATURE                Location/Qualifiers
source                 1..327
                       mol_type = protein
                       organism = Paenibacillus sp.
SEQUENCE: 42
MRQLLAKGIL AALVMMLAMY GLGNLSSKAS AATGFYVSGT TLYDSTGKPF VMRGVNHSHT  60
WFKNDLNAAI PAIAKTGANT VRIVLSNGVQ YTRDDVNSVK NIISLVNQNK MIAVLEVHDA  120
TGKDDYASLD AAVNYWISIK DALIGKEDRV IVNIANEWYG TWNGSAWADG YKQAIPKLRN  180
AGIKNTLIVD AAGWGQCPQS IVDYGQSVFA ADSLKNTIFS IHMYEYAGGT DAIVKSNMEN  240
VLNKGLPLII GEFGGQHTNG DVDEHAIMRY GQQKGVGWLA WSWYGNNSEL SYLDLATGPA  300
GSLTSIGNTI VNDPYGIKAT SKKAGIF                                      327

SEQ ID NO: 43          moltype = DNA  length = 981
FEATURE                Location/Qualifiers
source                 1..981
                       mol_type = genomic DNA
                       organism = Bacillus circulans
SEQUENCE: 43
atggccaagt tgcaaaaggg tacaatctta acagtcattg cagcactgat gtttgtcatt  60
ttggggagcg cggcgcccaa agccgcagca gctacaggtt tttacgtgaa tggaggcaaa  120
ttgtacgatt ctacgggtaa accattttac atgaggggta tcaatcatgg gcactcctgg  180
tttaaaaatg atttgaacac ggctatccct gcgatcgcaa aaacgggtgc caatacggta  240
cgaattgttt tatcaaacgg tacacaatac accaaggatg atctgaattc cgtaaaaaac  300
atcattaatg tcgtaaatgc aaacaagatg attgctgtgc ttgaagtaca cgatgccact  360
gggaaagatg acttcaactc gttggatgca gcggtcaact actggataag catcaaagaa  420
gcactgatcg ggaaggaaga tcgggttatt gtaaacattg caaacgagtg gtacggaaca  480
tggaacggaa gcgcgtgggc tgacgggtac aaaaaagcta ttccgaaatt aagagatgcg  540
ggtattaaaa ataccttgat tgtagatgca gcaggctggg gtcagtaccc tcaatcgatc  600
gtcgattacg gacaaagcgt attcgccgcg gattcacaga aaaatacggc gttttccatt  660
cacatgtatg agtatgcagg caaggatgcg gccaccgtca aatccaatat ggaaaatgtg  720
ctgaataagg ggctggcctt aatcattggt gagttcggag gatatcacac caatggagat  780
gtcgatgaat atgcaatcat gaaatatggt ctggaaaaag ggtaggatg gcttgcatgg   840
```

-continued

```
tcttggtacg gtaatagctc tggattaaac tatcttgatt tggcaacagg acctaacggc  900
agtttgacga gctatggtaa tacggttgtc aatgatactt acggaattaa aaatacgtcc  960
caaaaagcgg gaatctttta a                                             981

SEQ ID NO: 44          moltype = AA  length = 326
FEATURE                Location/Qualifiers
source                 1..326
                       mol_type = protein
                       organism = Bacillus circulans
SEQUENCE: 44
MAKLQKGTIL TVIAALMFVI LGSAAPKAAA ATGFYVNGGK LYDSTGKPFY MRGINHGHSW  60
FKNDLNTAIP AIAKTGANTV RIVLSNGTQY TKDDLNSVKN IINVVNANKM IAVLEVHDAT  120
GKDDFNSLDA AVNYWISIKE ALIGKEDRVI VNIANEWYGT WNGSAWADGY KKAIPKLRDA  180
GIKNTLIVDA AGWGQYPQSI VDYGQSVFAA DSQKNTAFSI HMYEYAGKDA ATVKSNMENV  240
LNKGLALIIG EFGGYHTNGD VDEYAIMKYG LEKGVGWLAW SWYGNSSGLN YLDLATGPNG  300
SLTSYGNTVV NDTYGIKNTS QKAGIF                                        326

SEQ ID NO: 45          moltype = DNA  length = 1110
FEATURE                Location/Qualifiers
source                 1..1110
                       mol_type = genomic DNA
                       organism = Bacillus nealsonii
SEQUENCE: 45
atggttgtga aaaaattatc aagttttatt ctaattttac tgttagttac ttctgctttg  60
tttattactg attcaaaagc aagtgctgct tcgggatttt atgtaagcgg taccacttta  120
tatgatgcaa cgggtaaacc gtttactatg agaggtgtaa atcatgctca ttcttggttt  180
aaagaagatt cagcagctgc tattccagca atagcagcaa ctggagcaaa cacagtaaga  240
attgttttat ctgatggtgg acaatacacc aaagatgata ttaatactgt taaaagcctt  300
ttgtcattgg cagaaaaaat aaacttgcat tctggagtca tgacgcacag aaaagacgat  360
gtggaatctt taaatcgtgc agtcgattat tggatcagct taaaagacac attgataggc  420
aaagaagata aagtgataat aaacattgcg aatgaatggt atggtacttg ggatggtgcg  480
gcatgggcag ctggttataa acaagctatt ccaaagttac ggaatgcagg cttaaatcat  540
actctaataa ttgattctgc tggatgggga caatacccag cttccattca taattatgga  600
aaagaggtat ttaatgcgga tccattgaaa aatacaatgt tctccataca tatgtatgag  660
tacgctggtg gggatgcagc aactgttaag tcaaatattg atggtgtctt aaaccaagga  720
ttagctttaa taataggaga gtttggacaa aaacatacaa atggagatgt agatgaagca  780
accatcatga gttattcaca gcaaaaaaat atcggttggc ttgcatggtc ttggaaagga  840
aatagcacag attggagcta tctggattta agcaacgatt ggtctggtaa cagtttaact  900
gattggggta atacggttgt taatggggca aatgggttaa aagccacttc aaaactaagc  960
ggagtattcg gtagctcagc aggaacaaat aatatattgt atgattttga aagcggtaat  1020
caaaactgga ctggatcaaa tatcgcgggt ggaccttgga acgaattcaa gcttgatatc  1080
attcaggacg agcctcagac tccagcgtaa                                    1110

SEQ ID NO: 46          moltype = AA  length = 369
FEATURE                Location/Qualifiers
source                 1..369
                       mol_type = protein
                       organism = Bacillus nealsonii
SEQUENCE: 46
MVVKKLSSFI LILLLVTSAL FITDSKASAA SGFYVSGTTL YDATGKPFTM RGVNHAHSWF  60
KEDSAAAIPA IAATGANTVR IVLSDGGQYT KDDINTVKSL LSLAEKINLH SGVMTHRKDD  120
VESLNRAVDY WISLKDTLIG KEDKVIINIA NEWYGTWDGA AWAAGYKQAI PKLRNAGLNH  180
TLIIDSAGWG QYPASIHNYG KEVFNADPLK NTMFSIHMYE YAGGDAATVK SNIDGVLNQG  240
LALIIGEFGQ KHTNGDVDEA TIMSYSQQKN IGWLAWSWKG NSTDWSYLDL SNDWSGNSLT  300
DWGNTVVNGA NGLKATSKLS GVFGSSAGTN NILYDFESGN QNWTGSNIAG GPWNEFKLDI  360
IQDEPQTPA                                                           369

SEQ ID NO: 47          moltype = DNA  length = 984
FEATURE                Location/Qualifiers
source                 1..984
                       mol_type = genomic DNA
                       organism = Bacillus circulans
SEQUENCE: 47
atgatgttga tatggatgca gggatggaag tctattctag tcgcgatctt ggcgtgtgtg  60
tcagtaggcg gtgggcttcc tagtccagaa gcagccacag gattttatgt aaacggtacc  120
aagctgtatg attcaacggg caaggccttt gtgatgaggg gtgtaaatca tccccacacc  180
tggtacaaga atgatctgaa cgcggctatt ccggctatcg cgcaaacggg agccaatacc  240
gtacgagtcg tcttgtcgaa cgggtcgcaa tggaccaagg atgacctgaa ctccgtcaac  300
agtatcatct cgctggtgtc gcagcatcaa atgatagccg ttctggaggt gcatgatgcg  360
acaggcaaag atgagtatgc ttcccttgaa gcggccgtcg actattggat cagcatcaaa  420
ggggcattga tcggaaaaga agaccgcgtc atcgtcaata ttgctaatga atggtatgga  480
aattggaaca gcagcggatg ggccgatggt tataagcagg ccattcccaa attaagaaac  540
gcgggcatta agaatacgtt gatcgttgat gcagcgggat gggggcaata cccgcaatcc  600
atcgtggatg agggggccgc ggtatttgct tccgatcaac tgaagaatac ggtattctcc  660
atccatatgt atgagtatgc cggtaaggat gccgctacgg tgaaaacgaa tatggacgat  720
gttttaaaca aaggattgcc tttaatcatt ggggagttcg gcggctatca tcaaggtgcc  780
gatgtcgatg agattgctat tatgaagtac ggacagcaga aggaagtggg ctggctggct  840
tggtcctggt acggaaacag cccggagctg aacgatttgg atctggctgc agggccaagc  900
ggaaacctga ccggctgggg aaacacggtg gttcatggaa ccgacgggat tcagcaaacc  960
```

-continued

```
tccaagaaag cgggcattta ttaa                                          984

SEQ ID NO: 48           moltype = AA  length = 327
FEATURE                 Location/Qualifiers
source                  1..327
                        mol_type = protein
                        organism = Bacillus circulans
SEQUENCE: 48
MMLIWMQGWK SILVAILACV SVGGGLPSPE AATGFYVNGT KLYDSTGKAF VMRGVNHPHT  60
WYKNDLNAAI PAIAQTGANT VRVVLSNGSQ WTKDDLNSVN SIISLVSQHQ MIAVLEVHDA  120
TGKDEYASLE AAVDYWISIK GALIGKEDRV IVNIANEWYG NWNSSGWADG YKQAIPKLRN  180
AGIKNTLIVD AAGWGQYPQS IVDEGAAVFA SDQLKNTVFS IHMYEYAGKD AATVKTNMDD  240
VLNKGLPLII GEFGGYHQGA DVDEIAIMKY GQQKEVGWLA WSWYGNSPEL NDLDLAAGPS  300
GNLTGWGNTV VHGTDGIQQT SKKAGIY                                       327
```